(12) United States Patent
Saitoh et al.

(10) Patent No.: US 7,804,565 B2
(45) Date of Patent: Sep. 28, 2010

(54) CELLULOSE ACYLATE FILM, OPTICAL COMPENSATION FILM, POLARIZING PLATE, AND LIQUID CRYSTAL DISPLAY DEVICE

(75) Inventors: Yukito Saitoh, Minami-ashigara (JP); Ryouta Matsubara, Minami-ashigara (JP); Yoji Ito, Minami-ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 654 days.

(21) Appl. No.: 11/659,577

(22) PCT Filed: Aug. 12, 2005

(86) PCT No.: PCT/JP2005/015101

§ 371 (c)(1),
(2), (4) Date: Sep. 24, 2007

(87) PCT Pub. No.: WO2006/016723

PCT Pub. Date: Feb. 16, 2006

(65) Prior Publication Data

US 2008/0158483 A1    Jul. 3, 2008

(30) Foreign Application Priority Data

Aug. 13, 2004  (JP) ............................. 2004-235974
Sep. 17, 2004  (JP) ............................. 2004-272531

(51) Int. Cl.
    *G02F 1/1335*    (2006.01)
(52) U.S. Cl. ...................................... 349/117; 349/118
(58) Field of Classification Search ................ 349/117, 349/118, 119
    See application file for complete search history.

(56) References Cited

U.S. PATENT DOCUMENTS 6,812,983 B2 *  11/2004  Arakawa .................... 349/117

(Continued)

FOREIGN PATENT DOCUMENTS

JP          9-211444 A      8/1997

(Continued)

OTHER PUBLICATIONS

International Search Report dated Aug. 12, 2005.

(Continued)

*Primary Examiner*—Michael H Caley
(74) *Attorney, Agent, or Firm*—Buchanan Ingersoll & Rooney PC

(57) ABSTRACT

A novel optical compensation film is disclosed. The film comprises a transparent film having a ratio Re/Rth(450 nm) of Re and Rth at 450 nm of 0.4 to 0.95 times as large as Re/Rth (550 nm) at 550 nm, having Re/Rth(650 nm) at 650 nm of 1.05 to 1.93 times as large as Re/Rth(550 nm), and having Rth at 550 nm ranging from 70 nm to 400 nm, where "Re" is an in-plane retardation and "Rth" is a thickness-direction retardation; and an optically anisotropic layer having an in-plane optical anisotropy, formed of a composition comprising a liquid-crystalline compound, in which molecules of the liquid-crystalline compound are fixed in an alignment state, wherein the direction of orthogonal projection, onto a plane of the transparent film, of a mean orientation direction of molecular symmetry axes of the liquid-crystalline compound at the interface on the transparent film side is 45° with respect to the in-plane slow axis of the transparent film.

9 Claims, 4 Drawing Sheets

U.S. PATENT DOCUMENTS

| | | |
|---|---|---|
| 6,881,453 B2 | 4/2005 | Kido et al. |
| 2003/0138654 A1 | 7/2003 | Kido et al. |
| 2004/0024198 A1 | 2/2004 | Shibata et al. |
| 2005/0123693 A1 | 6/2005 | Ito |

FOREIGN PATENT DOCUMENTS

| | | |
|---|---|---|
| JP | 11-316378 A | 11/1999 |
| JP | 2003-201301 A | 7/2003 |
| JP | 2003-279729 A | 10/2003 |
| JP | 2003-315538 A | 11/2003 |
| JP | 2004-004550 A | 1/2004 |
| JP | 2004-226842 A | 8/2004 |
| WO | WO 01/81957 A1 | 11/2001 |

OTHER PUBLICATIONS

Written Opinion of the International Searching Authority dated Nov. 15, 2005.

* cited by examiner (a) left 60°   (b) right 60°

(a) left 60°   (b) right 60°

CELLULOSE ACYLATE FILM, OPTICAL COMPENSATION FILM, POLARIZING PLATE, AND LIQUID CRYSTAL DISPLAY DEVICE

TECHNICAL FIELD

The present invention, relates to an optical compensation film, and a polarizing plate and a liquid crystal display device using the same. The present invention also relates to a cellulose acylate film useful as various components such as a support for the optical compensation film, and a protective film for the polarizing plate.

BACKGROUND ART

Liquid crystal display device comprises a liquid crystal cell and at least one polarizing plate. The polarizing plate generally has protective films and a polarizing film, and is obtained typically by dying the polarizing film composed of a polyvinyl alcohol film with iodine, stretching, and being stacked on both surfaces thereof with the protective films. A transmissive liquid crystal display device is configured by attaching the polarizing plate on both sides of the liquid crystal cell, occasionally having one or more optical compensation film optionally arranged therein. A reflective liquid crystal display device is configured generally by arranging a reflector plate, the liquid crystal cell, one or more optical compensation films, and the polarizing plate in this order. The liquid crystal cell comprises liquid-crystalline molecules, two substrates encapsulating the liquid-crystalline molecules, and electrode layers applying voltage to the liquid-crystalline molecules. The liquid crystal cell switches ON and OFF displays depending on variation in orientation state of the liquid-crystalline molecules, and is applicable both to transmission type and reflective type. There are proposed several kinds of display modes including TN (twisted nematic), IPS (in-plane switching), OCB (optically compensatory bend) and VA (vertically aligned), ECB (electrically controlled birefringence).

Of these LCDs, most widely used for application in need of a high definition display is 90° twisted nematic liquid crystal display (referred to as "TN mode", hereinafter) using nematic liquid crystal molecules having a positive dielectric anisotropy, driven by thin-film transistors. The TN mode has viewing angle characteristics such as ensuring an excellent display characteristic in the front view, but as being degraded in display characteristics in an oblique view, such as causing lowered contrast, or grayscale inversion which is inversion of brightness in gradation display, which are strongly desired to be improved. The TN mode also suffers from limitation of response speed, and this raises further need for development of LCD based on a liquid crystal mode capable of faster response.

The optical compensation film has conventionally been developed for use with TN-mode liquid crystal display device, but recent growing demands on liquid-crystal television set have raised newly-recognized problems of response speed which is observed as trailing or after-image in video image. OCB mode (or bend mode), characterized by a large response speed, has therefore attracted much attention. It is, however, difficult for the OCB mode to achieve a wide viewing angle characteristic, and this demands use of the optical compensation film. Japanese Laid-Open Patent Publication "Tokkaihei" Nos. 9-211444 and 11-316378, for example, describe the optical compensation film, having a layer composed of a liquid-crystalline compound, applicable to the liquid crystal display device based on the OCB system. It has, however, been difficult to obtain desirable viewing angle characteristics only by controlling the conventionally-known optical parameters described in these publications.

DISCLOSURE OF THE INVENTION

It is therefore an object of the present invention to provide a liquid crystal display device in which a liquid crystal cell is optically compensated in an exact manner, giving a high contrast, and is reduced in viewing-angle-dependent coloration in a black state, and in particular to provide a liquid crystal display device based on the OCB mode. It is another object of the present invention to provide an optical compensation film capable of optically compensating a liquid crystal cell, in particular liquid crystal cell employing the OCB mode, and is contributive to improvement in the contrast and reduction of the viewing-angle-dependent coloration.

It is still another object of the present invention to provide a cellulose acylate film useful as a member of the display device, such as a protective film for optical compensation film and polarizing plate.

In one aspect, the present invention provide a cellulose acylate film stretched at least in one direction, wherein a substitution degree of cellulose acylate varies by 0.05 or more within a range from 2.00 to 3.00 in a thickness-direction of the film.

As embodiments of the present invention, the cellulose acylate film further comprising a retardation enhancing agent; the cellulose acylate film having an optical anisotropy satisfying the formula (I), (II) and (III) below:

$$0.40 < \{Re/Rth(450)\}/\{Re/Rth(550)\} < 0.95; \quad (I)$$

$$1.05 < \{Re/Rth(650)\}/\{Re/Rth(550)\} < 1.93; \text{ and} \quad (II)$$

$$70 \text{ nm} < Rth(550) < 400 \text{ nm}, \quad (III)$$

[where, $Re/Rth(450)$ is a ratio of in-plane retardation value measured at 450 nm/thickness-direction retardation value measured at 450 nm; $Re/Rth(550)$ is a ratio of in-plane retardation value measured at 550 nm/thickness-direction retardation value measured at 550 nm; $Re/Rth(650)$ is a ratio of in-plane retardation value measured at 650 nm/thickness-direction retardation value measured at 650 nm; and $Rth(550)$ is a thickness-direction retardation value measured at 550 nm]; and the cellulose acylate film being formed by co-casting of two or more layers, wherein a substitution degree of cellulose acylate contained in one layer and a substitution degree of cellulose acylate contained in the other layer differs by 0.05 or more; are provided.

In another aspect, the present invention provides an optical compensation film comprising a cellulose acylate film stretched at least in one direction, in which a substitution degree of cellulose acylate varies by 0.05 or more within a range from 2.00 to 3.00 in a thickness-direction of the film; and an optically anisotropic layer formed of a composition comprising a liquid-crystalline compound and having an in-plane optical anisotropy, in which molecules of the liquid-crystalline compound are fixed in an alignment state, wherein the direction of orthogonal projection, onto a plane of the cellulose acylate film, of a mean orientation direction of molecular symmetry axes of the liquid-crystalline compound at the interface on the cellulose acylate film side is 450 with respect to the in-plane slow axis of the cellulose acylate film.

In another aspect, the present invention also provides an optical compensation film comprising a transparent film having a ratio Re/Rth(450 nm) of Re and Rth at 450 nm of 0.4 to 0.95 times as large as Re/Rth(550 nm) at 550 nm, having Re/Rth(650 nm) at 650 nm of 1.05 to 1.93 times as large as Re/Rth(550 nm), and having Rth at 550 nm ranging from 70 nm to 400 nm, where "Re" is an in-plane retardation and "Rth" is a thickness-direction retardation; and an optically anisotropic layer having an in-plane optical anisotropy, formed of a composition comprising a liquid-crystalline compound, in which molecules of the liquid-crystalline compound are fixed in an alignment state, wherein the direction of orthogonal projection, onto a plane of the transparent film, of a mean orientation direction of molecular symmetry axes of the liquid-crystalline compound at the interface on the transparent film side is 45° with respect to the in-plane slow axis of the transparent film.

In another aspect, the present invention provides a polarizing plate comprising a polarizing film and the cellulose acylate film or the transparent film; and a liquid crystal display device comprising a liquid crystal cell and the polarizing plate.

In another aspect, the present invention provides a liquid crystal display device comprising:

a liquid crystal cell comprising a pair of substrates having at least on either one of which electrodes formed thereon, and a liquid crystal layer held between the pair of substrates, comprising a nematic liquid crystal material, molecules of which being oriented almost in parallel with the surfaces of the pair of substrates in a non-driven state, and having a product $\Delta n \cdot d$ of the thickness d ($\mu$m) and the refractive index anisotropy $\Delta n$;

a first and second polarizing films arranged while placing the liquid crystal cell in between; and a transparent film disposed between the liquid crystal cell and at least one of the first and second polarizing film, the transparent film having a ratio Re/Rth(450 nm) of Re and Rth at 450 nm of 0.4 to 0.95 times as large as Re/Rth(550 nm) at 550 nm, having Re/Rth(650 nm) at 650 nm of 1.05 to 1.93 times as large as Re/Rth(550 nm), and having Rth at 550 nm ranging from 70 nm to 400 nm, where "Re" is an in-plane retardation and "Rth" is a thickness-direction retardation.

As embodiment of the present invention, the liquid crystal display device further comprising at least one optically anisotropic layer between the transparent film and the liquid crystal cell, the optically anisotropic layer being formed of a composition comprising a liquid-crystalline compound, in which molecules of the liquid-crystalline compound are fixed in an alignment state, wherein the direction of orthogonal projection, onto a plane of the transparent film, of a mean orientation direction of molecular symmetry axes of the liquid-crystalline compound at the interface on the transparent film side is 450 with respect to the in-plane slow axis of the transparent film; the liquid crystal display device wherein the liquid-crystalline compound is a discotic liquid-crystalline compound; the liquid crystal display device wherein the liquid crystal cell comprises a liquid crystal layer employing a bend orientation mode; and the liquid crystal display device wherein the liquid crystal cell employs a VA mode or an OCB mode; are provided.

In the specification, ranges indicated with "to" mean ranges including the numerical values before and after "to" as the minimum and maximum values.

It is to be noted that "45°", "parallel" and "orthogonal" in the context of this specification allow a tolerance of less than ±5° with respect to the precise angles. Difference from the precise angles is preferably less than 4°, and more preferably less than 3°. With respect to the angles, "+" corresponds to the clockwise direction, and "−" corresponds to the counter-clockwise direction. The "slow axis" means the direction in which the refractive index becomes maximum. The "visible light region" means a wavelength range from 380 nm to 780 nm. The measurement wavelength for the refractive index is $\lambda$=550 nm in the visible light region, unless otherwise specifically noted.

In the specification, the terms of "polarizing plate" means not only polarizing plates having a proper size to be employed in a liquid-crystal but also long polarizing plates before being cut. And in the specification, the terms of "polarizing film" is distinct from the term "polarizing plate", and the term of "polarizing plate" is used for any laminated body comprising a "polarizing film" and at least one protective film thereon.

In this patent specification, "molecular symmetry axis" refers to an axis of rotation symmetry for molecule having such axis of symmetry, but the term used herein never requires that the molecules should have a rotation symmetry in a strict sense. In general, the molecular symmetry axis of a discotic liquid-crystalline compound coincides with an axis normally penetrating the center of a disk plane, and that of a rod-like liquid-crystalline compound coincides with the longitudinal axis of the molecule.

In the specification, Re($\lambda$) and Rth($\lambda$) of a polymer film respectively mean an in-plane retardation and a retardation in a thickness-direction at wavelength $\lambda$. The Re($\lambda$) is measured by using KOBRA-21ADH (manufactured by Oji Scientific Instruments) for an incoming light of a wavelength $\lambda$ nm in a direction normal to a film-surface. The Rth($\lambda$) is calculated by using KOBRA-21ADH based on three retardation values; first one of which is the Re($\lambda$) obtained above, second one of which is a retardation which is measured for an incoming light of a wavelength $\lambda$ nm in a direction rotated by +400 with respect to the normal direction of the film around an in-plane slow axis, which is decided by KOBRA 21ADH, as an a tilt axis (a rotation axis), and third one of which is a retardation which is measured for an incoming light of a wavelength $\lambda$ nm in a direction rotated by −400 with respect to the normal direction of the film around an in-plane slow axis as an a inclining axis (a rotation axis); a hypothetical mean refractive index and an entered thickness value of the film. The mean refractive indexes of various materials are described in published documents such as "POLYMER HANDBOOK" (JOHN WILEY&SONS, INC) and catalogs. If the values are unknown, the values may be measured with an abbe refractometer or the like. The mean refractive indexes of major optical films are exemplified below:

cellulose acylate (1.48), cyclo-olefin polymer (1.52), polycarbonate (1.59), polymethyl methacrylate (1.49), polystyrene (1.59).

When the hypothetical mean refractive index and a thickness value are put into KOBRA 21ADH, nx, ny and nz are calculated. And Nz, which is equal to (nx−nz)/(nx−ny), is calculated based on the calculated nx, ny and nz.

Figure 1:
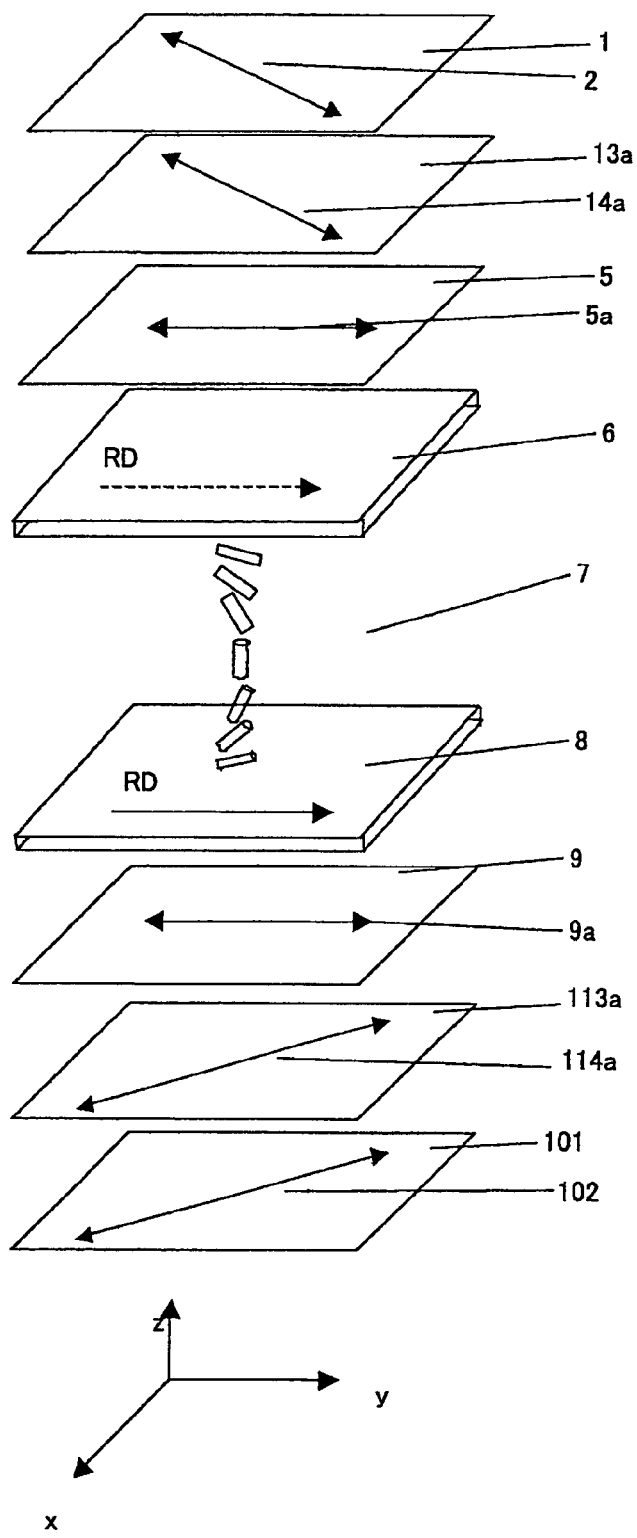
FIG. 1 is a schematic view of an exemplary configuration of a liquid crystal display device of the present invention.

Reference numerals used herein are as follows:
1 polarizing film
2 transmission axis
3a transparent substrate
13a transparent film
14a in-plane slow axis
5 optically anisotropic layer
5a mean orientation direction of molecular symmetry axes on the liquid-crystalline compound polarizing film side (on the transparent film interface side)
6 substrate
7 liquid-crystalline molecule
8 substrate
9 optically anisotropic layer
9a mean orientation direction of molecular symmetry axes on the polarizing film side (on the transparent film interface side)
103a transparent substrate
113a transparent film
114a in-plane slow axis
101 polarizing film
102 transmission axis

DETAILED DESCRIPTION OF THE INVENTION

The following paragraphs will explain operations of the present invention referring to the attached drawings.

FIG. 1 shows a schematic drawing of an exemplary configuration of a liquid crystal display device of the present invention. The OCB-mode liquid crystal display device shown in FIG. 1 comprises a liquid crystal cell comprising a liquid crystal layer 7 in which liquid crystal shows bend orientation to the substrate surface under applied voltage, i.e., in a black state, and substrates 6 and 8 holding the liquid crystal layer 7 in between. Each of the substrates 6 and 8 is orientation-treated on the surface thereof opposing to the liquid crystal, of which rubbing direction is indicated by an arrow "RD" in the drawing. The arrow viewed from the backside is indicated by a dashed line. Polarizing films 1, 101 are disposed so as to hold the liquid crystal cell in between. The polarizing films 1, 101 are arranged so that the transmission axes 2, 102 thereof are orthogonal to each other, and so that these axes cross 45° to the RD direction of the liquid crystal layer 7 of the liquid crystal cell. Between the polarizing films 1, 101 and the liquid crystal cell, there are disposed transparent films 13a, 113a and optically an isotropic layers 5, 9, respectively. The transparent films 13a, 113a are disposed so that slow axes 14, 114 thereof are aligned in parallel with the transmission axes 2, 102 of their adjacent polarizing films 1, 101, respectively. The optically anisotropic layers 5, 9 have an optical anisotropy exhibited by orientation of the liquid-crystalline compound.

The liquid crystal cell shown in FIG. 1 comprises an upper substrate 6 and a lower substrate 8, and the liquid crystal layer composed of liquid crystal molecules 7 held therebetween. Each of the surfaces of the substrates 6 and 8 in contact with the liquid crystal molecules 7 (occasionally referred to as "inner surfaces", hereinafter) has an alignment layer (not shown) formed thereon, in order to align the liquid crystal molecules in parallel while keeping a pre-tilt angle under no applied voltage or a low applied voltage. Each of the substrates 6 and 8 also has, on the inner surfaces thereof, a transparent electrode (not shown) capable of applying voltage to the liquid crystal layer composed of the liquid crystal molecules 7. In the present invention, a product $\Delta n \cdot d$ of the thickness d (μm) and the refractive index anisotropy $\Delta n$ is preferably adjusted to 0.1 to 1.5 μm, more preferably 0.2 to 1.5 μm, still more preferably 0.2 to 1.2 μm, and furthermore preferably 0.6 to 0.9 μm. These ranges ensure high luminance in the white level display under application of the white level voltage, and can consequently provide a bright, high-contrast display device. There are no specific limitations on the liquid crystal material to be used, wherein in an embodiment in which an electric field is applied between the upper and lower substrates 6 and 8, a liquid crystal material having a positive dielectric anisotropy, such that the liquid crystal molecules 7 can respond in parallel with the electric field, is used.

In an exemplary case where the liquid crystal cell is configured as an OCB-mode liquid crystal cell, it is allowable to use a nematic liquid crystal material having a positive dielectric anisotropy, $\Delta n$=0.08 and $\Delta \in$=5 or around between the upper and lower substrates 6, 8. There are no specific limitations on the thickness d of the liquid crystal layer, wherein it can be set to 6 μm or around when a liquid crystal having characteristics of the above-described ranges is used. Because the brightness varies depending on the product $\Delta n \cdot d$ of the thickness d and the refractive index anisotropy $\Delta n$ under application of the white level voltage, it is preferable to adjust $\Delta n \cdot d$ of the liquid crystal layer under no applied voltage within a range from 0.6 to 1.5 μm, in view of obtaining a sufficient level of brightness under application of the while level voltage.

In the OCB-mode liquid crystal display device, a chiral material, generally added for TN-mode liquid crystal display devices, is scarcely used because of its possibility of degrading the dynamic response characteristics, but may sometimes be used in order to reduce orientation failure. For the case where a multi-domain structure is adopted, the chiral material is advantageous in adjusting orientation of the liquid crystal molecules at the boundary regions between every adjacent domains. The multi-domain structure refers to a structure in which a single pixel of the liquid crystal display device is divided into a plurality of domains. Adoption of the multi-domain structure to the OCB-mode device is preferable in view of improving the viewing angle characteristics such as luminance and color tone. More specifically, averaging through configuration of each pixel with two or more (preferably 4 or 8) domains, differing from each other in the initial orientation state, makes it possible to reduce viewing-angle-dependent biasing in the luminance and color tone. Similar effect can be obtained also by configuring each pixel using two or more domains differing from each other, in which direction of orientation of the liquid crystal molecules can continuously vary under voltage application.

The transparent films 13a, 113a are typically composed of a cellulose acylate film, and have a ratio Re/Rth(450 nm) of Re and Rth at 450 nm of 0.4 to 0.95 times as large as Re/Rth (550 nm) at 550 nm, having Re/Rth(650 nm) at 650 nm of 1.05 to 1.93 times as large as Re/Rth(550 nm), and having Rth at 550 nm ranging from 70 nm to 400 nm. The transparent films 13a, 113a may function as supports for the optically anisotropic layers 5, 9, or may function as protective films for the polarizing films 1, 101, or may function as the both. In other words, the polarizing film 1 and the transparent film 13a and the optically anisotropic layer 5, or the polarizing film 101 and the transparent film 113a and the optically anisotropic layer 9 may be incorporated as an integrated stack inside the liquid crystal display device, or may respectively be incorporated as an independent component. It is also allowable to dispose an additional protective film for the polarizing film between the transparent film 13a and the polarizing film 1, or between the transparent film 113a and the polarizing film 101, but it is preferable to dispose no protective film. It is preferable that a slow axis 14a of the transparent film 13a and a slow axis 114a of the transparent film 113a are aligned substantially in parallel or normal to each other. The normal alignment of the slow axes 14a, 114a of the transparent films 13a, 113a makes it possible to cancel their birefringence with each other, and consequently to reduce degradation of optical characteristics of light normally incident on the liquid crystal display device. The parallel alignment of the slow axes 14a, 114a makes it possible to compensate any residual retardation possibly remaining in the liquid crystal layer by birefringence of the protective film.

The transmission axes 2, 102 of the polarizing films 1, 101, the directions of the slow axes 14a, 114a of the transparent films 13a, 113a, and direction of orientation of the liquid crystal molecules 7 are adjusted within optimum ranges depending on materials used for the individual components, display mode, stacked structure of the component and so forth. More specifically, the transmission axis 2 of the polarizing film 1 and the transmission axis 102 of the polarizing film 101 are arranged so as to be substantially orthogonal to each other. The liquid crystal display device of the present invention is, however, not limited to this configuration.

The optically anisotropic layers 5, 9 are disposed between each of the transparent films 13a, 113a and the liquid crystal cell. The optically anisotropic layers 5, 9 are layers composed of a composition containing a rod-formed or disk-formed compound. In the optically anisotropic layer, molecules of the liquid-crystalline compound are fixed in a predetermined orientation state. Mean orientation directions 5a, 9a of the molecular symmetry axes of the liquid-crystalline compound in the optically anisotropic layers 5, 9, at the interface at least on the transparent films 13a, 113a sides cross 45° to the in-plane slow axes 14a, 114a of the transparent films 13a, 113a. Arrangement according to this relation allows the optically anisotropic layers 5, 9 to exhibit retardation to the incident light from the direction of the normal line to thereby successfully avoid light leakage, and to fully exhibit the effects of the present invention to the incident light from the oblique direction. Also at the interface on the liquid crystal cell side, the mean orientation direction of the molecular symmetry axes of the optically anisotropic layers 5, 9 preferably cross approximately 45° to the in-plane slow axes 14a, 114a of the transparent films 13a, 113a. It is also preferable that the mean orientation direction 5a of the molecular symmetry axes of the molecules of the liquid-crystalline compound of the optically anisotropic layer 5 on the polarizing film side (on the transparent film interface side) is aligned approximately at 45° to the transmission axis 2 of the polarizing film 1 which resides more closer thereto. Similarly, it is also preferable that the mean orientation direction 9a of the molecular symmetry axes of the molecules of the liquid-crystalline compound of the optically anisotropic layer 9 on the polarizing film side (on the transparent film interface side) is aligned approximately at 45° to the transmission axis 102 of the polarizing film 101 which resides more closer thereto. Arrangement based on these relations enables light switching depending on a sum of retardation generated by the optically anisotropic layer 5 or 9 and retardation generated by the liquid crystal layer, and this makes it possible to fully exhibit the effects of the present embodiment to the incident light in the oblique direction.

Next, principle of the image display on the liquid crystal display device shown in FIG. 1 will be explained.

In an operational state under application of a drive voltage corresponded to the black level display to the individual transparent electrodes (not shown) on the liquid crystal cell substrates 6, 8, the liquid crystal molecules 7 in the liquid crystal layer show a bend orientation, in which the in-plane retardation thereof is cancelled by the in-plane retardation of the optically anisotropic layers 5, 9, allowing polarization state of the incident light to remain almost unchanged. Because the transmission axes 2, 102 of the polarizing films 1, 101 cross orthogonal to each other, light incident on the lower side (e.g., back electrode side) is polarized by the polarizing film 101, passes the liquid crystal cell 6 to 8 while retaining the polarization state thereof unchanged, and intercepted by the polarizing film 1. In other words, the liquid crystal display shown in FIG. 1 realizes an ideal black level display in the operational state. In contrast, in an operational state under application of a drive voltage corresponded to the white level display to the transparent electrodes (not shown), the liquid crystal molecules 7 in the liquid crystal layer show another bend orientation different from that corresponded to the black level display, and the in-plane retardation in the front view varies from that of the black level display. The in-plane retardation of the liquid crystal layer in this case cannot be cancelled by the in-plane retardation of the optically anisotropic layers 5, 9, so that light passing through the liquid crystal cell 6 to 8 is varied in the polarization state, and can come out through the polarizing film 1. This is observed as the white level display.

The conventional OCB-mode device has suffered from a problem of low contrast in the oblique view despite a high contrast in the front view. In a black state, the front view can provide a high contrast by virtue of compensation between the liquid crystal cell and the optically anisotropic layers, but the oblique view causes birefringence and rotation of the axis of polarization of the liquid crystal molecules 7. In addition, the angle of crossing of the transmission axes 2, 102 of the upper and lower polarizing films 1, 101 is orthogonally 90° in the front view, but shifts from 90° in the oblique view. Due to two these factors, the conventional device raised a problem of lowered contrast in the oblique view ascribable to leakage of light. In the liquid crystal display device of the present invention configured as shown in FIG. 1, the contrast is improved by reducing the leakage of light in the oblique view in a black state, making use of the transparent film 13a (or 113a) having no coincidence among Re/Rth for R, G and B, but has optical characteristics satisfying specific conditions.

In more detail, the present invention uses a transparent film having the above-described optical characteristics, to thereby optically compensate incident light respectively having a wavelength of R, G and B, coming from oblique direction, with slow axes and retardations differed depending on wavelength of the light. The present invention further makes it possible to effect the unique compensation system for the OCB orientation in all wavelength ranges, by disposing the optically anisotropic layers (5 and 9 in FIG. 1) in which orientation of the molecules of the liquid-crystalline compound are fixed, so that the mean orientation direction on the transparent film side of the molecular symmetry axes of the molecules of the liquid-crystalline compound crosses 45° to the slow axis of the transparent film. As a consequence, the viewing-angle-dependent contrast in a black state is improved to a considerable degree, and the viewing-angle-dependent coloration of the black level display is also distinctively reduced. In particular, a distinctive improvement is also made in asymmetry in the coloration which has been observed when the display is viewed from the left and right sides, that is, from the directions of azimuth=0° and azimuth=180°, and polar angle=60°.

It is to be noted that the wavelengths of R, G and B adopted by the present invention are 650 nm, 550 nm and 450 nm, respectively. The R, G and B wavelengths are not always represented by these wavelengths, but are considered as appropriate for specifying the optical characteristics capable of expressing the effects of the present invention.

Figure 2:
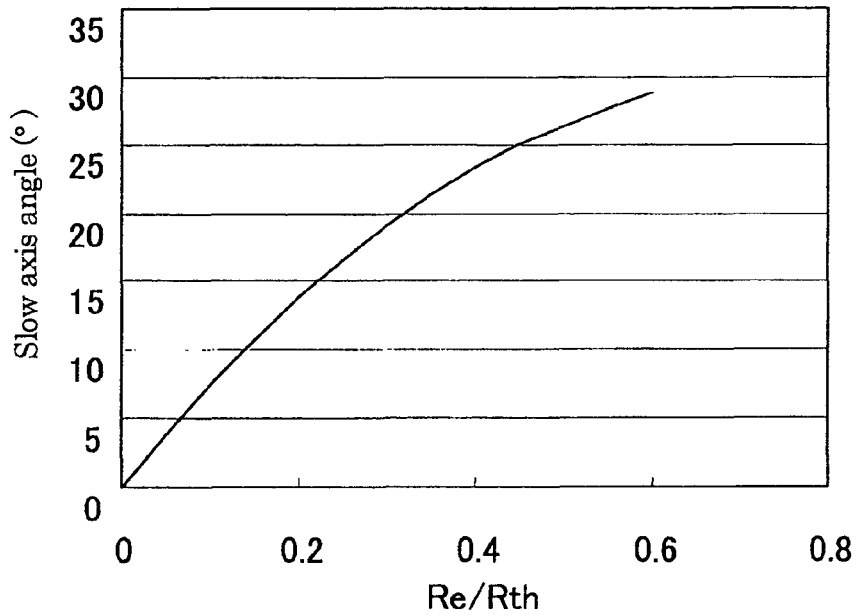
FIG. 2 is a graph showing optical characteristics of an exemplary transparent film used for the present invention.

In particular, the present invention pays a special attention to Re/Rth, or ratio of Re and Rth. This is because a Re/Rth value determines two intrinsic polarization axes in an oblique propagation of light in a birefringent medium. Two axes of the intrinsic polarization in the oblique propagation of light in the birefringent medium respectively lie in the directions of the long axis and short axis of a sectional plane appeared when an optical indicatrix is cut in the direction normal to the direction of propagation of light. FIG. 2 shows an exemplary calculated result of a relation between an angle of one of two intrinsic polarization axes, the slow axis herein, and Re/Rth, for the case where the light comes obliquely into the transparent film used for the present invention. The direction of propagation of the light in FIG. 2 was assumed as having azimuth=45' and polar angle=34°. It is found from FIG. 2 that angle of the slow axis is unconditionally determined by Re/Rth, independent of wavelength of the incident light. How the polarization state of the incident light will change during the passage through the transparent film is determined principally by the bearing of the slow axis of the transparent film, and by the retardation of the transparent film. In the prior art, values of Re/Rth, and consequently the angles of the slow axes, were approximately same irrespective of the individual wavelengths for R, G and B. In contrast, the present invention optimizes both of the bearing of the slow axis and retardation, which are main factors determining changes in the polarization state, for each wavelength of R, G and B, by specifying the relation of Re/Rth for each wavelength of R, G and B. The present invention also adjusts the value of Re/Rth of the transparent film depending on wavelength, so as to simultaneously compensate two factors, that are the retardation, and shifting from the front of the apparent transmission axes of the upper and lower polarizing films, when the oblique light propagated through the transparent film passes through the optically anisotropic layer having a fixed orientation of a liquid-crystalline compound, and further passes through a liquid crystal layer having a bend orientation. More specifically, it was made possible to eliminate difference in the polarization state for R, G and B, which has been caused by wavelength dispersion of the optically anisotropic layer and the liquid crystal cell layer, by increasing Re/Rth as the wavelength increases. This enables a complete compensation and moderates degradation in the contrast. It can therefore be said that an almost complete compensation over the entire visible light region can be obtained by determining the parameters of the film through representing the entire visible light region with R, G and B.

Polar angle and azimuth will now be defined. Polar angle is an angle of inclination away from the direction of the normal line on the film surface, that is, the z-axis shown in FIG. 1, so that the direction of the normal line on the film surface, for example, lies in the direction of polar angle=0°. Azimuth expresses a bearing rotated counter-clockwisely with reference to the positive direction of the x-axis, wherein, for example, the positive direction of the x-axis can be expressed by azimuth=0°, and the positive direction of the y-axis can be expressed by azimuth=90°. Oblique directions most causative of leakage of light in a black state are defined principally by azimuth=0°, 90°, 180° and 270° with a polar angle of not zero, because the polarization axis of the polarizing layer is set to +45°.

Figure 3:
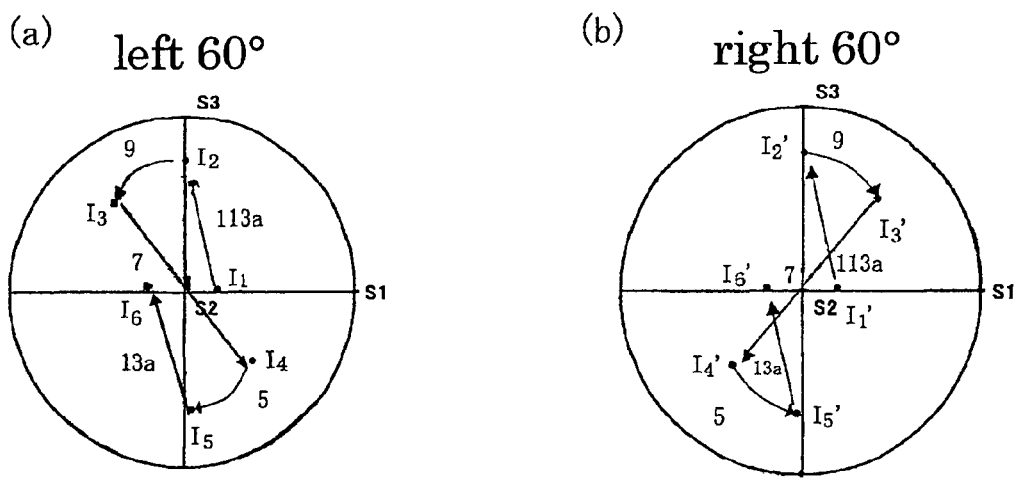
FIG. 3 is a schematic drawing of the Poincare sphere used for explaining changes in polarization state of incident light in the liquid crystal display device of the present invention.
Figure 5:
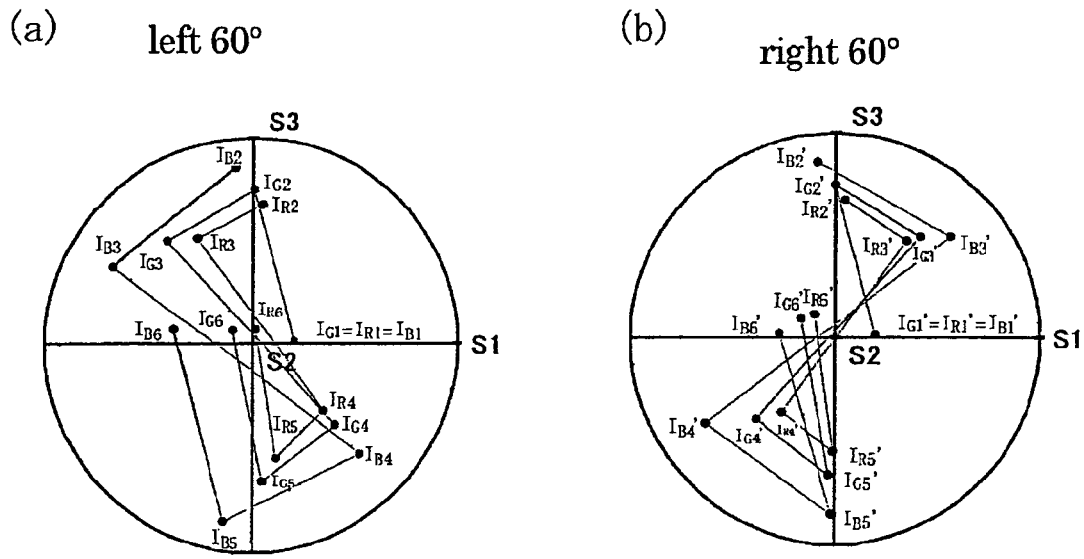
FIG. 5 is a schematic drawing of the Poincare sphere used for explaining changes in polarization state of incident light in an exemplary conventional liquid crystal display device.
Figure 6:
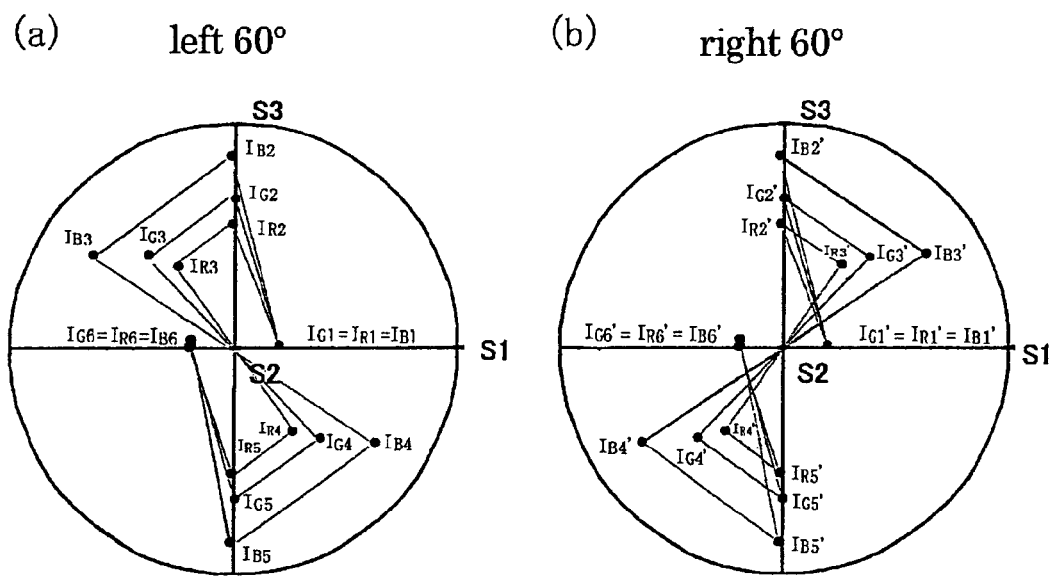
FIG. 6 is a schematic drawing of the Poincare sphere used for explaining changes in polarization state of incident light in the liquid crystal display device of the present invention.

In order to further detail the effect of the present invention, polarization state of light incident on the liquid crystal display device was shown on the Poincare sphere in FIG. 3. In FIG. 3, axis S2 normally penetrates the sheet from this side to the back behind, and FIG. 5 is a view from the positive direction of axis S2. Although FIG. 3 in a two-dimensional expression indicates displacement of points before and after a change in the polarization status using a straight arrow in the drawing, any actual changes in the polarization state of the light caused by passage through the liquid crystal layer or the transparent film can be expressed on the Poincare sphere by rotation by a specific angle around a specific axis determined corresponding to the individual optical characteristics. The same will apply also to FIGS. 5 and 6.

FIG. 3A is a drawing showing changes in the polarization state of a 60° incident light from the left to the liquid crystal display device shown in FIG. 1, and FIG. 3B is a drawing showing changes in the polarization state of a 60° incident light from the right. Calculations herein were made assuming that the optical characteristics of the transparent films 13a, 113a and optical characteristics of the optically anisotropic layers 5, 9 are under the same conditions with those for the Poincare sphere shown in FIG. 6 described later. The 60° incident light G from the left causes changes in the polarization state as indicated by points on the Poincare sphere in FIG. 3A. More specifically, polarization state $I_1$, of the light after passing through the polarizing film 101 then reaches $I_2$ after passing through the transparent film 113a, reaches $I_3$ after passing through the optically anisotropic layer 9, reaches $I_4$ after passing through the liquid crystal layer 7 of the liquid crystal cell in a black state, reaches $I_5$ after passing through the optically anisotropic layer 5, reaches $I_6$ after passing through the transparent film 13a, and is intercepted by the polarizing film 1, to thereby display an ideal black image. On the other hand, also the 60° incident light G from the right sequentially changes the polarization state thereof as $I_1' \rightarrow I_2' \rightarrow I_3' \rightarrow I_4' \rightarrow I_5' \rightarrow I_6'$. Discussing now the changes in the polarization state, it is found that the changes in the polarization state caused by passage through the optically anisotropic layers 9, 5 and through the liquid crystal layer 7 are mirror-symmetric between the 60° incident lights from the left and right, whereas the changes in the polarization state caused by passage through the transparent films 113a, 13a coincide between the 60° incident lights from the left and right. In order to reduce the light leakage and color shift on the left and light, it is necessary to satisfy such compensation conditions simultaneously for the left and right, and for any wavelengths. In other words, not only for G light, but also for each of R (red) and B (blue) incident lights in the visible light region, it is necessary that positions for $I_6$ and $I_6'$ coincide, and that the positions fall on elsewhere indicating the polarization state possibly intercepted by the polarizing film 1. It is to be noted that the above-described transitions expressed by the straight lines in the drawing do not necessarily indicate linear transitions on the Poincare sphere.

Figure 4:
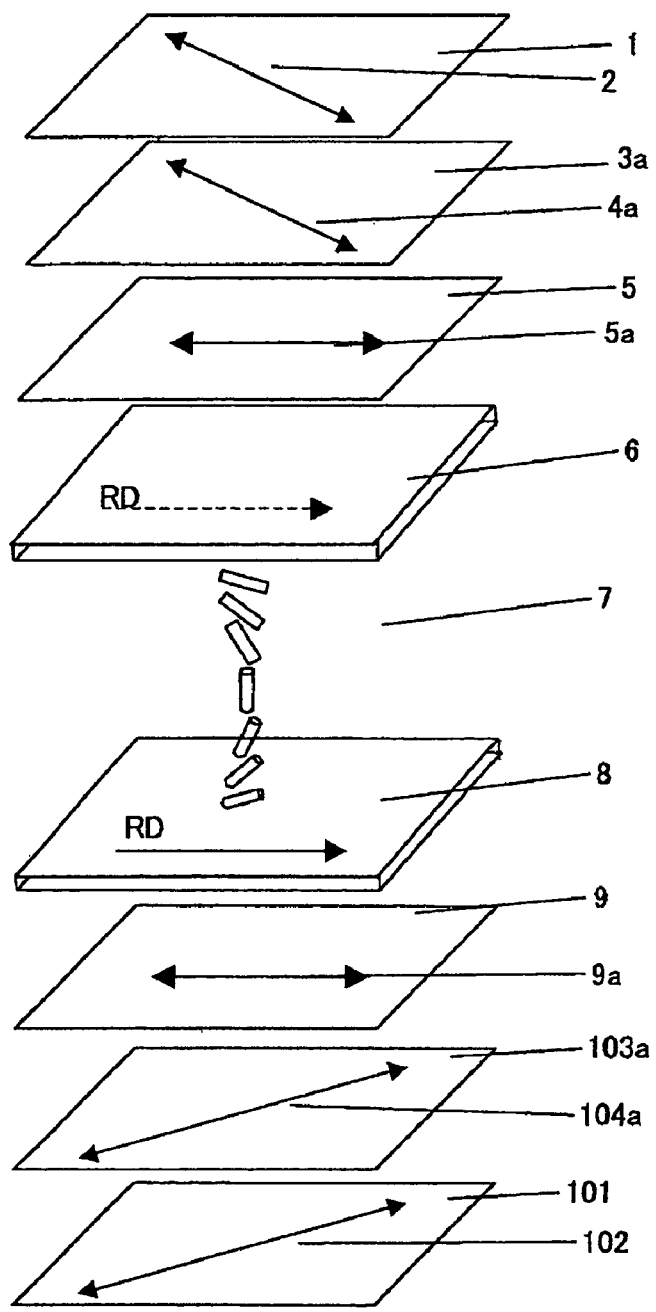
FIG. 4 is a schematic drawing showing an exemplary configuration of a conventional liquid crystal display device based on the OCB mode.

In the conventional OCB-mode liquid crystal display device as shown in FIG. 4, such as being disclosed for example in Japanese Laid-Open Patent Publication "Tokkaihei" No. 11-316378, there are no transparent films 113a, 13a which have Re/Rth representing the above-described wavelength dependence provided therein, and instead, provided are the transparent supports 103a, 3a for the optically anisotropic layers 5, 9, for example. The transparent supports 103a, 3a are used for the purpose of supporting the optically anisotropic layers 5, 9, and composed of a general polymer film. They do not show the wavelength dependence of Re/Rth such as shown by the transparent films 113a, 13a, and have identical Re and Rth for all wavelengths of R, G and B. As a consequence, the conventional OCB-mode liquid crystal display device would be successful in canceling the front retardation between the liquid crystal cell and the optically anisotropic layer, under voltage application or in a black state, to thereby obtain a desirable level of blackness in the front view, but was unsuccessful in completely suppressing light leakage in a black state in the oblique view. The conventional device has therefore been suffered from a problem of coloration, due to poor viewing-angle-dependent contrast, and incapability of achieving compensation for all wavelengths.

For more detailed explanation, polarization states of R, G and B lights incident on the conventional OCB-mode liquid crystal display device configured as shown in FIG. 4 were calculated, and results were shown on the Poincare spheres in FIGS. 5A and 5B. FIG. 5A shows changes in the polarization states for each of R, G and B of a 60° incident light from the left, and FIG. 5B shows changes in the polarization states for each of R, G and B of a 600 incident light from the right. In the drawing, polarization state of R is represented by $I_R$, polarization state of G is represented by $I_G$, and polarization state of B is represented by $I_B$. Calculations on the configuration of the conventional OCB-mode liquid crystal display device were made, assuming that the transparent supports 3, 103 shown in FIG. 4 have values of Re=45 nm and Rth=160 nm for all wavelengths of R, G and B, and that the optically anisotropic layers 5, 9 have a value of Re=30 nm. First in FIG. 5A, polarization states $I_{R1}$, $I_{G1}$ and $I_{B1}$ observed after passage through the polarizing film 101 are identical. Placing now a focus on the changes in the polarization state of light B, it can be understood that the 60° incident B light from the left, after passage through the transparent support 103, has polarization state $I_{B2}$ as being shifted in the same direction with the direction of transition caused by passage through the optically anisotropic layer 9, whereas the 60° incident B light from the right, after passage through the transparent support 103, has polarization state $I_{B2}'$ as being shifted in the direction opposite to the direction of transition caused by passage through the optically anisotropic layer 9. In other words, the transparent support 103 can differently affect the polarization states of the incident lights from the left and right. This consequently results not only in disagreement among positions of the final polarization states $I_{R6}$, $I_{G6}$ and $I_{B6}$ for R, G and B components of the 60° incident light from the left, and among positions of the final polarization states $I_{R6}'$, $I_{G6}'$ and $I_{B6}'$ for R, G and B components of the 60° incident light from the right, but also in complete disagreement between the 60° incident lights from the left and right. This is causative of the light leakage on the left and right in a black state, and the color shift on the left and right, which were only hardly improved at the same time in the conventional device.

In the present invention, the light leakage on the left and right in a black state, and the color shift on the left and right are reduced at the same time, by providing the transparent film exhibiting the specific optical properties. For more detailed explanation, polarization states of R, G and B lights incident on the OCB-mode liquid crystal display device of the present invention configured as shown in FIG. 1 were calculated, and results were shown on the Poincare spheres in FIGS. 6A and 6B. FIG. 6A shows changes in the polarization states for each of R, G and B of a 60° incident light from the left, and FIG. 6B shows changes in the polarization states for each of R, G and B of a 60° incident light from the right. In the drawing, polarization state of R is represented by $I_R$, polarization state of G is represented by $I_G$, and polarization state of B is represented by $I_B$. Calculations were made assuming that the transparent films 113, 13 have values of Re/Rth(450 nm)=0.17 measured at 450 nm, Re/Rth(550 nm)=0.28 measured at 550 nm, Re/Rth(650 nm)=0.39 measured at 650 nm, and Rth=160 nm measured at 550 nm. The Re value for the optically anisotropic layers 5, 9 was assumed as being identical to that on the Poincare sphere shown in FIG. 5.

As shown in FIGS. 6A and 6B, polarization states of all of the incident R light, G light and B light from the left and right after passing through the transparent films 113a, 13a change into positions corresponded to polarization states close to S1=0, while being shifted as reflecting the wavelength dependence of Re/Rth of the transparent film 113a. This shift makes it possible to cancel the disagreement in the polarization state of R light, G light and B light caused by wavelength dispersion of the optically anisotropic layer 9, 5 and the liquid crystal layer 7. This consequently makes it possible to equalize the final transition points of the incident lights from the left and right, irrespective of wavelength. It is therefore made possible to improve the light leakage in a black state on the left and right, and color shift on the left and right at the same time.

The present invention adopts the transparent film having optical characteristics differing in wavelength dispersion of retardation between incident lights coming from the direction of the normal line and from the direction inclined away therefrom, for example from the direction of polar angle=60°, and makes an intentional use of the optical characteristics of such transparent film for optical compensation, to thereby improve the light leakage in a black state on the left and right, and color shift on the left and right at the same time. So far as being based on this principle, the scope of the present invention is by no means limited to any display modes of the liquid crystal layer, allowing the present invention to be applied to any liquid crystal display devices having the liquid crystal layer based on any display modes of VA mode, IPS mode, ECB mode, TN mode and OCB mode.

The liquid crystal display device of the present invention is not limited to those having the configuration shown in FIG. 1, and may comprise other components. For example, a color filter may be disposed between the liquid crystal cell and the polarizing film. When the device is used as a transmissive device, it is also allowable to dispose, on the back side thereof, a back light using a cold-cathode or hot-cathode fluorescent tube, light emitting diode, field emission device, or electroluminescence device.

The liquid crystal display device of the present invention include those of direct image viewing type, image projection type and light modulation type. A particularly effective embodiment of the present invention is such that three-terminal or two-terminal semiconductor device such as TFT or MIM is applied to an active-matrix liquid crystal display device. Of course, also effective is an embodiment in which the device of the present invention is applied to a passive-matrix liquid crystal display device represented by STN type device based on time-sharing operation.

Next paragraphs will further detail optical characteristics, source materials, production methods and so forth of components used for the liquid crystal display device of the present invention.

[Optical Compensation Film]

The optical compensation film of the present invention contributes to expansion of the viewing angle and contrast, and moderation of the color shift in the liquid crystal display device, in particular in the OCB-mode liquid crystal display device. The optical compensation film of the present invention may be disposed between the polarizing plate on the observer's side and the liquid crystal cell, or between the polarizing plate on the back side and the liquid crystal cell, or at both locations. The film may typically be incorporated into the liquid crystal display device, as an independent component, or as a component of the polarizing plate in which the optical compensation film adds optical properties to the protective film protecting the polarizing film, to thereby make the protective film function also as the transparent film.

The optical compensation film of the present invention comprises at least the transparent film and the optically anisotropic layer having in-plane optical anisotropy. The optical compensation film may further have, as being disposed between the transparent film and the optically anisotropic layer, an alignment layer controlling orientation of the liquid-crystalline compound in the optically anisotropic layer. It is also allowable that each of the transparent film and the optically anisotropic layer comprises two or more layers, so far as the optical characteristics described later can be satisfied. First, the individual constituents of the optical compensation film of the present invention will be detailed.

[Transparent Film]

The transparent film composing the optical compensation film of the present invention has a ratio Re/Rth(450 nm) of Re and Rth at 450 nm in the visible light region of 0.4 to 0.95 times, more preferably 0.4 to 0.9 times, and still more preferably 0.6 to 0.8 times as large as Re/Rth(550 nm) at 550 nm, and has Re/Rth(650 nm) at 650 nm of 1.05 to 1.93 times, preferably 1.1 to 1.9 times, and still more preferably 1.2 to 1.7 times as large as Re/Rth(550 nm). All of Re/Rth values for R, G and B preferably fall in a range from 0.1 to 0.8.

Because the retardation (Rth) in the direction of thickness of the whole transparent film can function as canceling the retardation in the thickness-wise direction of the liquid crystal layer under black level display, a preferable range of which therefore varies depending on embodiments of the individual liquid crystal layers. In an exemplary case where the transparent film is used for optical compensation of an OCB-mode liquid crystal cell (e.g., an OCB-mode liquid crystal cell comprising a liquid crystal layer having product $\Delta n \cdot d$ of the thickness d ($\mu m$) and the refractive index anisotropy $\Delta n$ adjusted to 0.2 to 1.5 $\mu m$), Rth at 550 nm is preferably 70 to 400 nm, more preferably 100 nm to 400 nm, and still more preferably 160 to 300 nm. Retardation (Re) is generally adjusted to 20 to 110 nm, more preferably 20 to 70 nm, and still more preferably 50 to 70 nm. There are no specific limitations on the thickness of the transparent film, wherein it is preferably 110 $\mu m$ or less, more preferably 40 to 110 $\mu m$, and still more preferably 80 to 110 $\mu m$.

The transparent film satisfying the above optical characteristics Re and Rth can be produced by selecting source materials, amounts of use thereof, conditions for the production and so forth, and by adjusting these parameters within desired ranges.

There are no specific limitations on materials for composing the transparent film. For example, either of stretched birefringent polymer film, and optically anisotropic layer formed by fixing a liquid-crystalline compound to a specific orientation may be adoptable. The transparent film is not limited to those having a single-layer structure, but may have a multi-layered structure in which a plurality of layers are stacked. In an embodiment of the multi-layered structure, the individual films need not be composed of the same material, wherein the transparent film may compose a stack typically with an optically anisotropic layer comprising a polymer film and a liquid-crystalline compound. In an embodiment of the stacked structure, a coated-type stack comprising a layer formed by coating is preferred to a stack of a stretched polymer film, considering the thickness.

With respect to use of a liquid-crystalline compound for producing the transparent film, the optically anisotropic layer produced by fixing the liquid-crystalline compound to a specific orientation, used in a form of a single layer or a multi-layered stack, can exhibit desired optical characteristics, by virtue of a variety of orientation modes of the liquid-crystalline compound. More specifically, the transparent film may be embodied as comprising a support, and one or more optically anisotropic layers formed on the support. Retardation of the whole transparent film thus embodied can be adjusted based on optical anisotropy of the optically anisotropic layer. The liquid-crystalline compound can be classified, based on the molecular form, into rod-formed, liquid-crystalline compound and disk-formed, liquid-crystalline compound. Each of these forms is further classified into low-molecular-weight type and high-molecular-weight type, both of which applicable. Any transparent film comprising the liquid-crystalline compound is produced preferably by using the rod-formed, liquid-crystalline compound or the disk-formed liquid-crystalline compound, and more preferably by using the rod-formed, liquid-crystalline compound having a polymerizable group, or the disk-formed, liquid-crystalline compound having a polymerizable group.

The transparent film may be composed of a polymer film. The polymer film may be a stretched polymer film, or may be combined with a coated polymer layer. Materials generally used for the polymer film include synthetic polymers (e.g., polycarbonate, polysulfone, polyether sulfone, polyacrylate, polymethacrylate, norbornene resin, triacetyl cellulose). Also preferably used are cellulose acylate-base films produced by using a composition in which cellulose acylate is added with a rod-formed compound. Proper adjustment of species of aromatic compound, amount of addition thereof and conditions for film stretching makes it possible to fabricate the polymer film having desired optical characteristics.

<<Cellulose Acylate Film>>

The cellulose acylate film applicable, as the transparent film, to the present invention will further be detailed.

Proper adjustment of species of aromatic compound having aromatic rings (more specifically, an aromatic compound having two aromatic rings), amount of addition thereof and conditions for the production (e.g., conditions for film stretching) makes it possible to fabricate the cellulose acylate film capable of satisfying the optical characteristics of the transparent film of the present invention. It is to be noted that a protective film for the polarizing plate is generally composed of a cellulose acylate film. Use of the above-described cellulose acylate film as one of protective films for the polarizing plate makes it possible to add the polarizing plate with an optical compensation function, without increasing the number of constituents of the polarizing plate.

Combined use of two or more species of rod-formed compounds respectively having a maximum absorption wavelength ($\lambda$max) in UV spectra at 250 nm or shorter is successful in obtaining Re/Rth differed by wavelengths.

Source cottons for cellulose acylate may be those publicly known (see JIII Journal of Technical Disclosure No. 2001-1745, for example). Synthesis of cellulose acylate may also be carried out according to the publicly-known methods (see "Mokuzai Kagaku (Wood Chemistry)", edited by Migita et al., p. 180-190, published by Kyoritsu Shuppan Co., Ltd., 1968). Viscosity mean degree of polymerization of cellulose acylate preferably falls within a range from 200 to 700, more preferably from 250 to 500, and most preferably from 250 to 350. Cellulose ester used for the present invention preferably has a narrow molecular weight distribution in terms of Mw/Mn measured by gel permeation chromatography (Mw is weight average molecular weight, and Mn is number average molecular weight). A specific value of Mw/Mn is preferably 1.5 to 5.0, more preferably 2.0 to 4.5, and most preferably 3.0 to 4.0.

There is no special limitation on the acyl group in the cellulose acylate film, wherein preferable examples include acetyl group and propionyl group, and acetyl group is particularly preferable. Substitution degree of the entire acyl group is preferably 2.7 to 3.0, and more preferably 2.8 to 2.95. The substitution degree of acyl group described in this patent specification refers to a value calculated conforming to ASTM D817. The acyl group is most preferably acetyl group. For the case where the cellulose acetate having acetyl group as the acyl group thereof is used, the degree of acetylation preferably falls within a range from and 59.0 to 62.5%, and more preferably from 59.0 to 61.5%. The degree of acetylation regulated within these ranges is successful in preventing Re from increasing beyond a desired value due to transfer tension during the cast spreading, in reducing in-plane variation thereof, and in suppressing variations in the retardation value depending on temperature and humidity. In view of suppressing the variations in Re and Rth, the substitution degree by an acyl group at the 6-position is preferably adjusted to 0.9 or above.

It is also possible to adjust the wavelength dispersion characteristics, based on a fact that mixed use of two species of cellulose acetate differing in the degree of acetylation within a predetermined range makes it possible to adjust the wavelength dispersion characteristics of the retardation. In this method, as detailed in Japanese Laid-Open Patent Publication "Tokkai" No. 2001-253971, it is preferable to adjust difference (Ac1−Ac2) in the degree of acetylation between cellulose acetate having a maximum degree of acetylation (Ac1) and cellulose acetate having a minimum degree of acetylation (Ac2) within a range from 2.0 to 6.0% (2.0%≦Ac1−Ac2≦6.0%). Mean degree of acetylation of the whole mixture preferably falls within a range from 55.0 to 61.5%. Ratio (P1/P2) of maximum viscosity mean degree of polymerization (P1) and minimum viscosity mean degree of polymerization (P2) of cellulose acetate is preferably 1 or more and less than 2 (1≦P1/P2<2). Viscosity mean degree of polymerization of the whole mixture preferably falls within a range from 250 to 500, and more preferably from 250 to 400.

<<Retardation Control Agent>>

The cellulose acylate film preferably contains a rod-like compound having at least two aromatic rings as a retardation control agent. The rod-like compound preferably has a straight linear molecular structure. The straight linear molecular structure herein means that the rod-like compound shows a straight linear molecular structure as a thermodynamically most stable structure. The thermodynamically most stable structure can be determined by crystallographic analysis or molecular orbital calculation. It is possible, for example, to determine a crystal structure which minimizes heat of formation of the compound, through molecular orbital calculation using a molecular orbital calculation software (e.g., WinMOPAC2000, product of FUJITSU). The linear molecular structure means that the principal chain in the molecular structure forms an angle of 140° or larger, in thus-calculated thermodynamically most stable structure.

The rod-like compounds having at least two aromatic rings are preferably those represented by the formula (1) below:

$$Ar^1-L^1-Ar^2 \qquad \text{Formula (1)}$$

In the above formula (1), each of $Ar^1$ and $Ar^2$ independently represents an aromatic group, and $L^1$ represents a divalent linking group selected from alkylene group, alkenylene group, alkynylene group, —O—, —CO— and any combinations thereof.

In this specification, the term of "aromatic group" is used for any aryl groups (aromatic hydrocarbon groups), any substituted aryl groups, any aromatic heterocyclic groups, or any substituted aromatic heterocyclic groups.

The aryl group and substituted aryl group are more preferable than aromatic heterocyclic group and substituted aromatic heterocyclic group. Heterocycle of the aromatic heterocyclic group is generally unsaturated. The aromatic heterocycle is preferably a five-membered ring, six-membered ring, or seven-membered ring, and is more preferably five-membered ring or six-membered ring. The aromatic heterocycle generally has a largest number of double bonds. The heteroatom is preferably a nitrogen atom, oxygen atom or sulfur atom, and more preferably a nitrogen atom or sulfur atom. Examples of the aromatic heterocycle include furan ring, thiophene ring, pyrrole ring, oxazole ring, isoxazole ring, thiazole ring, isothiazole ring, imidazole ring, pyrazole ring, furazan ring, triazole ring, pyran ring, pyridine ring, pyridazine ring, pyrimidine ring, pyrazine ring, and 1,3,5-triazine ring.

The aromatic ring in the aromatic group is preferably a benzene ring, furan ring, thiophene ring, pyrrole ring, oxazole ring, thiazole ring, imidazole ring, triazole ring, pyridine ring, pyrimidine ring or pyrazine ring, wherein benzene ring is particularly preferable.

Examples of the substituent group in the substituted aryl group and substituted aromatic heterocyclic group include halogen atom (F, Cl, Br, I), hydroxyl, carboxyl, cyano, amino, alkylamino group (e.g., methylamino, ethylamino, butylamino, dimethylamino), nitro, sulfo, carbamoyl, alkylcarbamoyl group (e.g., N-methylcarbamoyl, N-ethylcarbamoyl, N,N-dimethylcarbamoyl), sulfamoyl, alkylsulfamoyl group (e.g., N-methylsulfamoyl, N-ethylsulfamoyl, N,N-dimethylsulfamoyl), ureido, alkylureido group (e.g., N-methylureido, N,N-dimethylureido, N,N,N'-trimethylureido), alkyl group (e.g., methyl, ethyl, propyl, butyl, pentyl, heptyl, octyl, isopropyl, s-butyl, t-amyl, cyclohexyl, cyclopentyl), alkenyl group (e.g., vinyl, aryl, hexenyl), alkynyl group (e.g., ethynyl, butinyl), acyl group (e.g., formyl, acetyl, butylyl, hexanoyl, lauryl), acyloxy group (e.g., acetoxy, butylyloxy, hexanoyloxy, lauryloxy), alkoxygroup (e.g., methoxy, ethoxy, propoxy, butoxy, pentyloxy, heptyloxy, octyloxy), aryloxy group (e.g., phenoxy), alkoxycarbonyl group (e.g., methoxycarbonyl, ethoxycarbonyl, propoxycarbonyl, butoxycarbonyl, pentyloxycarbonyl, heptyloxycarbonyl), aryloxycarbonyl group (e.g., phenoxycarbonyl), alkoxycarbonylamino group (e.g., butoxycarbonylamino, hexyloxycarbonylamino), alkylthio group (e.g., methylthio, ethylthio, propylthio, butylthio, pentylthio, heptylthio, octylthio), arylthio group (e.g., phenylthio), alkylsulfonyl group (e.g., methylsulfonyl, ethylsulfonyl, propylsulfonyl, butylsulfonyl, pentylsulfonyl, heptylsulfonyl, octylsulfonyl), amide group (e.g., acetamide, butylamide group, hexylamide, laurylamide) and non-aromatic heterocyclic group (e.g., morpholyl, pyrazinyl).

The substituent group in the substituted aryl group and substituted aromatic heterocyclic group is preferably a halogen atom, cyano, carboxyl, hydroxyl, amino, alkylsubstituted amino group, acyl group, acyloxy group, amide group, alkoxycarbonyl group, alkoxy group, alkylthio group or alkyl group.

The alkyl portions and alkyl groups in the alkylamino group, alkoxycarbonyl group, alkoxy group and alkylthio group may further include a substituent group. Examples of the substituent group for the alkyl portion and alkyl group include halogen atom, hydroxyl, carboxyl, cyano, amino, alkylamino group, nitro, sulfo, carbamoyl, alkylcarbamoyl group, sulfamoyl, alkylsulfamoyl group, ureido, alkylureido group, alkenyl group, alkynyl group, acyl group, acyloxy group, alkoxy group, aryloxy group, alkoxycarbonyl group, aryloxycarbonyl group, alkoxycarbonylamino group, alkylthio group, arylthio group, alkylsulfonyl group, amide group and non-aromatic heterocyclic group. The substituent group for the alkyl portion and alkyl group is preferably a halogen atom, hydroxyl, amino, alkylamino group, acyl group, acyloxy group, acylamino group, alkoxycarbonyl group or alkoxy group.

$L^1$ represents a divalent linking group selected from alkylene group, alkenylene group, alkynylene group, —O—, —CO— and groups based on any combinations thereof.

The alkylene group may have a cyclic structure. The cyclic alkylene group is preferably cyclohexylene, and particularly preferably 1,4-cyclohexylene. As the chain-formed alkylene group, straight-chain alkylene group is more preferable than the branched alkylene group.

The number of carbon atoms of the alkylene group is preferably 1 to 20, more preferably 1 to 15, still more preferably 1 to 10, further more preferably 1 to 8, and most preferably 1 to 6.

The alkenylene group and alkynylene group preferably has a linear structure rather than a cyclic structure, and preferably has a straight-chain structure rather than a branched structure. The number of carbon atoms of the alkenylene group and alkynylene group is preferably 2 to 10, more preferably 2 to 8, still more preferably 2 to 6, further more preferably 2 to 4, and most preferably 2 (vinylene or ethynylene). The arylene group preferably has the number of carbon atoms of 6 to 20, more preferably 6 to 16, and still more preferably 6 to 12.

Examples of the divalent linking groups based on the combination are listed below:

L-1: —O—CO-alkylene group-CO—O—
L-2: —CO—O-alkylene group-O—CO—
L-3: —O—CO-alkenylene group-CO—O—
L-4: —CO—O-alkenylene group-O—CO—
L-5: —O—CO-alkynylene group-CO—O—
L-6: —CO—O-alkynylene group-O—CO—
L-7: —O—CO-arylene group-CO—O—
L-8: —CO—O-arylene group-O—CO—
L-9: —O—CO-arylene group-CO—O—
L-10: —CO—O-arylene group-O—CO—

In the molecular structure represented by the formula (1), an angle formed between $Ar^1$ and $Ar^2$, while placing $L^1$ in between, is preferably 140° or larger. As the rod-like compound, those represented by the formula (2) below are more preferable:

In the molecular structure represented by the formula (1), an angle formed between $Ar^1$ and $Ar^2$, while placing $L^1$ in between, is preferably 140° or larger. As the rod-like compound, those represented by the formula (2) below are more preferable:

$Ar^1$-$L^2$-X-$L^3$-$Ar^2$            formula (2)

In the above formula (2), each of $Ar^1$ and $Ar^2$ independently represents an aromatic group. The definition and examples of the aromatic group are same as those for $Ar^1$ and $Ar^2$ in the formula (1).

In the formula (2), each of $L^2$ and $L^3$ independently represents a divalent linking group selected from alkylene group, —O—, —CO— and any combinations thereof. The alkylene group preferably has a chain-formed structure rather than a cyclic structure, and more preferably has a straight-chain structure rather than a branched structure.

The number of carbon atoms of the alkylene group is preferably 1 to 10, more preferably 1 to 8, still more preferably 1 to 6, still more preferably 1 to 4, and most preferably 1 or 2 (methylene or ethylene). It is particularly preferable that $L^2$ and $L^3$ express —O—CO— or —CO—O—.

In the formula (2), X represents 1,4-cyclohexylene, vinylene or ethynylene.

Specific examples of the compounds represented by the formula (1) will be shown below.

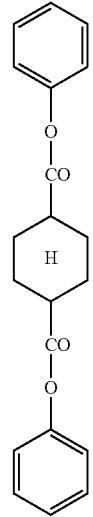

(1)

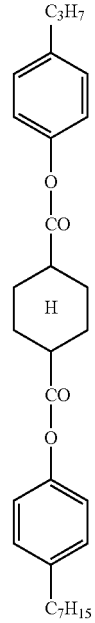

(2)

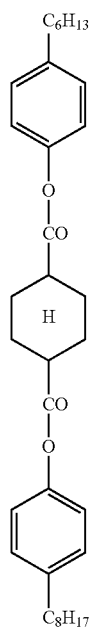 (3)
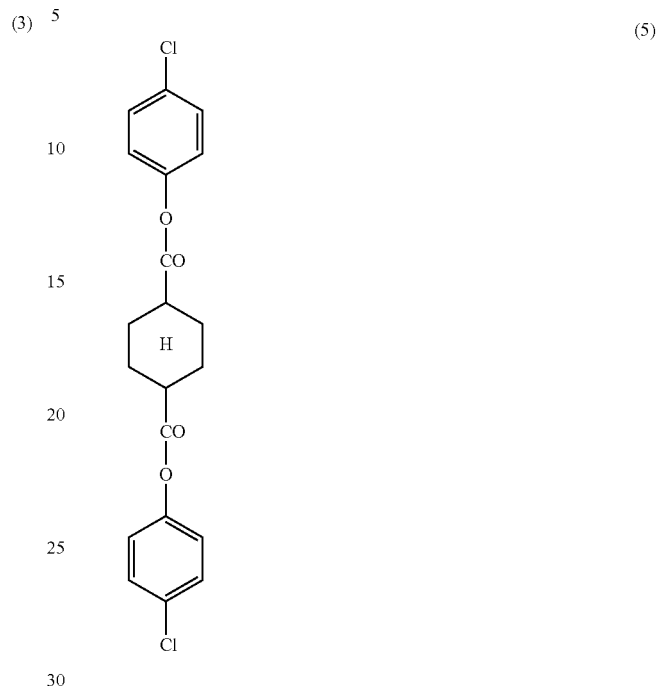
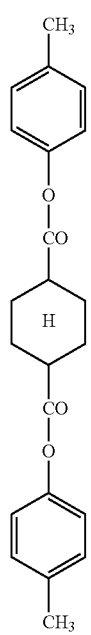 (4)
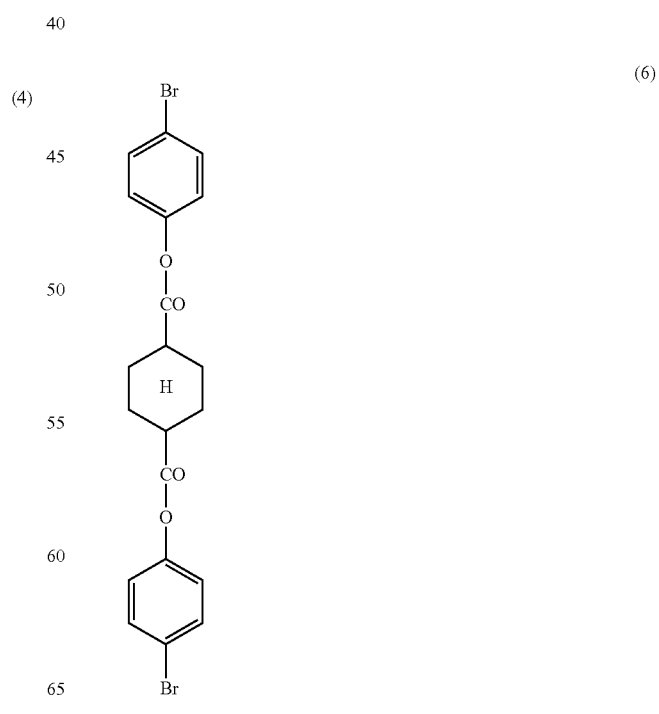

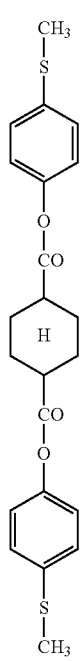 (7)
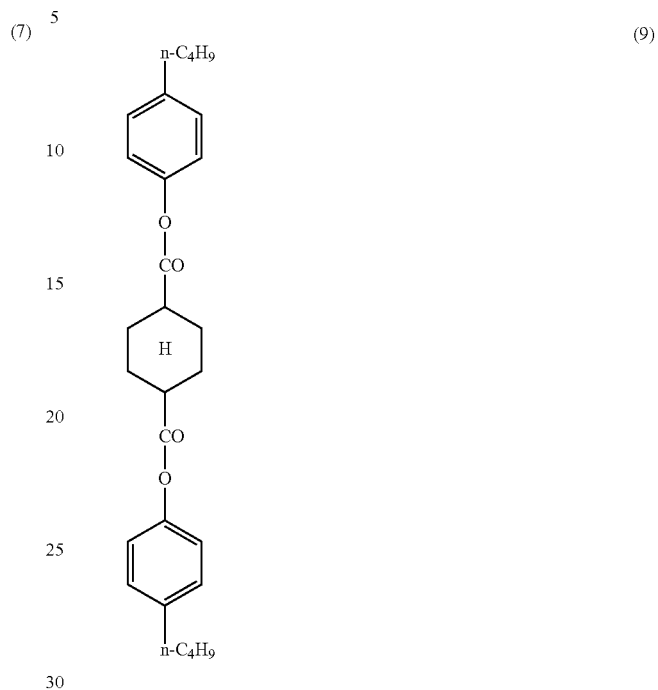 (9)
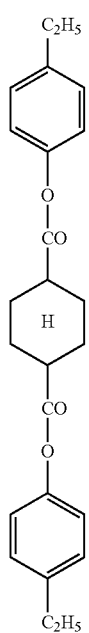 (8)
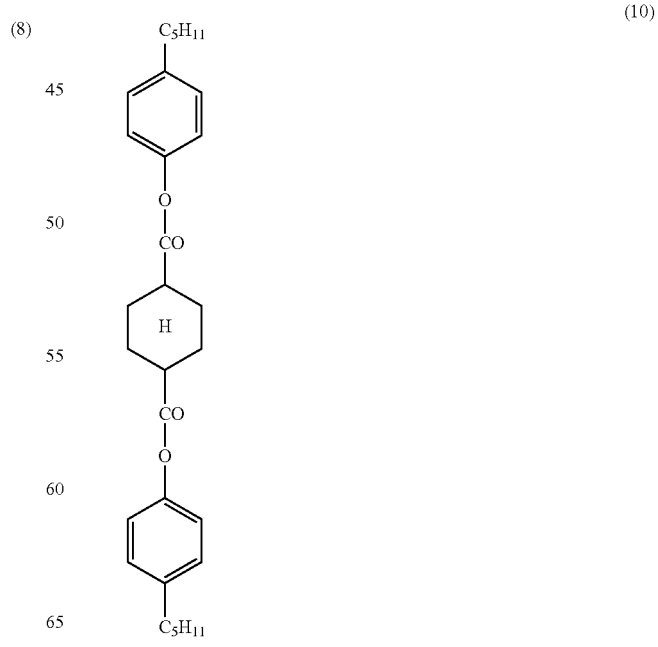 (10)

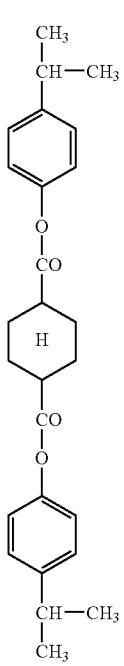 (11)
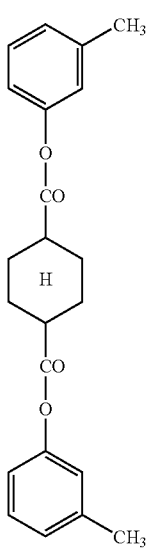 (12)
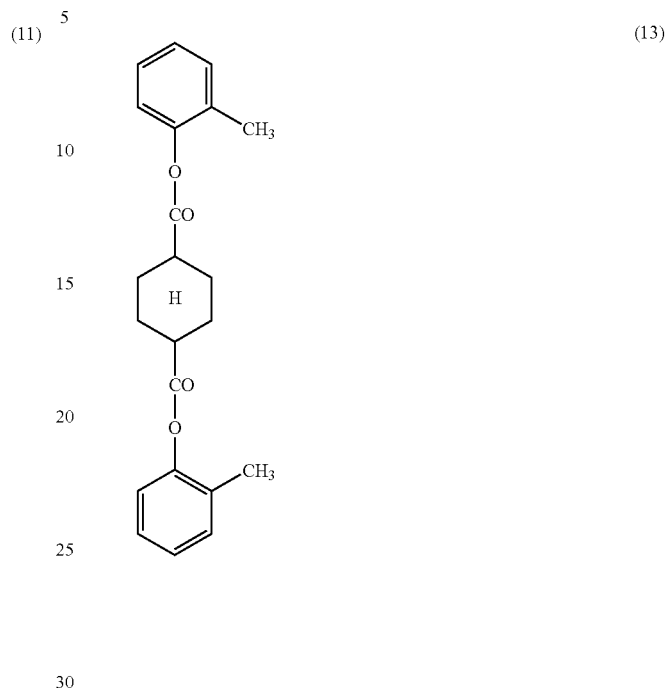 (13)
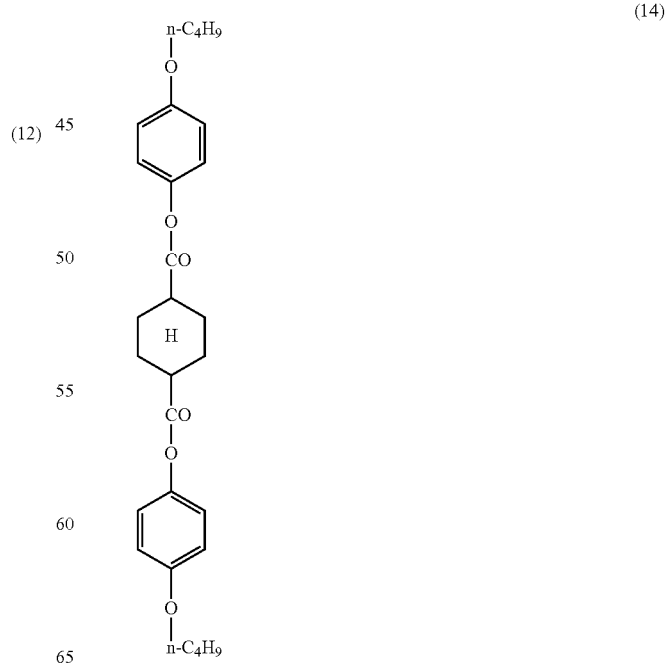 (14)

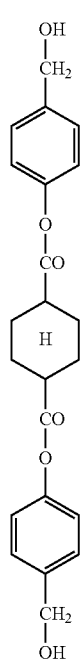
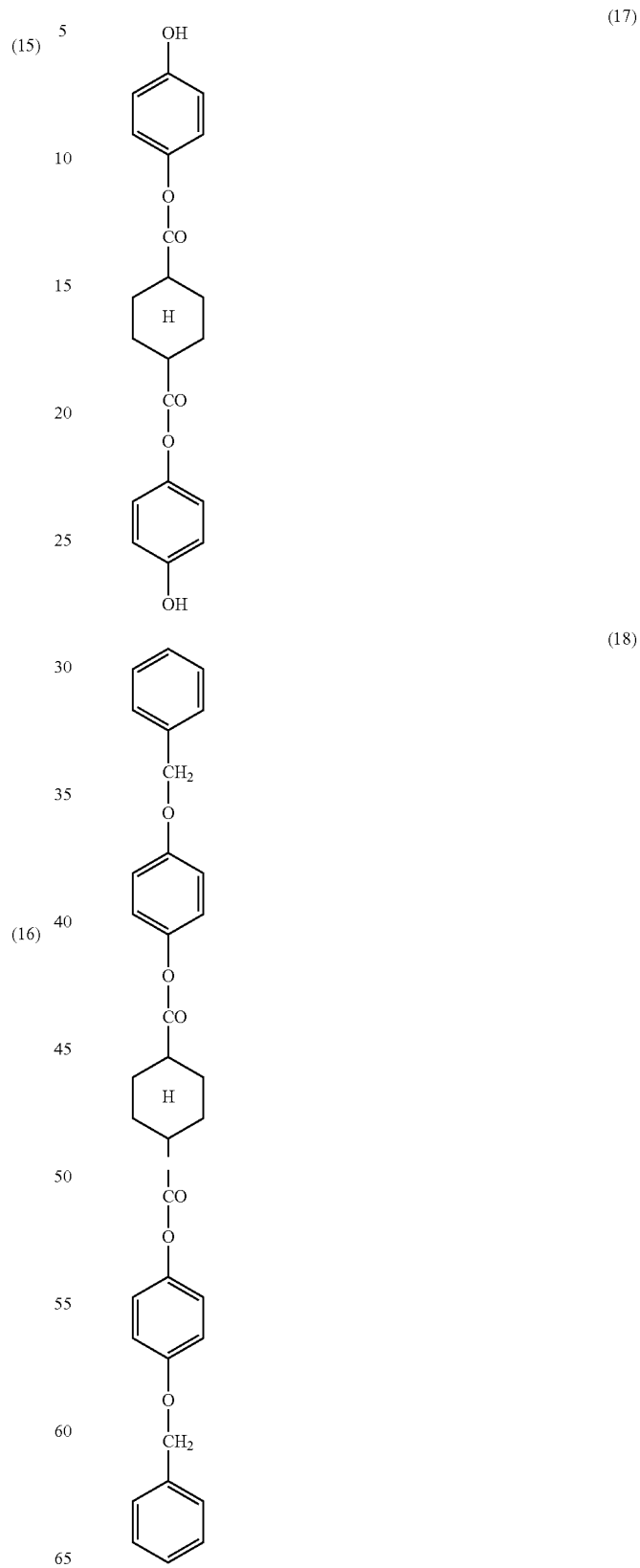

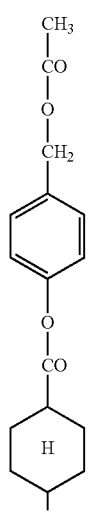
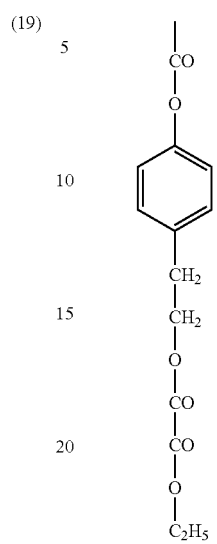
(19)
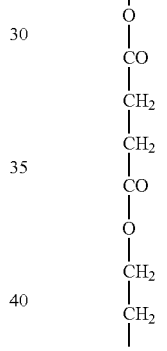
(20)
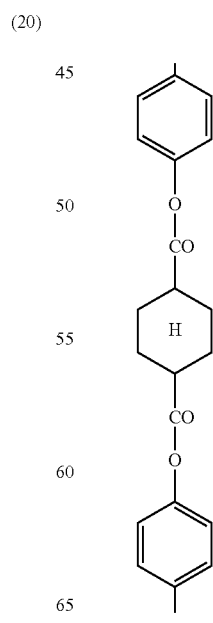
(21)

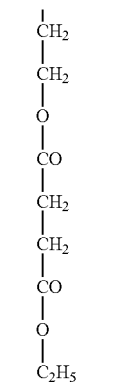
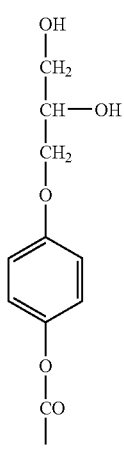
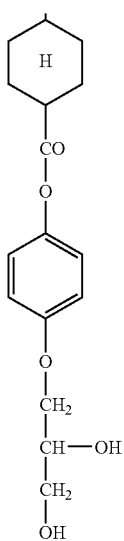
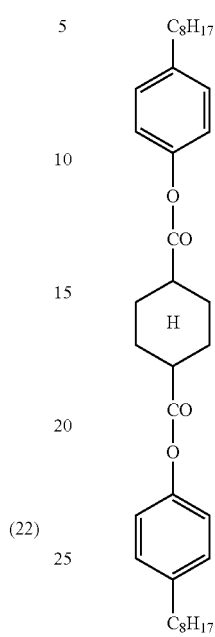
(22)
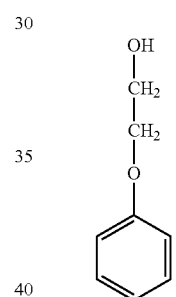
(23)
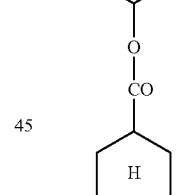
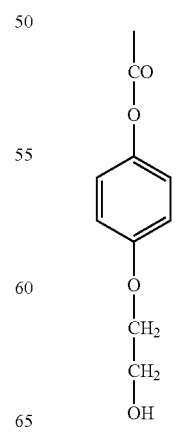
(24)

-continued
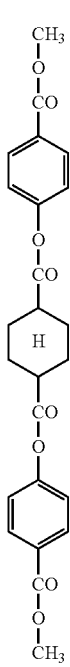 (25)
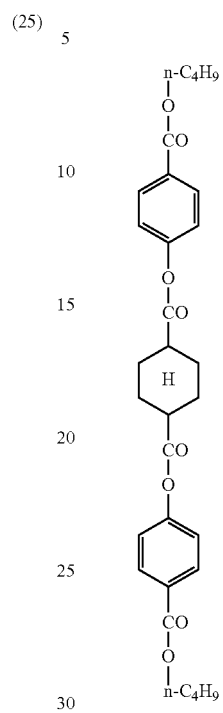 (27)
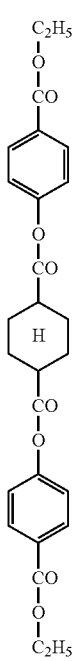 (26)
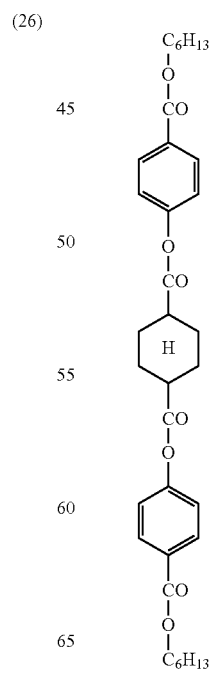 (28)

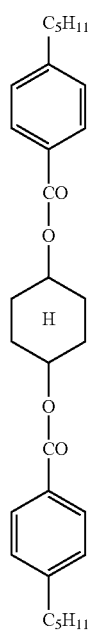 (29)
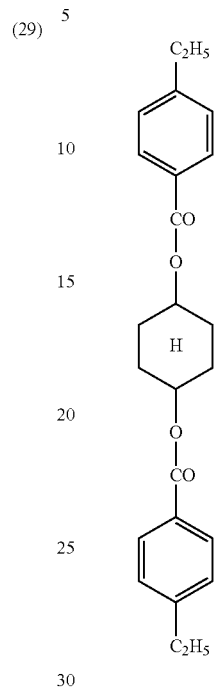 (31)
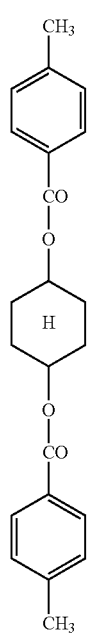 (30)
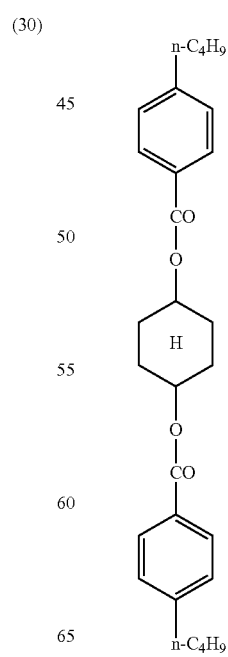 (32)

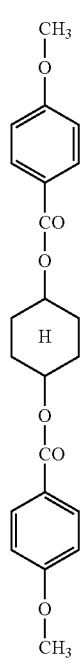
(33)
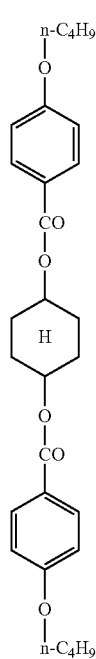
(34)
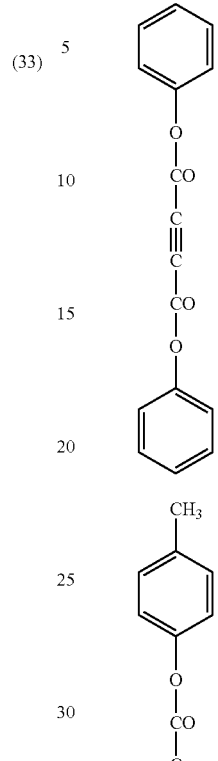
(35)
(36)
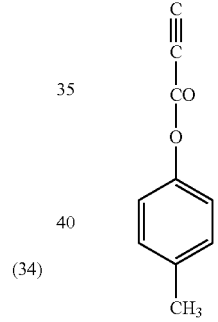
(37)

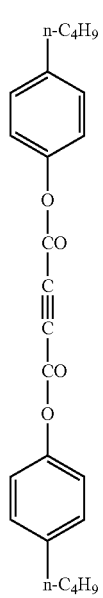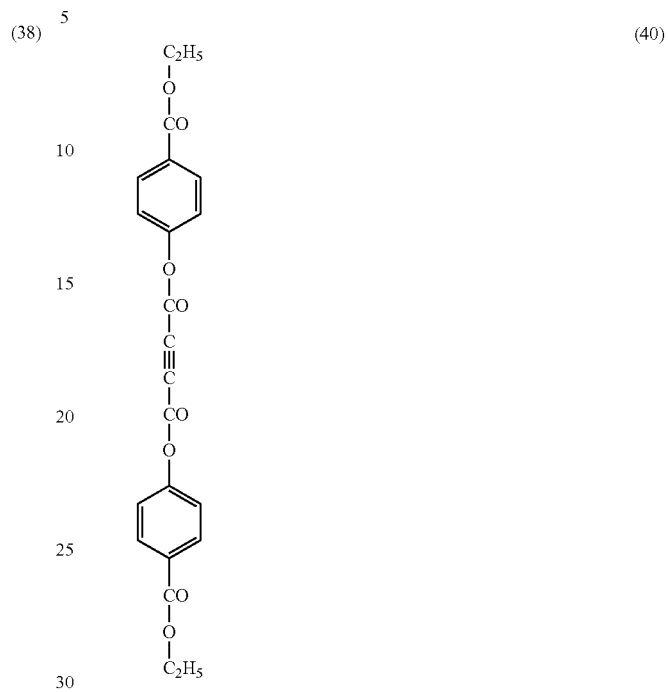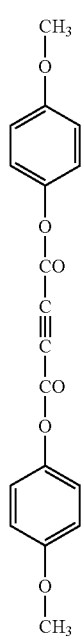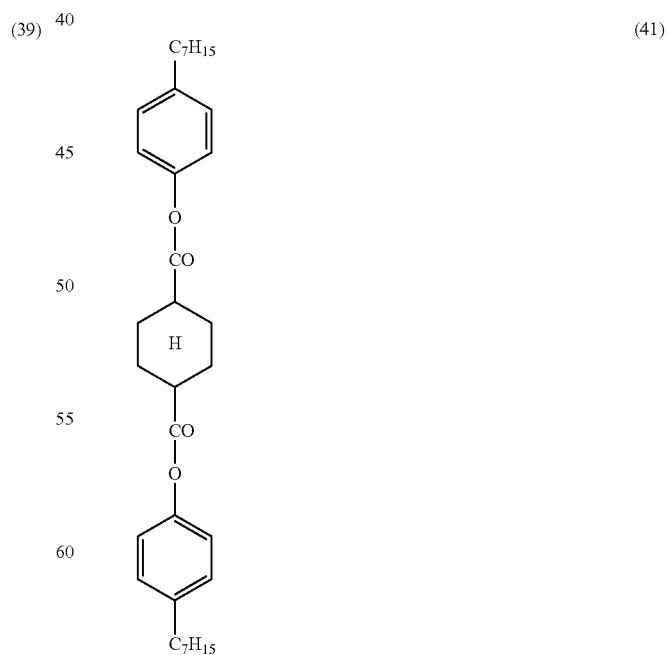

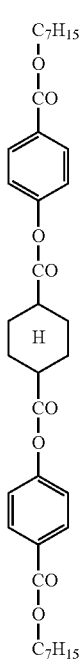
(42)
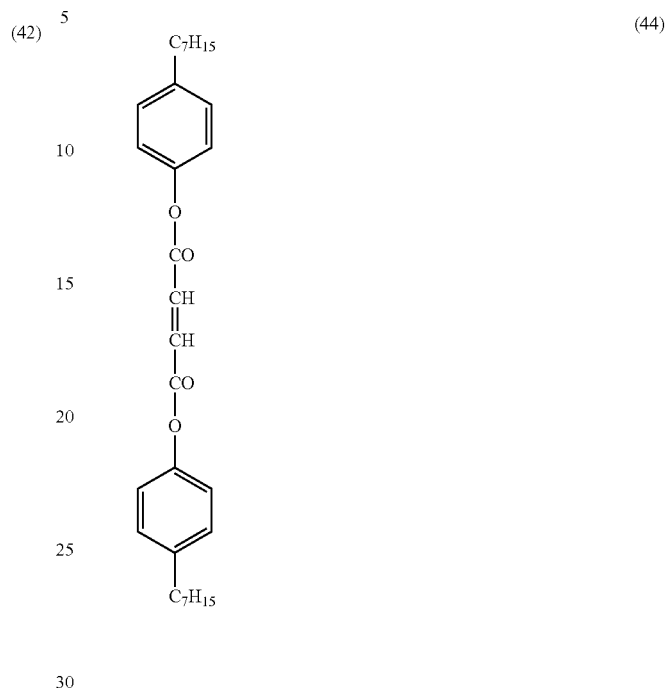

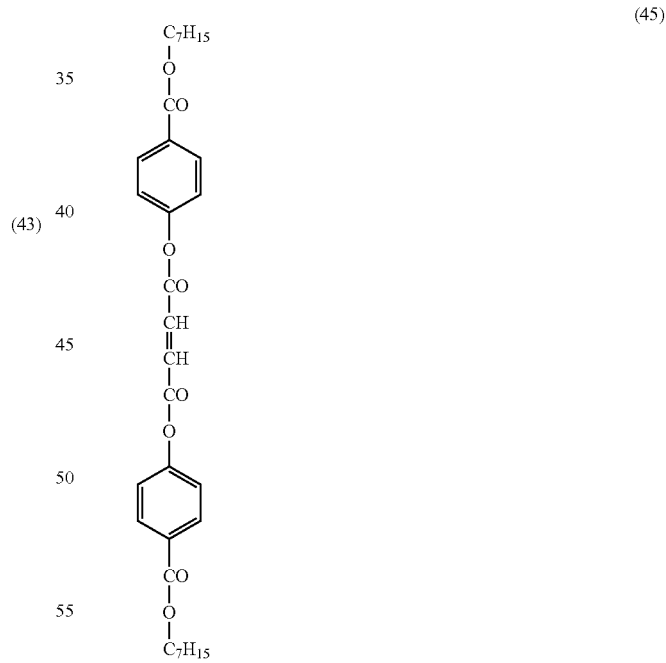

Specific examples (1) to (34), (41), (42) have two asymmetric carbon atoms at the 1-position and 4-position of cyclohexane ring. It is to be noted that the specific examples (1), (4) to (34), (41), (42), having symmetric meso-form molecular structure, have no isomers (optically inactive), and can exist only in forms of geometric isomers (trans-form and cis-form). Trans-form (1-trans) and cis-form (1-cis) isomers of the specific example (1) are listed below.

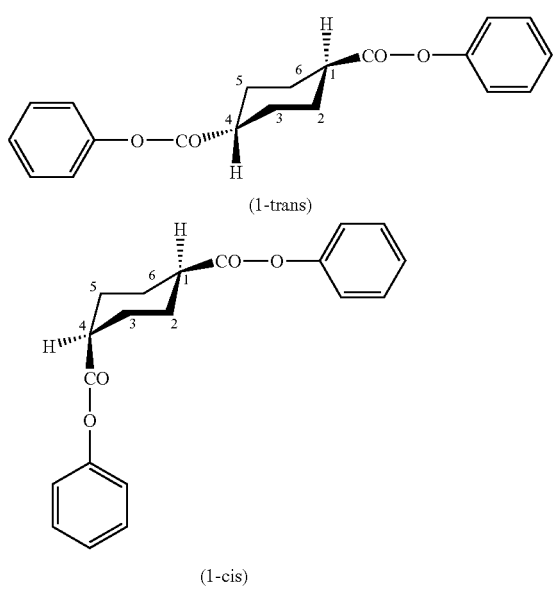

(1-trans)

(1-cis)

As described in the above, the rod-like compound preferably has a linear molecular structure. For this reason, the trans-form is more preferable than the cis-form. The specific examples (2) and (3) have optical isomers (total 4 isomers), in addition to geometric isomers. As for the geometric isomers, the trans-form is more preferable than the cis-form, similarly to as described in the above. There is no specific priority as for the optical isomers, wherein any of D-, L- and racemic compounds are allowable. The specific examples (43) to (45) have the trans-form and cis-form ascribable to the center vinylene bond, wherein the trans-form is more preferable than the cis-form based on the reason described in the above.

Other preferable compounds applicable to the retardation control agent are listed below:

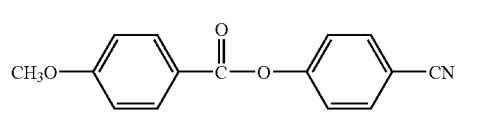 (46)

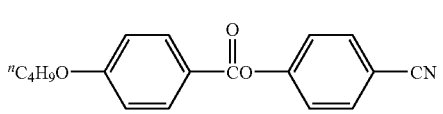 (47)

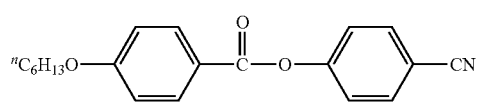 (48)

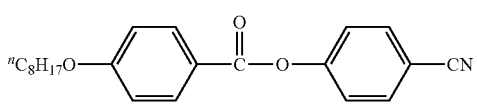 (49)

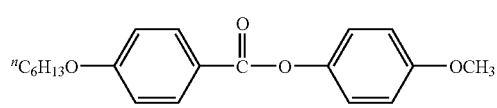 (50)

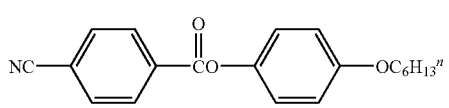 (51)

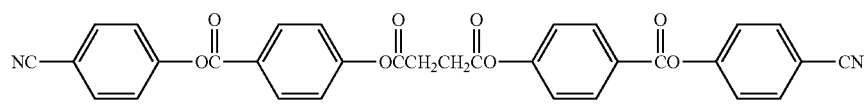 (52)

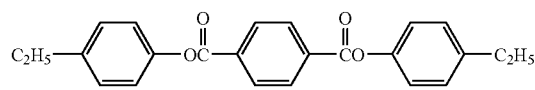 (53)

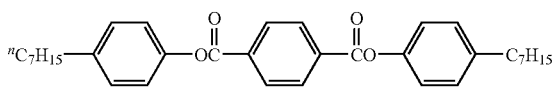 (54)

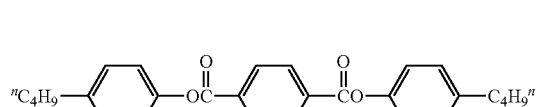 (55)

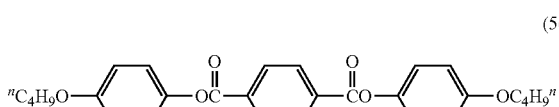 (56)

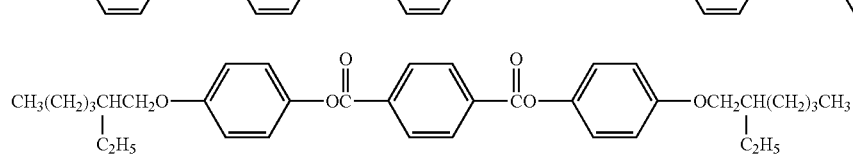 (57)

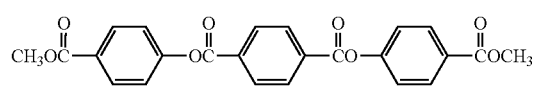 (58)

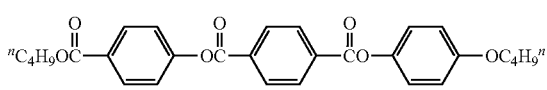 (59)

-continued

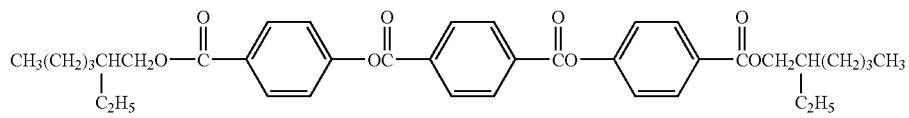

(60)

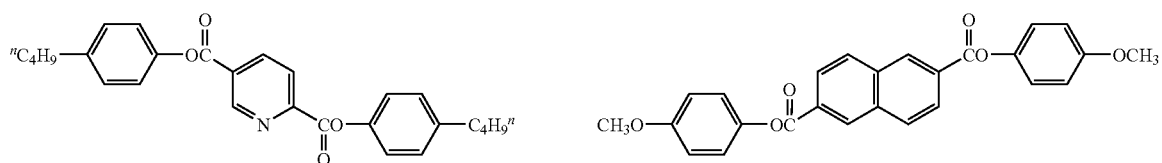

(61)                                             (62)

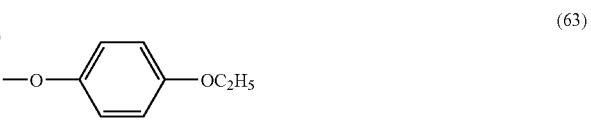

(63)

As the retardation control agent, it is preferable to use two or more species of the rod-like compounds in combination, a solution sample of each of which showing a maximum absorption wavelength (λmax) of shorter than 250 nm in ultraviolet absorption spectrometry. The rod-like compound can be synthesized according to methods described elsewhere in literatures. The literatures include Mol. Cryst. Liq. Cryst., Vol. 53, p. 229 (1979), ditto Vol. 89, p. 93 (1982), ditto Vol. 145, p. 111 (1987), ditto Vol. 170, p. 43 (1989), J. Am. Chem. Soc., Vol. 113, p. 1349 (1991), ditto Vol. 118, p. 5346 (1996), ditto Vol. 92, p. 1582 (1970), J. Org. Chem., Vol. 40, p. 420 (1975), and Tetrahedron, Vol. 48, No. 16, p. 3437 (1992).

Amount of addition of the retardation control agent is preferably 0.1 to 30 weight % of amount of the polymer, and more preferably 0.5 to 20 weight %.

The aromatic compound is used within a range from 0.01 to 20 weight parts per 100 weight parts of cellulose acylate. The aromatic compound is preferably used in an amount of 0.05 to 15 weight parts per 100 weight parts of cellulose acylate, and more preferably in an amount of 0.1 to 10 weight parts. Mixed use of two or more species of the compounds is also allowable.

[Wavelength Dispersion Adjusting Agent]

Next, compounds capable of controlling wavelength dispersion of cellulose acylate films will be described. The wavelength dispersion of the cellulose acylate film can be adjusted within a preferred range by various methods. For example, the wavelength dispersion of the cellulose acylate film may be adjusted within a preferred range by adding a compound having absorption at UV range of 200 to 400 nm. The amount of the above-described compound may be decided depending on types of the compound or adjusting degrees.

Values of Re and Rth of the cellulose acylate film generally show wavelength dispersion characteristics such as being increased on the longer wavelength side than on the shorter wavelength side. It is therefore necessary to smoothen the wavelength dispersion by increasing relatively small values of Re and Rth on the shorter wavelength side. On the other hand, the compound having an absorption in the ultraviolet region from 200 to 400 nm shows wavelength dispersion characteristics such as having larger absorbance on the longer wavelength side than on the shorter wavelength side. If the compound per se can isotropically distribute in the cellulose acylate film, birefringence of the compound per se, and consequently the wavelength dispersions of Re and Rth, are supposed to be larger on the shorter wavelength side, similarly to the wavelength dispersion of the absorbance.

It is therefore made possible to adjust the wavelength dispersion of Re and Rth of the cellulose acylate film, by using the above-described compound having absorption in the ultraviolet region from 200 to 400 nm, and having the wavelength dispersions of Re and Rth of the compound per se supposed to be larger on the shorter wavelength side. The absorption band of this sort of compound in the ultraviolet region preferably resides in a range from 200 to 400 nm, more preferably from 220 to 395 nm, and still more preferably 240 to 390 nm. It is also necessary that the compound used for adjusting the wavelength dispersion is fully compatible with cellulose acylate.

In these years, there are demands on higher luminance with fewer power consumption of the liquid crystal display for television set, notebook-type personal computer and mobile terminal and so forth, and this consequently demands a higher transmittance of optical materials used for the liquid crystal display. From this point of view, the compounds added to the cellulose acylate film must be excellent in the spectral transmittance. The cellulose acylate film preferably has a spectral transmittance at 380 nm of 45% to 95%, both ends inclusive, and a spectral transmittance at 350 nm of 10% or less.

From the viewpoint of volatility, the wavelength dispersion adjusting agent preferably has a molecular weight of 250 to 1000, more preferably 260 to 800, still more preferably 270 to 800, and particularly preferably 300 to 800. The agent may have a monomer structure, or may have an oligomer structure or a polymer structure composed of a plurality of such monomer units bonded to each other, so far as the molecular weight thereof falls within the above-described ranges.

For the case where the cellulose acylate film is produced by a method involving heating process, such as a solvent cast process, it is preferable that the wavelength dispersion adjusting agent is not volatile in the process of cast spreading of a dope, drying and so forth.

The amount of the wavelength dispersion adjusting agent is preferably 0.01 to 30% by weight of the cellulose acylate, more preferably 0.1 to 30% by weight, still more preferably 0.1 to 20% by weight, and particularly preferably 0.2 to 10% by weight.

The wavelength dispersion adjusting agent may be used independently, or in a mixed manner based on an arbitrary ratio of mixing of two or more compounds.

When the wavelength dispersion adjusting agent should be added is not specifically limited. For the case where the cellulose acylate film is produced by the solvent cast method, the agent may be added during the dope preparation process, or at the end of the dope preparation process.

Specific examples of the wavelength dispersion adjusting agent preferably used in the present invention include benzotriazole-base compounds, benzophenone-base compounds, cyano-group-containing compounds, oxybenzophenone-base compounds, salicilic-acid-ester-base compounds and nickel complex salt-base compounds, wherein the present invention is by no means limited to these compounds.

Preferable examples of the wavelength dispersion adjusting agent are those represented by the formula (3) below:

$$Q^1\text{-}Q^1\text{-}OH \qquad \text{formula (3)}$$

where, $Q^1$ represents a nitrogen-containing aromatic heterocycle, and $Q^2$ represents an aromatic ring.

The nitrogen-containing aromatic heterocycle represented by $Q^1$ is preferably a five-to-seven-membered, nitrogen-containing aromatic heterocycle, and more preferably five- or six-membered, nitrogen-containing aromatic heterocycle, wherein examples thereof include imidazole, pyrazole, triazole, tetrazole, thiazole, oxazole, selenazole, benzotriazole, benzothiazole, benzoxazole, benzoselenazole, thiadiazole, oxadiazole, naphthothiazole, naphthooxazole, azabenzimidazole, purine, pyridine, pyrazine, pyrimidine, pyridazine, triazine, triazaindene and tetrazaindene. Among others, the five-membered, nitrogen-containing aromatic heterocycle is preferable, wherein specific examples thereof include imidazole, pyrazole, triazole, tetrazole, thiazole, oxazole, benzotriazole, benzothiazole, benzoxazole, thiadiazole, and oxadiazole. Benzotriazole is particularly preferable. The nitrogen-containing aromatic heterocycle represented by $Q^1$ may further has a substituent group, wherein substituent group T described later is applicable as the substituent group. For the case of having a plurality of substituent groups, the individual substituent groups may bond to each other to thereby form condensed rings.

The aromatic ring represented by $Q^2$ may be an aromatic hydrocarbon ring or may be an aromatic heterocycle. The aromatic ring may be monocycle, or may further form a condensed ring with other ring. The aromatic hydrocarbon ring is preferably a monocyclic or bicyclic aromatic hydrocarbon ring having the number of carbon atoms of 6 to 30 (e.g., benzene ring, naphthalene ring), more preferably an aromatic hydrocarbon ring having the number of carbon atoms of 6 to 20, still more preferably an aromatic hydrocarbon ring having the number of carbon atoms of 6 to 12, and further more preferably a benzene ring.

The aromatic heterocycle is preferably a nitrogen-atom-containing or sulfur-atom-containing aromatic heterocycle. Specific examples of the aromatic heterocycle include thiophene, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthylidine, quinoxaline, quinazoline, cinnoline, pteridine, acridine, phenanthroline, phenazine, tetrazole, benzimidazole, benzoxazole, benzthiazole, benzotriazole and tetrazaindene. The aromatic heterocycle is preferably pyridine, triazine or quinoline. $Q^2$ preferably represents an aromatic hydrocarbon ring, more preferably represents a naphthalene ring or benzene ring, and particularly preferably represents a benzene ring.

Each of $Q^1$ and $Q^2$ may further have a substituent group which is preferably selected from the substituent group T listed below. Substituent Group T:

an alkyl group (desirably $C_{1-20}$, more desirably $C_{1-12}$ and much more desirably $C_{1-8}$ alkyl group) such as methyl, ethyl, isopropyl, tert-butyl, n-octyl, n-decyl, n-hexadecyl, cyclopropyl, cyclopentyl or cyclohexyl; an alkenyl group (desirably $C_{2-20}$, more desirably $C_{2-12}$ and much more desirably $C_{2-8}$ alkenyl group) such as vinyl, allyl, 2-butenyl or 3-pentenyl; an alkynyl group (desirably $C_{2-20}$, more desirably $C_{2-12}$ and much more desirably $C_{2-8}$ alkynyl group) such as propargyl or 3-pentynyl; an aryl group (desirably $C_{6-30}$, more desirably $C_{6-20}$ and much more desirably $C_{6-12}$ aryl group) such as phenyl, p-methylphenyl or naphthyl; an aralkyl group (desirably $C_{7-30}$, more desirably $C_{7-20}$ and much more desirably $C_{7-12}$ aralkyl group) such as benzyl, phenethyl or 3-phenylpropyl; a substituted or unsubstituted amino group (desirably $C_{0-20}$, more desirably $C_{0-10}$ and much more desirably $C_{0-6}$ amino group) such as unsubstituted amino, methylamino, dimethylamino, diethylamino or anilino; an alkoxy group (desirably $C_{1-20}$, more desirably $C_{1-16}$ and much more desirably $C_{1-10}$ alkoxy group) such as methoxy, ethoxy or butoxy; an alkoxycarbonyl group (desirably $C_{2-20}$, more desirably $C_{2-16}$ and much more desirably $C_{2-10}$ alkoxy carbonyl group) such as methoxycarbonyl or ethoxycarbonyl; an acyloxy group (desirably $C_{2-20}$, more desirably $C_{2-16}$ and much more desirably $C_{2-10}$ acyloxy group) such as acetoxy or benzoyloxy; an acylamino group (desirably $C_{2-20}$, more desirably $C_{2-16}$ and much more desirably $C_{2-10}$ acylamino group) such as acetylamino or benzoylamino; an alkoxycarbonylamino group (desirably $C_{2-20}$, more desirably $C_{2-16}$ and much more desirably $C_{2-12}$ alkoxycarbonylamino group) such as methoxycarbonyl amino; an aryloxycarbonylamino group (desirably $C_{7-20}$, more desirably $C_{7-16}$ and much more desirably $C_{7-12}$ aryloxycarbonylamino group) such as phenyloxycarbonyl amino group; a sulfonylamino group (desirably $C_{1-20}$, more desirably $C_{1-16}$ and much more desirably $Cl_{12}$ sulfonylamino group) such as methylsulfonylamino group or benzenesulfonylamino group; a sulfamoyl group (desirably $C_{0-20}$, more desirably $C_{0-16}$ and much more desirably $C_{0-12}$ sulfamoyl group) such as unsubstituted sulfamoyl, methylsulfamoyl, dimethylsulfamoyl or phenylsulfamoyl; a carbamoyl group (desirably $C_{1-20}$, more desirably $C_{1-16}$ and much more desirably $C_{1-12}$ carbamoyl group) such as unsubstituted carbamoyl, methylcarbamoyl, diethylcarbamoyl or phenylcarbamoyl; an alkylthio group (desirably $C_{1-20}$, more desirably $C_{1-16}$ and much more desirably $C_{1-12}$ alkylthio group) such as methylthio or ethylthio; an arylthio group (desirably $C_{6-20}$, more desirably $C_{6-16}$ and much more desirably $C_{6-12}$ arylthio group) such as phenylthio; a sulfonyl group (desirably $C_{1-20}$, more desirably $C_{1-16}$ and much more desirably $C_{1-12}$ sulfonyl group) such as mesyl or tosyl; a sulfinyl group (desirably $C_{1-20}$, more desirably $C_{1-16}$ and much more desirably $C_{1-12}$ sulfinyl group) such as methane sulfinyl or benzenesulfinyl; an ureido group (desirably $C_{1-20}$, more desirably $C_{1-16}$ and much more desirably $C_{1-12}$ ureido group) such as unsubstituted ureido, methylureido or phenylureido; a phosphoric amide (desirably $C_{1-20}$, more desirably $C_{1-16}$ and much more desirably $C_{1-12}$ phosphoric amide) such as diethylphosphoric amide or phenylphosphoric amide; a hydroxy group, a mercapto group, a halogen atom such as fluorine, chlorine, bromine or iodine; a cyano group, a sulfo group, a carboxyl group, a nitro group, a hydroxamic acid group, a sulfino group, a hydrazino group, an imino group, a hetero cyclic group (desirably $C_{1-30}$ and more desirably $C_{1-12}$ heterocyclic group comprising at least one hetero atom such as nitrogen, oxygen or sulfur) such as imidazolyl, pyridyl, quinolyl, furyl, piperidyl, morpholino, benzoxazolyl, benzimidazolyl or benzthiazolyl; and a silyl group (desirably $C_{3-40}$, more desirably $C_{3-30}$ and much more desirably $C_{3-24}$ silyl group) such as trimethylsilyl or triphenylsilyl.

These substituents may be substituted with at least one substitutent selected from these. When two substituents are selected, they may be same or different each other. Two or more may, if possible, bond each other to form a ring.

Among the compounds represented by the formula (3), triazole compounds represented by a formula (3-A) are preferred.

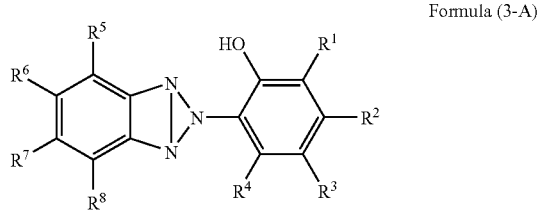

Formula (3-A)

In the formula, $R^1$, $R^2$, $R^3$, $R^4$, $R^5$, $R^6$, $R^7$ and $R^8$ respectively represent a hydrogen atom or a substituent group.

The substituent represented by $R^1$, $R^2$, $R^3$, $R^4$, $R^5$, $R^6$, $R^7$ or $R^8$ is selected from Substituent Group T described above. The substituent may be substituted with at least one substituent group or form a condensed ring by bonding each other.

It is preferred that $R^1$ and $R^3$ respectively represent a hydrogen atom, an alkyl group, an alkenyl group, an alkynyl group, an aryl group, a substituted or non-substituted amino group, an alkoxy group, an aryloxy group, a hydroxy group or a halogen atom; it is more preferred that $R^1$ and $R^3$ respectively represent a hydrogen atom, an alkyl group, an aryl group, an alkoxy group, an aryloxy group or a halogen atom; it is much more preferred that $R^1$ and $R^3$ respectively represent a hydrogen atom or a $C_{1-12}$ alkyl group; and it is further much more preferred that $R^1$ and $R^3$ respectively represent a $C_{1-12}$ (preferably $C_{4-12}$) alkyl group.

It is preferred that $R^2$ and $R^4$ respectively represent a hydrogen atom, an alkyl group, an alkenyl group, an alkynyl group, an aryl group, a substituted or non-substituted amino group, an alkoxy group, an aryloxy group, a hydroxy group or a halogen atom; it is more preferred that $R^2$ and $R^4$ respectively represent a hydrogen atom, an alkyl group, an aryl group, an alkoxy group, an aryloxy group or a halogen atom; it is much more preferred that $R^2$ and $R^4$ respectively represent a hydrogen atom or a $C_{1-12}$ alkyl group; it is further much more preferred that $R^2$ and $R^4$ respectively represent a hydrogen atom or methyl; and it is most preferred that $R^2$ and $R^4$ respectively represent a hydrogen atom.

It is preferred that $R^5$ and $R^8$ respectively represent a hydrogen atom, an alkyl group, an alkenyl group, an alkynyl group, an aryl group, a substituted or non-substituted amino group, an alkoxy group, an aryloxy group, a hydroxy group or a halogen atom; it is more preferred that $R^5$ and $R^8$ respectively represent a hydrogen atom, an alkyl group, an aryl group, an alkoxy group, an aryloxy group or a halogen atom; it is much more preferred that $R^5$ and $R^8$ respectively represent a hydrogen atom or a $C_{1-12}$ alkyl group; it is further much more preferred that $R^5$ and $R^8$ respectively represent a hydrogen atom or methyl; and it is most preferred that $R^5$ and $R^8$ respectively represent a hydrogen atom.

It is preferred that $R^6$ and $R^7$ respectively represent a hydrogen atom, an alkyl group, an alkenyl group, an alkynyl group, an aryl group, a substituted or non-substituted amino group, an alkoxy group, an aryloxy group, a hydroxy group or a halogen atom; it is more preferred that $R^6$ and $R^7$ respectively represent a hydrogen atom, an alkyl group, an aryl group, an alkoxy group, an aryloxy group or a halogen atom; it is much more preferred that $R^6$ and $R^7$ respectively represent a hydrogen atom or a halogen atom; and it is further much more preferred that $R^6$ and $R^7$ respectively represent a hydrogen atom or a chlorine.

Among the compounds represented by the formula (3), the compounds represented by a formula (3-B) are more preferred.

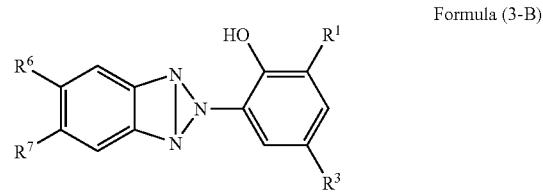

Formula (3-B)

In the formula, $R^1$, $R^3$, $R^6$ and $R^7$ are respectively same as those in the formula (3-A), and the preferred scopes of them are also same.

Examples of the compound represented by the formula (3) include, however not to be limited to, those shown below.

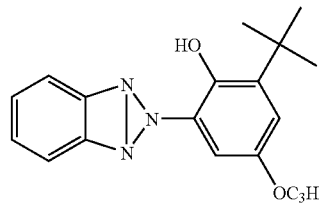

UV-1

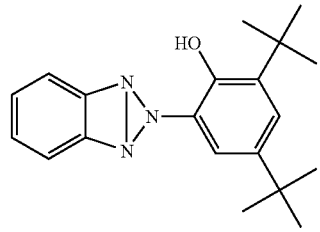

UV-2

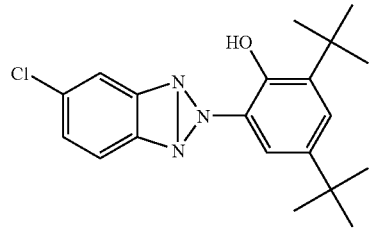

UV-3

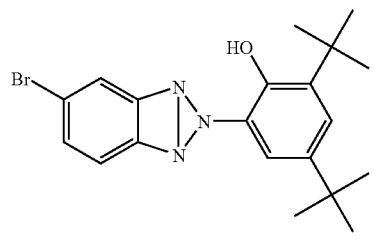

UV-4

-continued
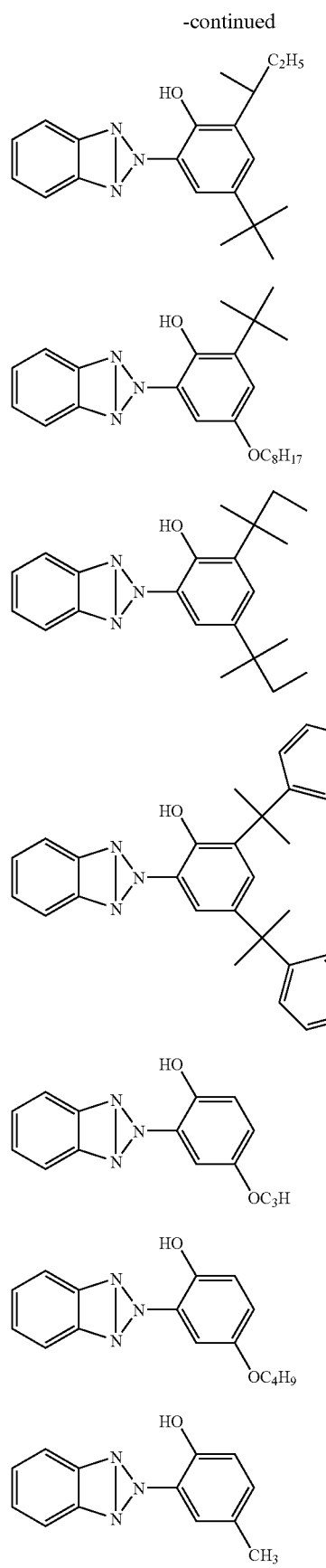
UV-5
UV-6
UV-7
UV-8
UV-9
UV-10
UV-11
-continued
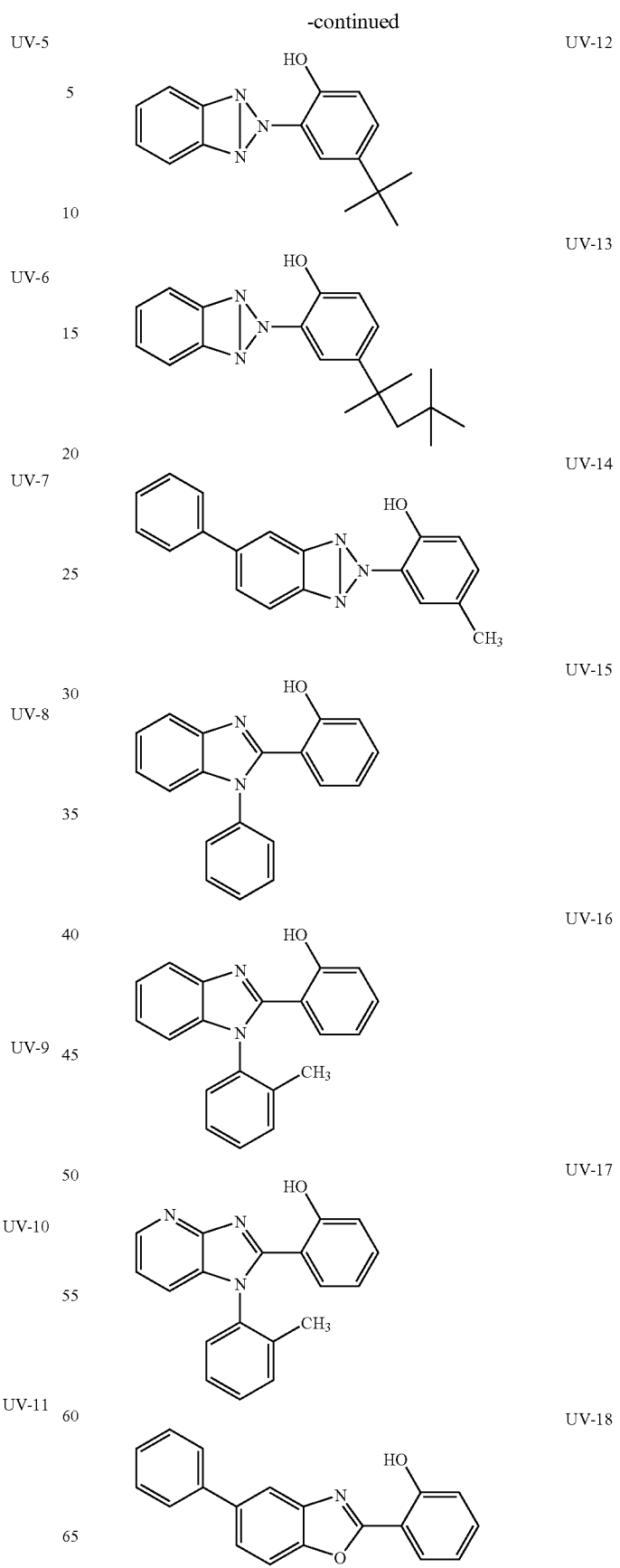
UV-12
UV-13
UV-14
UV-15
UV-16
UV-17
UV-18

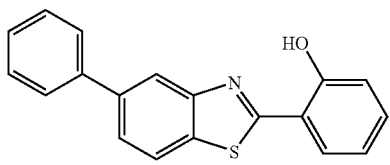
UV-19

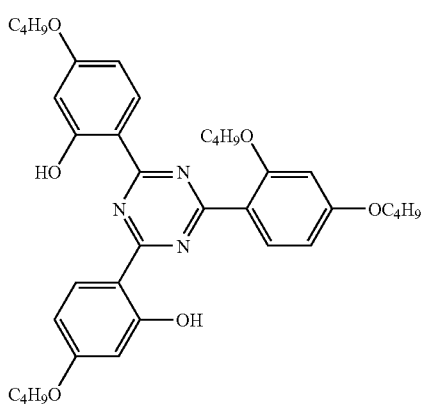
UV-20

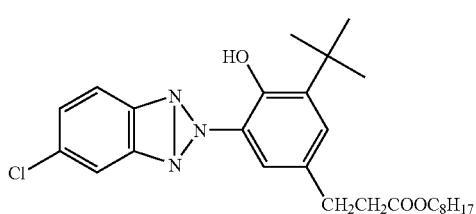
UV-21

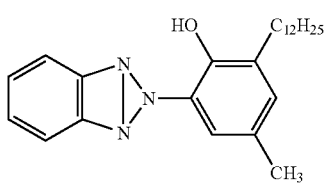
UV-22

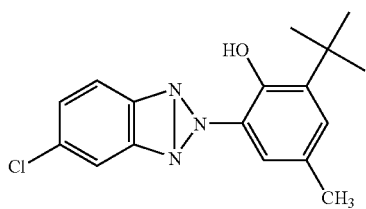
UV-23

Among benzotriazole compounds shown above as examples, the compounds having a molecular-weight of greater than 320 are preferably used for producing the cellulose acylate film from the viewpoint of retention.

One of other preferable examples of the wavelength dispersion adjusting agent is a compound represented by the formula (4) below.

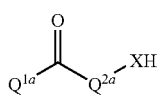
Formula (4)

In the formula, $Q^{1a}$ and $Q^{2a}$ independently represent an aromatic ring, and X represents NR (R is a hydrogen atom or a substituent group), oxygen atom or sulfur atom.

The aromatic ring represented by $Q^{1a}$ and $Q^{2a}$ may be an aromatic hydrocarbon ring or may be an aromatic heterocycle. The aromatic ring may be monocycle, or may further form a condensed ring with other ring. The aromatic hydrocarbon ring represented by $Q^{1a}$ and $Q^{2a}$ is preferably a monocyclic or bicyclic aromatic hydrocarbon ring having the number of carbon atoms of 6 to 30 (e.g., benzene ring, naphthalene ring), more preferably an aromatic hydrocarbon ring having the number of carbon atoms of 6 to 20, still more preferably an aromatic hydrocarbon ring having the number of carbon atoms of 6 to 12, and further more preferably a benzene ring. The aromatic heterocycle represented by $Q^{1a}$ and $Q^{2a}$ may be an aromatic heterocycle preferably containing at least any one of an oxygen atom, nitrogen atom and sulfur atom. Specific examples of the heterocycle include furan, pyrrole, thiophene, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthylidine, quinoxaline, quinazoline, cinnoline, pteridine, acridine, phenanthroline, phenazine, tetrazole, benzimidazole, benzoxazole, benzthiazole, benzotriazole and tetrazaindene. The aromatic heterocycle is preferably pyridine, triazine or quinoline. Each of $Q^{1a}$ and $Q^{2a}$ preferably represents an aromatic hydrocarbon ring, more preferably an aromatic hydrocarbon ring having the number of carbon atoms of 6 to 10, and still more preferably a substituted or non-substituted benzene ring. Each of $Q^{1a}$ and $Q^{2a}$ may further have a substituent group. The substituent group may preferably be selected from the substituent group T listed below, but never contain carboxylic acid, sulfonic acid or quaternary ammonium salt. A plurality of the substituent group may bind with each other to produce a cyclic structure.

X is preferably NR (R represents a hydrogen atom or a substituent group. The above-described substituent group T is applicable to the substituent group), oxygen atom (O) or sulfur atom (S), wherein X is preferably NR (R is preferably an acyl group or sulfonyl group, and these substituent groups may further be substituted), or O, and particularly preferably O.

Among the compounds represented by the formula (4), the compounds represented by a formula (4-A) are preferred.

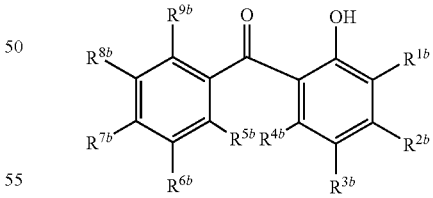
Formula (4-A)

In the formula, $R^{1b}$, $R^{2b}$, $R^{3b}$, $R^{4b}$, $R^{5b}$, $R^{6b}$, $R^{7b}$, $R^{8b}$ and $R^{9b}$ respectively represent a hydrogen atom or a substituent.

The substituent represented by $R^{1b}$, $R^{2b}$, $R^{3b}$, $R^{4b}$, $R^{5b}$, $R^{6b}$, $R^{7b}$, $R^{8b}$ or $R^{9b}$ is selected from Substituent Group T described above. The substituent may be substituted with at least one substituent group or form a condensed ring by bonding each other.

It is preferred that $R^{1b}$, $R^{3b}$, $R^{4b}$, $R^{5b}$, $R^{6b}$, $R^{8b}$ and $R^{9b}$ respectively represent a hydrogen atom, an alkyl group, an alkenyl group, an alkynyl group, an aryl group, a substituted or non-substituted amino group, an alkoxy group, an aryloxy group, a hydroxy group or a halogen atom; it is more preferred that $R^{1b}$, $R^{3b}$, $R^{4b}$, $R^{5b}$, $R^{6b}$, $R^{8b}$ and $R^{9b}$ respectively represent a hydrogen atom, an alkyl group, an aryl group, an alkoxy group, an aryloxy group or a halogen atom; it is much more preferred that $R^{1b}$, $R^{3b}$, $R^{4b}$, $R^{5b}$, $R^{6b}$, $R^{8b}$ and $R^{9b}$ respectively represent a hydrogen atom or a $C_{1-12}$ alkyl group; it is further much more preferred that $R^{1b}$, $R^{3b}$, $R^{4b}$ $R^{5b}$, $R^{6b}$, $R^{8b}$ and $R^{9b}$ respectively represent a hydrogen atom or methyl; and it is most preferred that $R^{1b}$, $R^{3b}$, $R^{4b}$, $R^{5b}$, $R^{6b}$, $R^{8b}$ and $R^{9b}$ respectively represent a hydrogen atom.

It is preferred that $R^{2b}$ represents a hydrogen atom, an alkyl group, an alkenyl group, an alkynyl group, an aryl group, a substituted or non-substituted amino group, an alkoxy group, an aryloxy group, a hydroxy group or a halogen atom; it is more preferred that $R^{2b}$ represents a hydrogen atom, a $C_{1-20}$ alkyl group, a $C_{0-20}$ amino group, a $C_{1-20}$ alkoxy group, a $C_{6-12}$ aryloxy group or a hydroxy group; it is much more preferred that $R^{2b}$ represents a $C_{1-20}$ alkoxy group; and it is further much more preferred that $R^{2b}$ represents a $C_{1-12}$ alkoxy group.

It is preferred that $R^{7b}$ represents a hydrogen atom, an alkyl group, an alkenyl group, an alkynyl group, an aryl group, a substituted or non-substituted amino group, an alkoxy group, an aryloxy group, a hydroxy group or a halogen atom; it is more preferred that $R^{7b}$ represents a hydrogen atom, a $C_{1-20}$ alkyl group, a $C_{0-20}$ amino group, a $C_{1-20}$ alkoxy group, a $C_{6-12}$ aryloxy group or a hydroxy group; it is much more preferred that $R^{7b}$ represents a hydrogen atom or a $C_{1-20}$ (desirably $C_{1-12}$, more desirably $C_{1-8}$ and much more desirably methyl) alkyl group; and it is further much more preferred that $R^{7b}$ represents a hydrogen atom or methyl.

Among the compounds represented by the formula (4-A), the compounds represented by a formula (4-B) are preferred.

Formula (4-B)

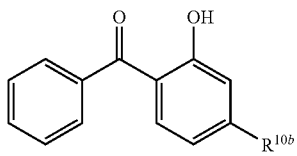

In the formula, $R^{10b}$ represents a hydrogen atom, a substituted or non-substituted alkyl group, a substituted or non-substituted alkenyl group, a substituted or non-substituted alkynyl group or substituted or non-substituted aryl group. The substituent represented by $R^{10b}$ is selected from Substituent Group T shown above.

It is preferred that $R^{10b}$ represents a substituted or non-substituted alkyl group; it is more preferred that $R^{10b}$ represents a $C_{5-20}$ substituted or non-substituted alkyl group; it is much more preferred that $R^{10b}$ represents $C_{5-12}$ substituted or non-substituted alkyl group such as n-hexyl, 2-ethylhexyl, n-octyl, n-decyl, n-dodecyl or benzyl; and it is further more preferred that $R^{10b}$ represents a $C_{6-12}$ substitute or non-substituted alkyl group such as 2-ethylhexyl, n-octyl, n-decyl, n-dodecyl or benzyl.

The compounds represented by the formula (4) can be synthesized by a known method disclosed in Japanese Laid-Open Patent Publication "Tokkaihei" No. 11-12219.

Specific examples of the compounds represented by the formula (4) will be listed below, wherein the present invention is by no means limited to the specific examples listed below.

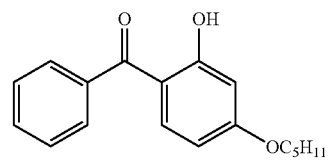

UV-101

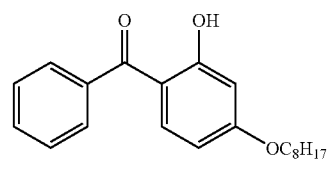

UV-102

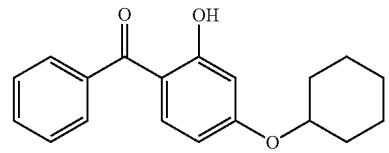

UV-103

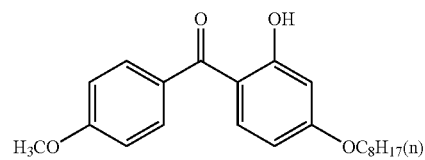

UV-104

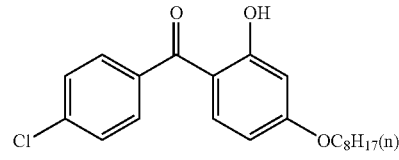

UV-105

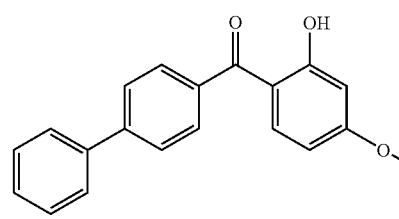

UV-106

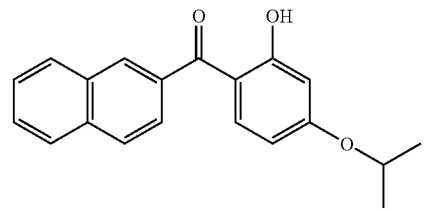

UV-107

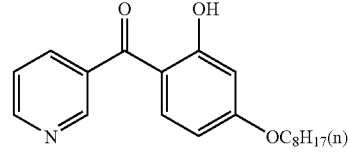

UV-108

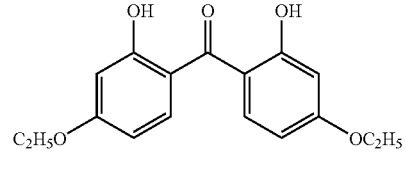

UV-109

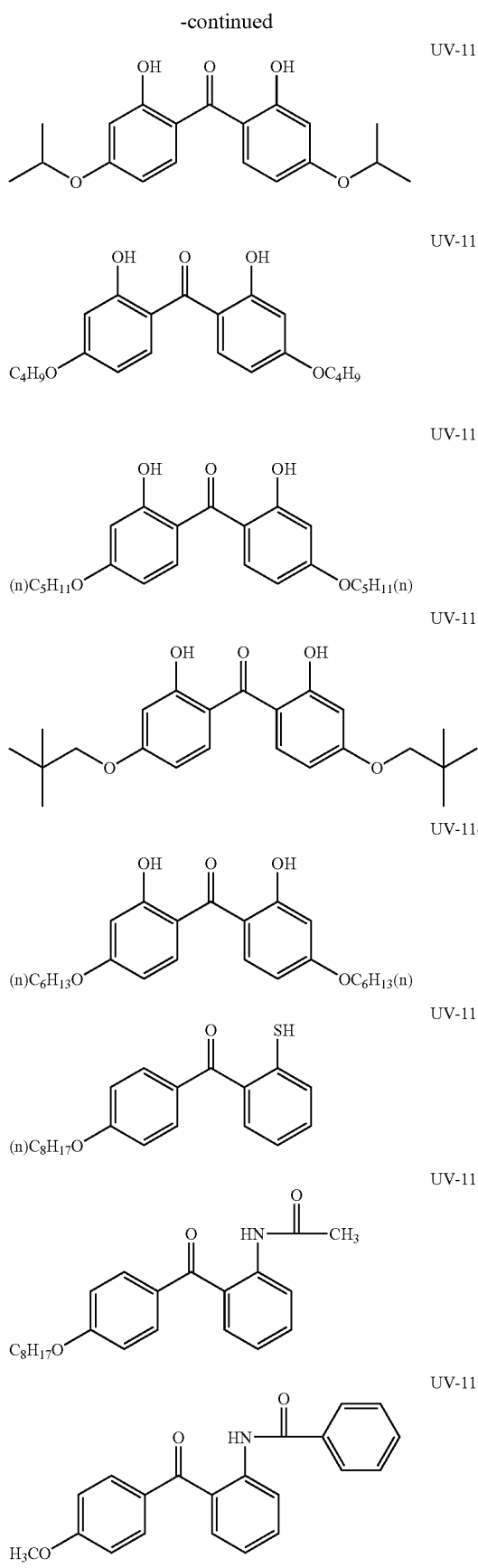
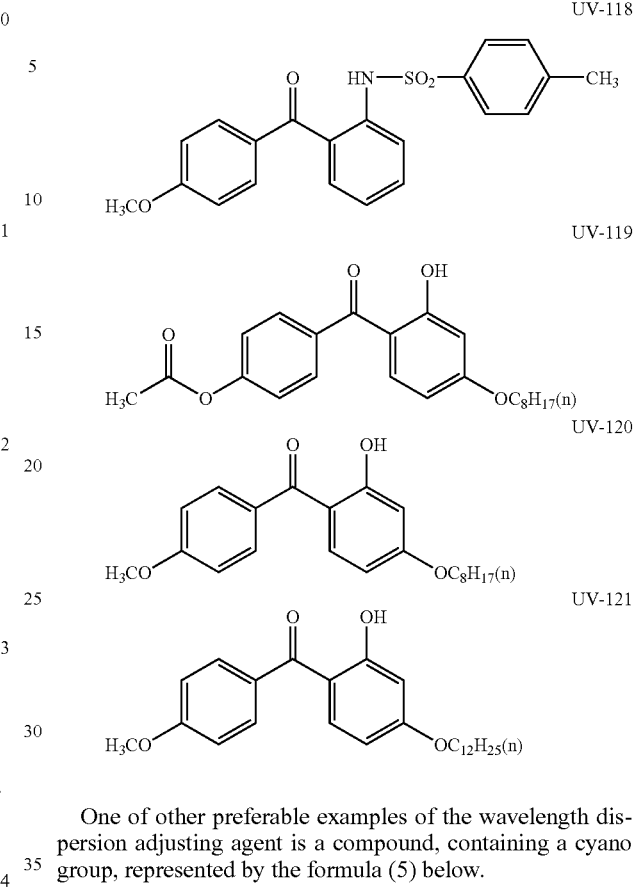

One of other preferable examples of the wavelength dispersion adjusting agent is a compound, containing a cyano group, represented by the formula (5) below.

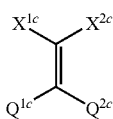

Formula (5)

In the formula, $Q^{1c}$ and $Q^{2c}$ independently represent an aromatic ring. Each of $X^{1c}$ and $X^{2c}$ represents a hydrogen atom or a substituent group, wherein at least either one of which represents a cyano group, carbonyl group, sulfonyl group or aromatic heterocycle. The aromatic ring represented by $Q^{1c}$ and $Q^{2c}$ may be an aromatic hydrocarbon ring or an aromatic heterocycle. These may be a monocycle, or may further form a condensed ring with other ring.

The aromatic hydrocarbon ring is preferably a monocyclic or bicyclic aromatic hydrocarbon ring having the number of carbon atoms of 6 to 30 (e.g., benzene ring, naphthalene ring), more preferably an aromatic hydrocarbon ring having the number of carbon atoms of 6 to 20, more preferably an aromatic hydrocarbon ring having the number of carbon atoms of 6 to 12, and still more preferably a benzene ring.

The aromatic heterocycle is preferably a nitrogen-atom-containing or sulfur-atom-containing aromatic heterocycle. Specific examples of the heterocycle include thiophene, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthylidine, quinoxaline, quinazoline, cinnoline, pteridine, acridine, phenanthroline, phenazine, tetrazole, benzimidazole, benzoxazole, benzothiazole, benzotriazole and tetrazaindene. The aromatic heterocycle is preferably pyridine, triazine or quinoline.

Each of $Q^{1c}$ and $Q^{2c}$ preferably represents an aromatic hydrocarbon ring, and more preferably a benzene ring. Each of $Q^{1c}$ and $Q^{2c}$ may further have a substituent group, wherein the substituent group is preferably selected from the above-described substituent group T.

Each of $X^{1c}$ and $X^{2c}$ represents a hydrogen atom or a substituent group, wherein at least either one of which represents a cyano group, carbonyl group, sulfonyl group or aromatic heterocycle. The above-described substituent group T is applicable to the substituent group represented by $X^{1c}$ and $X^{2c}$. The substituent group represented by $X^{1c}$ and $X^{2c}$ may further be substituted with other substituent group, or $X^{1c}$ and $X^{2c}$ may be condensed with each other to thereby form a ring structure.

Each of $X^{1c}$ and $X^{2c}$ is preferably a hydrogen atom, alkyl group, aryl group, cyano group, nitro group, carbonyl group, sulfonyl group or aromatic heterocycle, more preferably a cyano group, carbonyl group, sulfonyl group or aromatic heterocycle, still more preferably a cyano group or carbonyl group, and particularly preferably a cyano group or alkoxycarbonyl group (—C(=O)OR, where R is an alkyl group having the number of carbon atoms of 1 to 20, aryl group having the number of carbon atoms of 6 to 12, and combinations thereof).

Among the compounds represented by the formula (5), the compounds represented by a formula (5-A) are preferred.

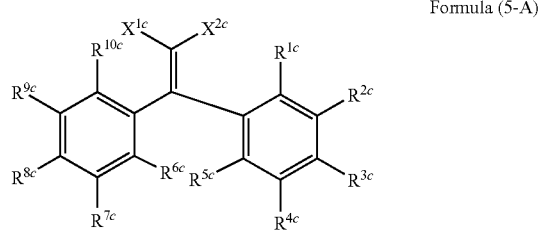

Formula (5-A)

In the formula, $R^{1c}$, $R^{2c}$, $R^{3c}$, $R^{4c}$, $R^{5c}$, $R^{6c}$, $R^{7c}$, $R^{8c}$, $R^{9c}$ and $R^{10c}$ respectively represent a hydrogen atom or a substituent group. The substituent is selected from Substituent Group T shown above. The substituent may be substituted with at least one substituent group or form a condensed ring by bonding each other. $X^{1c}$ and $X^{2c}$ are respectively same as those in the formula (5) and the preferred scopes are also same.

It is preferred that $R^{1c}$, $R^{2c}$, $R^{4c}$, $R^{5c}$, $R^{6c}$, $R^{7c}$, $R^{9c}$ and $R^{10c}$ respectively represent a hydrogen atom, an alkyl group, an alkenyl group, an alkynyl group, an aryl group, a substituted or non-substituted amino group, an alkoxy group, an aryloxy group, a hydroxy group or a halogen atom; it is more preferred that $R^{1c}$, $R^{2c}$, $R^{4c}$, $R^{5c}$, $R^{6c}$, $R^{7c}$, $R^{9c}$ and $R^{10c}$ respectively represent a hydrogen atom, an alkyl group, an aryl group, an alkoxy group, an aryloxy group or a halogen atom; it is much more preferred that $R^{1c}$, $R^{2c}$, $R^{4c}$, $R^{5c}$, $R^{6c}$, $R^{7c}$, $R^{9c}$ and $R^{10c}$ respectively represent a hydrogen atom or a $C_{1-12}$ alkyl group; it is further much more preferred that $R^{1c}$, $R^{2c}$, $R^{4c}$, $R^{5c}$, $R^{6c}$, $R^{7c}$, $R^{9c}$ and $R^{10c}$ respectively represent a hydrogen atom or methyl; and it is most preferred that $R^{1c}$, $R^{2c}$, $R^{4c}$, $R^{5c}$, $R^{6c}$, $R^{7c}$, $R^{9c}$ and $R^{10c}$ respectively represent a hydrogen atom.

It is preferred that $R^{3c}$ and $R^{8c}$ respectively represent a hydrogen atom, an alkyl group, an alkenyl group, an alkynyl group, an aryl group, a substituted or non-substituted amino group, an alkoxy group, an aryloxy group, a hydroxy group or a halogen atom; it is more preferred that $R^{3c}$ and $R^{8c}$ respectively represent a hydrogen atom, a $C_{1-20}$ alkyl group, a $C_{0-20}$ amino group, a $C_{1-20}$ alkoxy group, a $C_{6-12}$ aryloxy group or a hydroxy group; it is much more preferred that $R^{3c}$ and $R^{8c}$ respectively represent a hydrogen atom, a $C_{1-12}$ alkyl group or a $C_{1-12}$ alkoxy group; and it is most preferred that $R^{3c}$ and $R^{8c}$ respectively represent a hydrogen atom.

Among the compounds represented by the formula (5-A), the compounds represented by a formula (5-B) are more preferred.

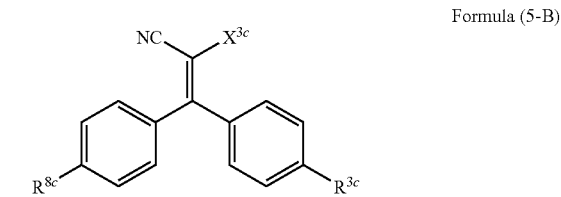

Formula (5-B)

In the formula, $R^{3c}$ and $R^{8c}$ are respectively same as those in the formula (5-A), and the preferred scopes are also same. $X^{3c}$ represents a hydrogen atom or a substituent group. The substituent is selected from Substituent Group T shown above. The substituent may be substituted with at least one substituent group or form a condensed ring by bonding each other.

It is preferred that $X^{3c}$ represents a hydrogen atom, an alkyl group, an aryl group, a cyano group, a nitro group, a carbonyl group, a sulfonyl group or an aryl heterocycle group; it is more preferred that $X^3$ represents a cyano group, a carbonyl group, a sulfonyl group or an aryl heterocycle group; it is much more preferred that $X^3$ represents a cyano group or a carbonyl group; and it is further much more preferred that $X^3$ represents a cyano group or an alkoxycarbonyl group, or in other words —C(=O)OR where R represents a $C_{1-20}$ alkyl group, a $C_{6-12}$ aryl group or a combination thereof.

Among the compounds represented by the formula (5-B), the compounds represented by a formula (5-C) are more preferred.

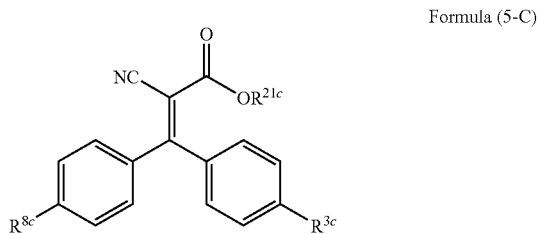

Formula (5-C)

In the formula, $R^{3c}$ and $R^{8c}$ are respectively same as those in the formula (5-A), and the preferred scopes are also same. $R^{21c}$ represents a $C_{1-20}$ alkyl group.

When both of $R^{3c}$ and $R^{8c}$ are hydrogen atoms, $R^{21c}$ preferably represents a $C_{2-12}$ alkyl group, more preferably represents a $C_{4-12}$ alkyl group, much more preferably represents a $C_{6-12}$ alkyl group, further much more preferably n-octyl, tert-octyl, 2-ethylhexyl, n-decyl or n-dodecyl, and most preferably represents 2-ethylhexyl.

When neither $R^{3c}$ nor $R^{8c}$ are hydrogen atoms, $R^{21c}$ is preferably selected from alkyl groups having 20 or less carbon atoms such that the molecular weight of the compound represented by the formula (5-C) is not less than 300.

The compounds represented by the formula (5) can be synthesized by a method described in Journal of American Chemical Society, Vol. 63, p. 3452, (1941).
Specific examples of the compounds represented by the formula (5) will be listed below, wherein the present invention is by no means limited to the specific examples listed below.
UV-201
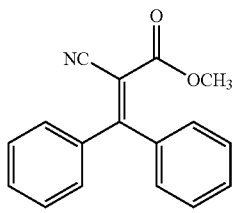
UV-202
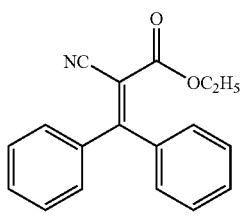
UV-203
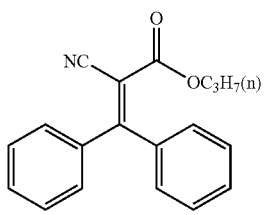
UV-204
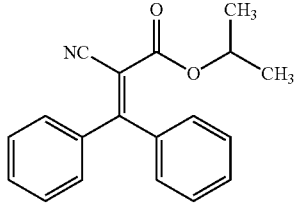
UV-205
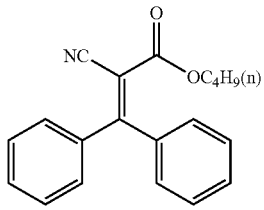
UV-206
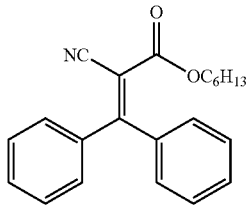
-continued
UV-207
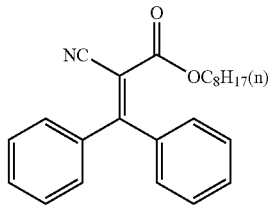
UV-208
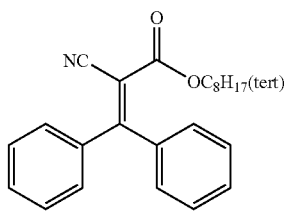
UV-209
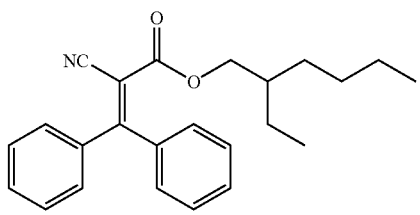
UV-210
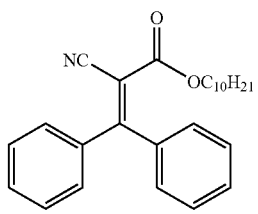
UV-211
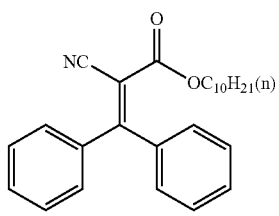
UV-212
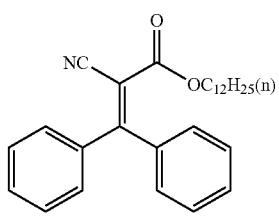
UV-213
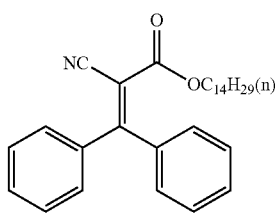

-continued
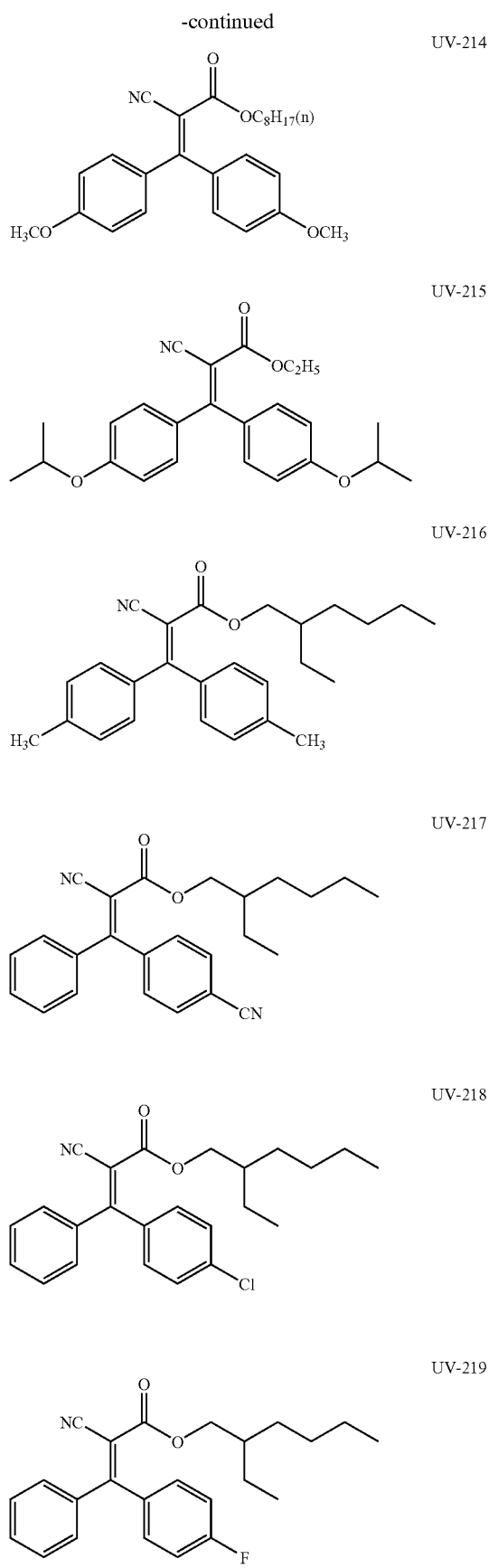
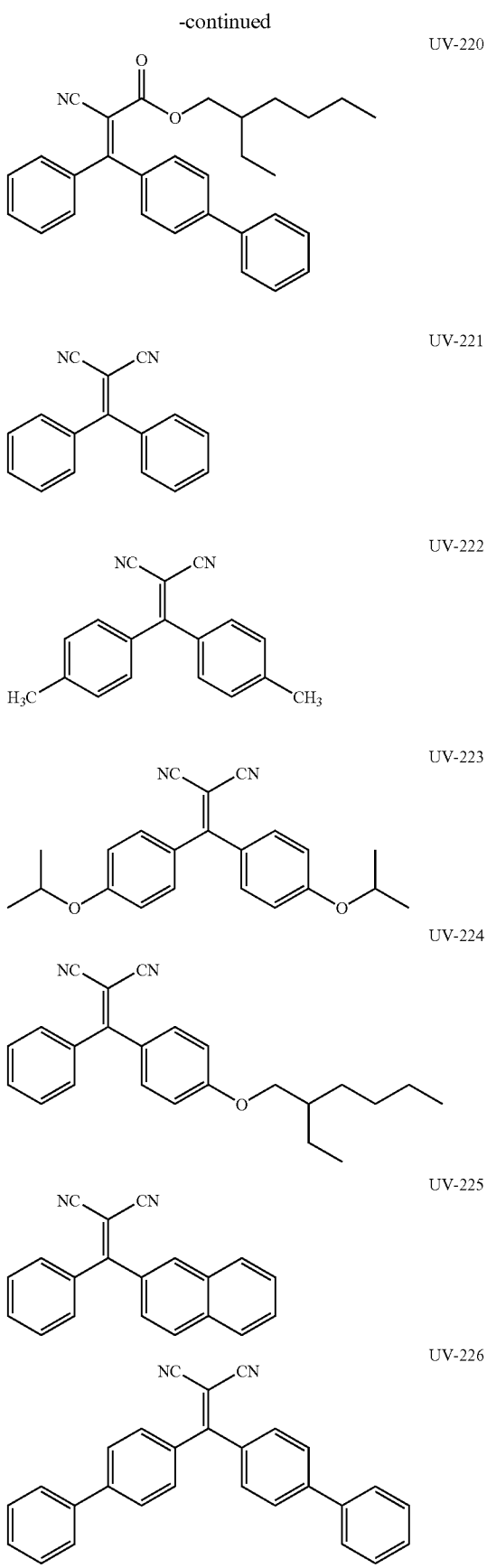

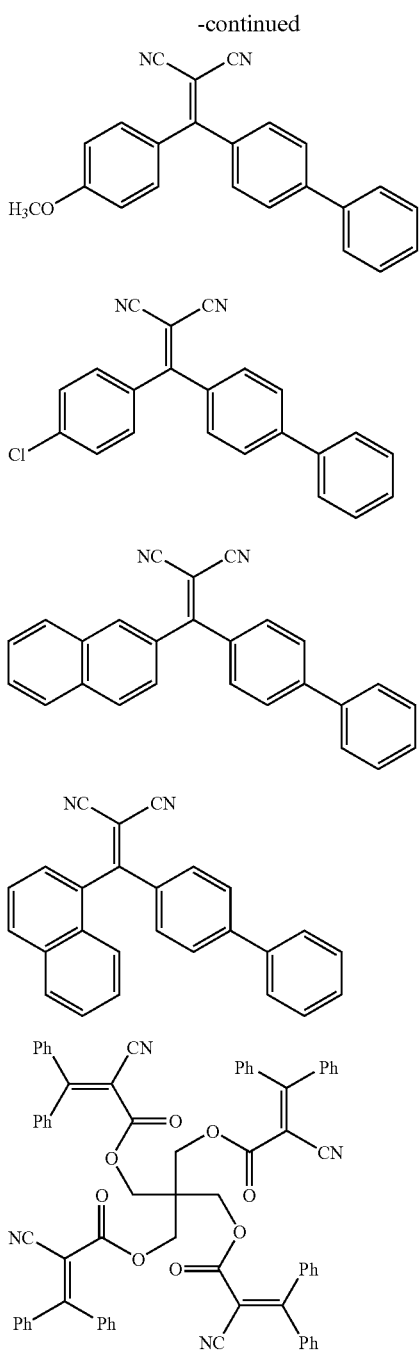

<<Preparation of Cellulose Acylate Film>>

The cellulose acylate film is preferably prepared by the solvent cast process. In the solvent cast process, a film is produced using a solution (dope) obtained by dissolving cellulose acylate in an organic solvent. The organic solvent preferably contains a solvent selected from ether having the number of carbon atoms of 3 to 12, ketone having the number of carbon atoms of 3 to 12, ester having the number of carbon atoms of 3 to 12, and halogenated hydrocarbon having the number of carbon atoms of 1 to 6. The ether, ketone and ester may have a cyclic structure. Any compounds having two or more functional groups of ether, ketone and ester (i.e., —O—, —CO— and —COO—) are also available as the organic solvent. The organic solvent may have other functional group such as alcoholic hydroxyl group. The organic solvent having two or more functional groups is acceptable if the number of carbon atoms thereof falls within range specified for a compound having any of these functional groups.

Examples of the ether having the number of carbon atoms of 3 to 12 include diisopropyl ether, dimethoxy methane, dimethoxy ethane, 1,4-dioxane, 1,3-dioxolane, tetrahydrofuran, anisole and phenetole. Examples of the ketone having the number of carbon atoms of 3 to 12 include acetone, methyl ethyl ketone, diethyl ketone, diisobutyl ketone, cyclohexanone and methyl cyclohexanone. Examples of the ester having the number of carbon atoms of 3 to 12 include ethyl formate, propyl formate, pentyl formate, methyl acetate, ethyl acetate and pentyl acetate. Examples of the organic solvent having two or more functional groups include 2-ethoxyethyl acetate, 2-methoxy ethanol and 2-butoxy ethanol. The number of carbon atoms of the halogenated hydrocarbon is preferably 1 or 2, and most preferably 1. Halogen in the halogenated hydrocarbon is preferably chlorine. Ratio of substitution of hydrogen atoms with halogen in the halogenated hydrocarbon is preferably 25 to 75 mol %, more preferably 30 to 70 mol %, still more preferably 35 to 65 mol %, and most preferably 40 to 60 mol %. Methylene chloride is a representative halogenated hydrocarbon. It is also allowable to mix two or more species of the organic solvents.

A cellulose acylate solution can be prepared by a general method. The general method means a treatment at a temperature of 0° C. or above (normal temperature or high temperature). The solvent can be prepared using a method and an apparatus of preparing a dope in the general solvent cast process. In the general method, it is preferable to use halogenated hydrocarbon (in particular, methylene chloride) as the organic solvent.

Amount of cellulose acylate is adjusted so that it is contained in an amount of 10 to 40 weight % in the obtained solution. It is further preferable to adjust the amount of cellulose acylate to 10 to 30 weight %. The organic solvent (main solvent) may preliminarily be added with any arbitrary additives described later. The solution can be prepared by stirring cellulose acylate and the organic solvent at normal temperature (0 to 40° C.). The solvent of a higher concentration may be stirred under pressurized and heated conditions. More specifically, cellulose acylate and the organic solvent are placed in a pressure vessel, tightly closed, and stirred under pressure while heating the mixture at a temperature not lower than the boiling point of the solvent at normal pressure, but so as not to allow the solvent to boil. The heating temperature is generally 40° C. or above, more preferably 60 to 200° C., and still more preferably 80 to 110° C.

The individual components may otherwise be placed in the vessel after being preliminarily and roughly mixed, or may serially be placed into the vessel. The vessel must be configured so as to allow stirring. The vessel can be pressurized by injecting an inert gas such as nitrogen gas. It is also allowable to make use of rise in the vapor pressure of the solvent under heating. It is still also allowable to tightly close the vessel, and then to add the individual components under pressure. The heating is preferably effected outside of the vessel. It is allowable to use a jacket-type heating device. It is also allowable to dispose a plate heater outside the vessel, and to heat the entire portion of the vessel by allowing a fluid to flow through a piping provided thereto. It is preferable to provide a stirring propeller inside the vessel, and to use it for the stirring. The stirring propeller preferably has a length which is long enough to reach the wall of the vessel. It is preferable to attach a scraping blade at the end of the stirring propeller, for the convenience of refreshing the liquid film on the vessel wall. It is also allowable to equip the vessel with measuring instruments such as a pressure gauge, a thermometer, and so forth. The individual components are dissolved into the solvent within the vessel. The prepared dope is taken out from the vessel after cooled, or first taken out and then cooled using a heat exchanger or the like.

It is also allowable to prepare the solution by the cooled solubilization process. The cooled solubilization process makes it possible to solubilize cellulose acylate into an organic solvent which is hard to solubilize it with the aid of the general solubilization process. The cooled solubilization process is also advantageous in rapidly obtaining a homogeneous solution even if a solvent is capable of dissolving cellulose acylate with the aid of the general solubilization process. In the cooled solubilization process, first cellulose acylate is gradually added into the organic solvent under stirring at room temperature. Amount of cellulose acylate is preferably adjusted so that the resultant mixture will contain it in an amount of 10 to 40 weight %. The amount of cellulose acylate is more preferably 10 to 30 weight %. The mixture may preliminarily be added with any arbitrary additives described later.

Next, the mixture is cooled to −100 to −10° C. (more preferably −80 to −10° C., still more preferably −50 to −20° C., and most preferably −50 to −30° C.). The cooling can be effected typically in a diethyleneglycol solution (−30 to −20° C.) cooled on a dry ice/methanol bath (−75° C.). The cooling allows the mixture of cellulose acylate and organic solvent to solidify.

Rate of cooling is preferably 4° C./minute or above, more preferably 8° C./minute or above, and most preferably 12° C./minute or above. The faster the better, wherein a theoretical upper limit of the rate of cooling is 10,000° C./second, a technical upper limit thereof is 1,000° C./second, and a practical upper limit is 100° C./second. It is to be understood herein that the rate of cooling refers to a value obtained by dividing a difference between a start temperature before the cooling and a final temperature after the cooling, with a time required from the start of cooling to the end of cooling where the final cooling temperature is attained.

Next, heating of the mixture to 0 to 200° C. (more preferably 0 to 150° C., still more preferably 0 to 120° C., and most preferably 0 to 50° C.) allows cellulose acylate to dissolve into the organic solvent. The temperature rise may be attained simply by allowing the mixture to stand in room temperature, or by heating on a hot bath.

Rate of heating is preferably 4° C./minute or above, more preferably 8° C./minute or above, and most preferably 12° C./minute or above. The faster the better, wherein a theoretical upper limit of the rate of heating is 10,000° C./second, a technical upper limit thereof is 1,000° C./second, and a practical upper limit is 100° C./second. It is to be understood herein that the rate of heating refers to a value obtained by dividing a difference between a start temperature before the heating and a final temperature after the heating, with a time required from the start of heating to the end of heating where the final heating temperature is attained.

The homogeneous solution can thus be obtained. Any insufficient solubilization may resolved by repetitive cooling and heating. Whether the solubilization is sufficient or not can be judged simply by visual observation of an appearance of the solution.

In the cooled solubilization process, it is preferable to use an air-tight vessel in order to prevent water from entering, which is possibly caused by dewing during the cooling. In the cooling and heating operations, pressurization during the cooling and reduction in the pressure during the heating are successful in reducing the solubilization time. Use of a pressure vessel is preferable in view of carrying out the pressurization and pressure reduction.

Differential scanning calorimetry (DSC) of a 20 weight % solution of cellulose acylate (degree of acetylation: 60.9%, viscosity mean degree of polymerization: 299) dissolved into methyl acetate reveals that the solution shows a pseudo phase transition point between the sol state and gel state at around 33° C., wherein the solution can exist in a gel form below this temperature. It is therefore necessary to store the solution at a temperature not lower than the pseudo phase transition temperature, and more preferably at a temperature higher by 10° C. or around than the pseudo phase transition temperature. It is to be noted herein that the pseudo phase transition temperature will differ by degree of acetylation and viscosity mean degree of polymerization of cellulose acylate, concentration of the solution, and organic solvent used herein.

The cellulose acylate film is produced using thus-prepared cellulose acylate solution (dope) by the solvent cast process.

The dope is cast and spread on a drum or a band, and the solvent is allowed to vaporize so as to form a film. Concentration of the dope before the casting is preferably adjusted so as to have a solid content of 18 to 35%. The surface of the drum or band is preferably mirror-finished. Methods of the casting and drying for the solvent cast process are described in the individual patent specifications of U.S. Pat. No. 2,336,310, ditto U.S. Pat. No. 2,367,603, ditto No. U.S. Pat. No. 2,492,078, ditto U.S. Pat. No. 2,492,977, ditto U.S. Pat. No. 2,492,978, ditto U.S. Pat. No. 2,607,704, ditto U.S. Pat. No. 2,739,069, ditto U.S. Pat. No. 2,739,070, British Patent No. 640731 and ditto 736892, and in the individual published patent specifications of Japanese Examined Patent Publication "Tokkosho" No. 45-4554 and ditto No. 49-5614, Japanese Laid-Open Patent Publication "Tokkaisho" No. 60-176834, ditto No. 60-203430 and ditto No. 62-115035.

The dope is preferably cast and spread on the drum or band conditioned to have a surface temperature of 10° C. or below. It is preferable to dry the cast dope under an air blow for 2 seconds or longer. It is also allowable to separate the obtained film from the drum or band, and to vaporize the residual solvent by blowing a hot air at temperatures sequentially varied from 100 to 160° C. This method is described in Examined Japanese Patent Publication "Tokkohei" No. 5-17844. This method makes it possible to shorten the time required from the casting to the separation. In order to make effect of this method, it is necessary for the dope to gellate at the surface temperature of the drum or band during the casting and spreading.

The cellulose acylate film may be added with a plasticizer in order to improve the mechanical characteristics or rate of drying. Phosphoric acid ester or carboxylic acid ester is used as the plasticizer. Examples of the phosphoric acid ester include triphenyl phosphate (TPP) and tricresyl phosphate (TCP). As the carboxylic acid ester, phthalic ester and citric acid ester are representative. Examples of the phthalic acid ester include dimethyl phthalate (DMP), diethyl phthalate (DEP), dibutyl phthalate (DBP), dioctyl phthalate (DOP), diphenyl phthalate (DPP) and diethylhexyl phthalate (DEHP). Examples of the citric acid ester include triethyl O-acetyl citrate (OACTE) and tributyl O-acetyl citrate (OACTB). Other examples of the carboxylic acid ester include butyl oleate, methylacetyl ricinoleate, dibutyl sebacate, and various trimellitic acid esters. Preferably used are phthalic acid ester-base plasticizers (DMP, DEP, DBP, DOP, DPP, DEHP) DEP and DPP are particularly preferable.

Amount of addition of the plasticizer is preferably adjusted to 0.1 to 25 weight % of amount of cellulose ester, more preferably 1 to 20 weight %, and most preferably 3 to 15 weight %.

The cellulose acylate film may be added with an anti-degradation agent (e.g., antioxidant, peroxide decomposing agent, radical inhibitor, metal inactivator, acid capture agent, amine). The anti-degradation agent is described in Japanese Laid-Open Patent Publication "Tokkaihei" No. 3-199201, ditto. ditto No. 5-1907073, ditto No. 5-194789, and ditto No. 5-271471, ditto No. 6-107854. Amount of addition of the anti-degradation agent is preferably adjusted to 0.01 to 1 weight % of the prepared solution (dope), and more preferably 0.01 to 0.2 weight %, in view of allowing the effect of addition to exhibit, and of suppressing the bleeding-out of the anti-degradation agent coming up to the film surface. Particularly preferable examples of the anti-degradation agent include butylated hydroxytoluene (BHT) and tribenzylamine (TBA).

<<Stretching of Cellulose Acylate Film>>

Retardation of the cellulose acylate film can be adjusted by stretching. Stretching ratio is preferably 3 to 100%.

There is no special limitation on the method of stretching, and any known methods are applicable. Tenter stretching is particularly preferable in view of in-plane uniformity. The cellulose acylate film used in the present invention preferably has a width of at least 100 cm, and a variation in the Re value over the width of ±5 nm, and more preferably ±3 nm. Variation in the Rth value is preferably ±10 nm, and more preferably ±5 nm. Also variations in the Re value and Rth value in the longitudinal direction preferably fall within the ranges same as those for the width-wise variations.

The stretching may be carried out during the film formation process, or the wound-up film after the formation may be stretched. In the former case, the film may be stretched as containing a certain amount of residual solvent, wherein the film is preferably stretched under an amount of residual solvent of 2 to 30%. In this case, it is preferable to transfer the film in the longitudinal direction thereof and to concomitantly stretch it in the direction normal to the longitudinal direction, to thereby align the slow axis of the film in the direction normal to the longitudinal direction thereof.

Stretching temperature can appropriately be selected depending on the amount of residual solvent during the stretching and the thickness. The film stretched as containing the residual solvent is preferably dried after the stretching. Methods of drying may be similar to those adopted in the production of the film described in the above.

Thickness of the stretched cellulose acylate film is preferably 110 μm or less, more preferably 40 to 110 μm, still more preferably 60 to 110 μm, and most preferably 80 to 110 μm.

<<Surface Treatment of Cellulose Acylate Film>>

For the case where an optical compensation film composed of the cellulose acylate film is used as a transparent protective film of the polarizing plate, the cellulose acylate film is preferably surface-treated. The surface treatment may be corona discharge treatment, glow discharge treatment, flame treatment, acid treatment, alkali treatment or ultraviolet irradiation treatment. It is particularly preferable to carry out the acid treatment or alkali treatment, which is a saponification treatment for cellulose acylate.

The above-described cellulose acylate film, stretched as containing the rod-like compound having at least two aromatic rings and a linear structure, satisfying the desired retardation values Re, Rth, and Re/Rth, and having a thickness of 40 μm to 110 μm, can satisfy the optical characteristics necessary for the transparent film of the present invention, and can be used as the transparent film for various types of liquid crystal displays.

It is also preferable to use, as the above-described transparent film, the cellulose acylate film of the present invention.

A cellulose acylate film is known to be differed in the wavelength dependence of Re or Rth depending on the substitution degree (proportional to ratio of acylation). Higher substitution degree tends to result in decrease in Re (Rth) on the short wavelength side, and increase in Re (Rth) on the long wavelength side.

In the cellulose acylate film of the present invention, the substitution degree of cellulose acylate is varied by 0.05 or more within a range from 2.00 to 3.00 along with a thickness-wise direction of the film. The width of variation is preferably 0.07 or more, further preferably 0.08 or more, still further preferably 0.09 or more, and most preferably 0.10 or more.

It is generally preferable that the cellulose acylate film is produced by the solution casting process, and is preferably stretched while the film retains 2 to 100% by weight of residual solvent. Specific examples of these processes will be detailed later. The present inventors analyzed the stretched film, and found out that the stretching-induced orientation degree of the cellulose acylate molecules is varied along with the thickness-wise direction. More specifically, the outer portion of the film was found to have larger stretching-induced orientation degree than the inner portion had. This is supposedly because the residual solvent retained in the inner portion of the film relaxes the orientation even after being stretched, and this consequently results in increase in the stretching-induced degree of orientation in the outer portion.

More specifically, when the cellulose acylate film having a layer of large substitution degree (ratio of acylation) on the outer side thereof, and having a layer of small substitution degree (ratio of acylation) on the inner side thereof, is stretched in a state retaining the residual solvent, the stretching-induced Re value is largely affected by the layer having the large substitution degree (ratio of acylation), composing the outer layer of the film, whereas the Rth value is affected by the whole film due to surface orientation achieved by reduction in the thickness of the whole film with progress of the drying. The film differed in the wavelength dependence of the Re value and the Rth value can be obtained. The substitution degree in the outer portion is preferably adjusted to 2.71 to 3.00 (59.0 to 62.5% on the basis of ratio of acetate formation of cellulose acetate), and the substitution degree in the inner portion is preferably adjusted to 2.56 to 2.87 (57.0 to 61.0% on the basis of ratio of acetate formation of cellulose acetate). More preferably, the outer portion has a value from 2.75 to 2.92 (59.5 to 61.5%), and the inner portion has a value from 2.64 to 2.83 (58.0 to 60.5%). As for ratio of thickness of the outer portion and the inner portion, the thickness of the outer portion is preferably adjusted to 0.01 to 0.5, more preferably 0.05 to 0.4, assuming the total thickness as 1. Absolute values for Re and Rth, and wavelength dependence thereof are appropriately adjustable by using additives described later.

The cellulose acylate film of the present invention has Re/Rth(450 nm), a ratio of Re to Rth measured at 450 nm, 0.4 to 0.95 times (preferably 0.4 to 0.9 times and more preferably 0.6 to 0.8 times) as large as Re/Rth(550 nm) at 550 nm; and has Re/Rth(650 nm) at 650 nm 1.05 to 1.93 times (preferably 1.1 to 1.9 times and more preferably 1.2 to 1.7 times) as large as Re/Rth(550 nm) at 550 nm. It is also preferred that the film, of which Re/Rth(450 nm), Re/Rth(550 nm) and Re/Rth(650 nm) respectively fall within the range from 0.1 to 0.8.

The retardation in a thickness direction, Rth, in the whole of the cellulose acylate film may have an ability of canceling the retardation of a liquid crystal layer in a black state, and, thus, the preferred range of Rth of in the whole of the cellulose acylate film may depend on the types of the liquid crystal layers. For example, when the cellulose acylate film is used in an OCB-type liquid crystal display comprising a liquid crystal cell having Δn·d of 0.2 to 1.5 micro meters, in which d is a thickness and Δn is a birefringence of, the Rth of the film is preferably from 70 to 400 nm, more preferably from 100 to 400 nm, and much more preferably from 160 to 300 nm. In general, the Re of the film is preferably from 20 to 110 nm, more preferably from 20 to 70 nm and much more preferably from 35 to 70 nm.

(Cellulose Acylate)

Source cottons for cellulose acylate may be those publicly known (see JIII Journal of Technical Disclosure No. 2001-1745, for example). Synthesis of cellulose acylate may also be carried out according to the publicly-known methods (see "Mokuzai Kagaku (Wood Chemistry)", edited by Migita et al., p. 180-190, published by Kyoritsu Shuppan Co., Ltd., 1968). Viscosity mean degree of polymerization of cellulose acylate preferably falls within a range from 200 to 700, more preferably from 250 to 500, and most preferably from 250 to 350. Cellulose ester used for the present invention preferably has a narrow molecular weight distribution in terms of Mw/Mn measured by gel permeation chromatography (Mw is weight average molecular weight, and Mn is number average molecular weight). A specific value of Mw/Mn is preferably 1.5 to 5.0, more preferably 2.0 to 4.5, and most preferably 3.0 to 4.0.

There is no special limitation on the acyl group in the cellulose acylate film, wherein preferable examples include acetyl group and propionyl group, and acetyl group is particularly preferable. Degree of substitution of the entire acyl group is preferably 2.7 to 3.0, and more preferably 2.8 to 2.95. The degree of substitution of acyl group described in this patent specification refers to a value calculated conforming to ASTM D817. The acyl group is most preferably acetyl group. For the case where the cellulose acetate having acetyl group as the acyl group thereof is used, the degree of acetylation preferably falls within a range from and 59.0 to 62.5%, and more preferably from 59.0 to 61.5%. The degree of acetylation regulated within these ranges is successful in preventing Re from increasing beyond a desired value due to transfer tension during the cast spreading, in reducing in-plane variation thereof, and in suppressing variations in the retardation value depending on temperature and humidity. In view of suppressing the variations in Re and Rth, the degree of substitution by an acyl group at the 6-position is preferably adjusted to 0.9 or above.

(Co-Casting)

The cellulose acylate film of the present invention, having different ratio of acylation in the thickness-wise direction, is preferably produced by the co-casting process.

The following paragraphs will specifically explain procedures of the co-casting process preferably employed by the present invention.

In the co-casting process, it is preferable to cast two or more types of cellulose acylate solutions in a layered manner onto a smooth band or a drum formed of a metal substrate.

When a multi-layered cast film or a multi-film is formed by the solution film forming process, a feed-block-type casting die is often used. The feed-block-type casting die is a casting device having a casting die, and a stream-joining unit coupled therewith on the upstream side thereof, in which two or more dopes are brought into confluence. A representative structure of the feed-block-type casting die is such as having, at the center thereof, a fluid passageway allowing a dope for forming a core layer to flow therethrough, and fluid passageways provided on both sides thereof allowing a dope for forming a top layer on the front side and a back layer on the back side to flow therethough, and such as allowing two latter solution streams to join the former solution flow on both sides thereof. An exemplary method of fabricating a multi-layered film using the above-described, feed-block-type casting die is also described in Japanese Examined Patent Publication "Tokkosho" No. 62-43846, in which a multi-layered cast film is formed using a dope, having a relatively high viscosity, for forming a resin layer intended to be the core layer, and a dope, having a relatively low viscosity, for forming surficial layers on the front and back sides of the core layer, and then dried and peeled off.

For the case where a plurality of cellulose acylate solutions are cast, it is also allowable to form a film while allowing the solutions containing cellulose acylate to be extruded through a plurality of casting ports arranged at regular intervals in the direction of travel of a metal support, methods applicable thereto being described, for example, in Japanese Laid-Open Patent Publication "Tokkaisho" No. 61-158414, Japanese Laid-Open Patent Publication "Tokkaihei" No. 1-122419, and ditto No. 11-198285. It is also allowable to form the film by allowing the cellulose acylate solutions to be extruded through two casting ports, and this can be carried out by any of the methods described, for example, in Japanese Examined Patent Publication "Tokkosho" No. 60-27562, Japanese Laid-Open Patent Publication "Tokkaisho" No. 61-94724, ditto No. 61-947245, ditto No. 61-104813, ditto No. 61-158413, and Japanese Laid-Open Patent Publication "Tokkaihei" No. 6-134933. It is also allowable to adopt a method of casting a cellulose acylate film as described in Japanese Laid-Open Patent Publication "Tokkaisho" No. 56-162617, in which a stream of a high-viscosity cellulose acylate solution is surrounded by a stream of a low-viscosity cellulose acylate solution, and these high- and low-viscosity solutions are extruded at the same time. Another preferable embodiment relates to that a solution for the outer layer has a larger content of an alcoholic component, which is a poor solvent, than a solution for the inner layer has, as described in Japanese Laid-Open Patent Publication "Tokkaisho" Nos. 61-94724 and 61-94725.

It is also allowable to use two casting ports, wherein a film formed on a metal support through a first casting port is peeled off, and casting is then carried out through a second casting port onto the film on the side thereof previously in contact with the metal support, the method being described, for example, in Japanese Examined Patent Publication "Tokkosho" No. 44-20235. The cellulose acylate solutions to be cast may be the same or different ones, not specifically limited. In view of providing a plurality of cellulose acetate layers with functions, what is essential is to cast the cellulose acylate solutions corresponded to such functions through the individual casting ports.

The cellulose acylate solution in the present invention can be cast together with solutions for other functional layers (e.g., adhesive layer, dye layer, antistatic layer, anti-halation layer, UV absorption layer, polarizing layer, etc.).

With the conventional solution for forming a single layer, a necessary film thickness could be obtained only by extruding a high-concentration, high-viscosity cellulose acylate solution, but this often undesirably resulted in grain-forming failure or poor planarity, due to instability of such cellulose acylate solution and deposition of solid contents. Casting of a plurality of cellulose acylate solutions through the casting ports, aimed at solving this problem, made it possible to extrude a high-viscosity solution at the same time onto the metal substrate, and this not only made it possible to fabricate an excellent planar film improved in the planarity, but also to reduce drying load through use of the dense cellulose acylate solution, to thereby raise the production speed.

In the co-casting, it is also made possible to fabricate a stacked-structured cellulose acylate film by co-casting cellulose acylate solutions differed not only in the ratio of acylation, but also in contents of additives such as plasticizer, UV absorber, matting agent and so forth described later. For example, it is made possible to fabricate a cellulose acylate film having a configuration of skin layer/core layer/skin layer. For example, a larger amount of the matting agent may be included in the skin layer, or it may be contained only in the skin layer. Larger amounts of the plasticizer and the UV absorber may be included in the core layer than in the skin layer, and they may be contained only in the core layer. Species of the UV absorber may be varied between the core layer and the skin layer. For example, the skin layer may be added with a low-volatile plasticizer and/or UV absorber, and the core layer may be added with a plasticizer excellent in plasticity or with a UV absorber excellent in UV absorption property. Also addition of a releasing agent only to the skin layer on the metal substrate side is a preferable embodiment. In the cooling drum process, it is also allowable to add a larger amount of alcohol, which is a poor solvent, to the skin layer than to the core layer, in order to cool the metal support to thereby gellate the solution. The skin layer and the core layer may have different Tg values, wherein it is preferable that Tg of the core layer is lower than Tg of the skin layer. Also viscosity of the solution containing cellulose acylate during casting may differ between the skin layer and the core layer, wherein the viscosity of the skin layer is preferably smaller than the viscosity of the core layer, but the viscosity of the core layer smaller than the viscosity of the skin layer is also allowable.

In further detail, methods of co-casting adopted in the present invention include a method of uniformly extruding prepared dopes from a pressurized die onto a metal support; the doctor blade method controlling thickness of the dope once cast on the metal support using a blade; and a method using a reverse roll coater by which the thickness is controlled using a reverse-rotating roll. Of these, the method using the pressurized die is preferable. Any of the pressurized dies having variations of coat hunger type, T-die type and so forth are preferably used. Besides the methods listed in the above, any of various publicly-known methods of film formation based on casting of a cellulose triacetate solution (such as those disclosed in Japanese Laid-Open Patent Publication "Tokkaisho" No. 61-94724, ditto No. 61-148013, Japanese Laid-Open Patent Publication "Tokkaihei" No. 4-85011, ditto No. 4-286611, ditto No. 5-185443, ditto No. 5-185445, ditto No. 6-278149, J ditto No. 8-207210) can preferably be used, wherein setting of the individual conditions taking difference in boiling point of the solvent to be employed, for example, into consideration will be successful in obtaining the effects equivalent to those described in the individual patent specifications.

As an additional invention related to co-casting, Japanese Laid-Open Patent Publication No. 53-134869 describes an invention aimed at increasing speed of casting, in which a cellulose acetate solution is cast from a first casting port so as to form 10 to 90% of the total thickness of the film, and then the residual portion is cast from a second casting port located at a position 30 to 60% of the distance ranging from the first casting port to the site of separation.

Japanese Laid-Open Patent Publication "Tokkaisho" No. 61-018943 describes an invention aimed at increasing speed of casting, in which a TAC film is formed using dope (A) containing dichloromethane, methanol and other poor solvents, and dope (B) raised in the ratio of content of the poor solvents as compared with dope (A), wherein dope (A) is co-cast on the support so as to attain an undried film thickness of 5 μm or more. The patent specification also discloses that it is preferable to use a composite slit die, and to combine streams of dopes (A) and (B) on the midway of the slit. This invention can give a similar effect if dichloromethane is replaced with a non-chlorine solvent, and this is also adoptable to the present invention.

Japanese Laid-Open Patent Publication "Tokkaihei" No. 4-124645 describes an invention aimed at obtaining a magnetic recording layer having a desirable planarity, in which used is a stripe-patterned, co-casting die having a slit extending from a single manifold towards the point of confluence, and having with a comb-like sectional geometry.

Japanese Laid-Open Patent Publication "Tokkaihei" No. 8-207210 describes an invention aimed at ensuring excellent levels of transparency, dimensional stability and wet-heat resistance, and decreasing solvent content in the as-produced film, in which a surface layer of 0.5 to 15 μm thick composed of cellulose acetate having a substitution degree>2.8 is provided around, or on at least on one side of a cellulose acetate core portion having a substitution degree<2.7.

Japanese Laid-Open Patent Publication "Tokkaihei" No. 10-058514 describes an invention aimed at preventing separation residue of a well-smoothened film, in which a dope for forming a surficial layer is co-cast as covering a dope for forming a base layer (excluding both edge portions) at the same time from a die.

Japanese Laid-Open Patent Publication "Tokkaihei" No. 5-040321 describes an invention related to a sensitive material obtained by co-casting a magnetic dope and a non-magnetic dope.

Japanese Laid-Open Patent Publication "Tokkai" No. 2000-317960 describes an invention aimed at obtaining a multi-layered resin film having a further improved uniformity in the thickness, in which a low-viscosity liquid and a high-viscosity liquid having a viscosity 2 to 10 times larger than that of the low-viscosity liquid are fed through the individual fluid passageways, both liquids are allowed to join in a feed-block-type confluent device to thereby form a parallel liquid flow interfaced with each other, and the parallel liquid flow is then discharged out from a cast die lip within a period of time 5 to 25 seconds after the confluence, to thereby form a multi-layered cast film.

Japanese Laid-Open Patent Publication "Tokkai" No. 2002-221620 describes that a film for the polarizing plate can suppress inclination of streaky irregularity of 3 to 5 mm pitch to as small as less than 0.040, by co-casting the film while reducing the concentration in the outer layer thereof.

Japanese Laid-Open Patent Publication "Tokkai" No. 2003-080541 describes an invention aimed at suppressing skinning, in which a ratio A/B, where "A" being shear viscosity of a dope forming a top or back layer, and "B" being shear viscosity of a dope forming an intermediate layer, is adjusted to A/B<0.9, when a plurality of dopes are cast from a die.

Japanese Laid-Open Patent Publication "Tokkai" No. 2003-014933 describes an invention of a retardation film causing only a less amount of breeding-out of additives, not causative of separation between the adjacent layers, desirable in the slipping property, and excellent in the transparency.

Japanese Laid-Open Patent Publication "Tokkai" No. 2003-014933 describes that it is preferable to add fine particles to the surficial layer in order to impart slipping property to the film, and that the core layer need not be added with the fine particles, although the addition is allowable. It is however noted that too much addition of the fine particles to the core layer will degrade the transparency of the film, so that the amount of addition is preferably limited to 1/10 or less of the amount of addition to the surficial layer, and more preferably the core layer contains substantially no fine particles ("contains substantially no fine particles" means the amount of addition of the fine particles is 0 to 0.01% by weight on the solid basis). It is also disclosed that an effect of imparting the slipping property can be obtained if the fine particles are added at least one of both surficial layers, wherein average particle size of the primary fine particles is preferably 20 nm or smaller in view of suppressing haze to a low level, more preferably 16 to 5 nm, and in particular preferably 12 to 5 nm. It is also disclosed that the apparent specific gravity of the fine particles is preferably 70 g/l or larger, more preferably 90 to 200 g/l, and in particular preferably 100 to 200 g/l, wherein a larger apparent specific gravity makes it possible to prepare a dispersion solution of a higher concentration, and this is preferable in view of improving haze and aggregate. Silicon oxide fine particles having an average particle size of the primary particles of 20 nm or smaller and an apparent specific gravity of 70 g/l or larger can be obtained by combusting a mixture of gasified silicon tetrachloride and hydrogen at 1,000 to 1,200° C. in the air. It is also disclosed that such particles are commercialized under the trade names of, for example, Aerosil 200V and Aerosil R972V (both available from Nippon Aerosil Co., Ltd.).

(Stretching)

The cellulose acylate film of the present invention exhibits its function after being stretched.

Preferable methods of stretching will specifically explained below.

The cellulose acylate film of the present invention is preferably stretched in the width-wise direction in view of applying it to the polarizing plate. The methods are disclosed in Japanese Laid-Open Patent Publication "Tokkaisho" No. 62-115035, Japanese Laid-Open Patent Publication "Tokkaihei" No. 4-152125, ditto No. 4-284211, ditto No. 4-298310, ditto No. 11-48271, for example. The stretching of the film is carried out under normal temperature or heating conditions. Temperature of heating is preferably not higher than the glass transition point of the film. The stretching of the film may be either of uniaxial and biaxial. The film can be stretched during the process of drying, and can effectively be done in particular under the presence of residual solvent. The film is stretched typically by controlling speed of feeding rollers, wherein speed of winding up the film is set faster than speed of peeling off the film. The film can be stretched also by gradually widening the width of a tenter, while the film is held by the tenter in the width-wise direction. It is also allowable to stretch the film after being dried, using a stretching machine (preferably by uniaxial stretching using a long stretching machine). Factor of stretching of the film (ratio of amount of increase in the length by stretching to the initial length) is preferably 0.5 to 300%, more preferably 1 to 200%, and particularly preferably 1 to 100%. The cellulose acylate film of the present invention is preferably produced by sequentially or continuously carrying out a process step of forming the film by the solvent-cast process, and a process step of stretching the obtained film, and the factor of stretching is preferably 1.2 to 1.8, both ends inclusive. The stretching may be carried out by a single-step process or a multiple-step process. The multiple-step process is acceptable if a product of the individual factors of stretching falls in the above range.

Speed of stretching preferably falls in a range from 5%/min to 1000%/min, and more preferably from 10%/min to 500%/min. Temperature of stretching preferably falls in a range from 30° C. to 160° C., more preferably from 70° C. to 150° C., and in particular preferably from 85 to 150° C. The stretching is preferably carried out using a heat roll and/or radiation heat source (e.g., IR heater) or hot air blow. In order to raise uniformity of the temperature, it is also allowable to provide a thermostat chamber. The uniaxial stretching based on roll stretching is preferably carried out under a ratio L/W of roll-to-roll distance (L) and width (W) of the retardation plate set to 2.0 to 5.0.

The stretching is preferably preceded by a preheating step. It is also allowable to provide annealing after the stretching. The annealing is preferably carried out at a temperature ranging from a value lower by 20° C. to a value higher by 10° C. than the glass transition point of the cellulose acetate film, for a process time ranging from 1 second to 3 minutes. Methods of heating may be zonal heating or partial heating using an infrared radiation heater. The film may be slit off at both edges thereof during or after the process. Offcut of the slitting is preferably recovered and recycled as the source material. As for the tenter, Japanese Laid-Open Patent Publication "Tokkaihei" No. 11-077718 describes drying of a web held by a tenter in the width-wise direction, in which appropriate control of method of blowing a drying gas, blow-out angle, distribution of speed of blowing, speed of blowing, volume of blowing, temperature difference, difference in volume of blowing, ratio of volume of blowing from the upper and lower sides of the web, use of a high-specific-heat drying gas, and so forth makes it possible to successfully prevent degradation of film quality, such as planarity, when the process speed in the solvent casting process is increased, or when the width of the web is widened.

Japanese Laid-Open Patent Publication "Tokkaihei" No. 11-077822 describes an invention aimed at preventing non-uniformity, in which the stretched thermoplastic resin film is annealed under a temperature gradient in the width-wise direction of the film in the thermal relaxation process.

Japanese Laid-Open Patent Publication "Tokkaihei" No. 4-204503 describes an invention aimed at further preventing the non-uniformity, in which the film is stretched while limiting the solvent content of the film to 2 to 10% on the solid basis.

Japanese Laid-Open Patent Publication "Tokkai" No. 2002-248680 describes an invention aimed at suppressing curling through specifying the width of bite of clips, in which the stretching is carried out under a condition of width of bite of the tenter clips $D \leqq [33/\{\log(\text{factor of stretching}) \times \log(\text{mass of vaporization})\}]$, so as to suppress the curling, to thereby facilitate carriage of the film after the stretching process.

Japanese Laid-Open Patent Publication "Tokkai" No. 2002-337224 describes an invention aimed at balancing high-speed feeding of a soft film and the stretching, in which the carriage by the tenter is assisted by pins in the first half, and by clips in the second half.

Japanese Laid-Open Patent Publication "Tokkai" No. 2002-187960 describes an invention aimed at readily improving viewing angle characteristics and at improving the viewing angle, in which a cellulose ester dope solution is cast onto a support for casting, and the web (film) peeled off from the support for casting is then stretched at least unidirectionally by a factor of 1.0 to 4.0, within a period of time while an amount of residual solvent in the web is kept at 100% by weight or less, in particular within a range from 10 to 100% by weight, to thereby obtain a film having an optical biaxiality. It is also described that a more preferable embodiment relates to stretching of the film at least unidirectionally by a factor of 1.0 to 4.0, within a period of time while an amount of residual solvent in the web is kept at 100% by weight or less, in particular within a range from 10 to 100% by weight. Other methods for the stretching enumerated therein include a method of stretching a web in the longitudinal direction through a plurality of rolls differed in the peripheral speed, making use of difference in the peripheral speed; a method of stretching a web in the longitudinal direction by widening a distance, in the direction of feeding, between clips or pins holding both edges of the web; a method of stretching a web in the transverse direction by widening the distance, in the transverse direction in a similar manner; a method of stretching a web in the longitudinal and transverse directions by widening the distance both in the longitudinal and transverse directions at the same time; and combinations of any of these methods. It is also described that so-called tenter method can provide a smooth stretching and can desirably avoid any risks of rupture and so forth, by driving the portions of clipping based on the linear drive system.

Japanese Laid-Open Patent Publication "Tokkai" No. 2003-014933 describes an invention aimed at fabricating a retardation film less causative of breeding-out of additives, free from separation between the adjacent layers, excellent in the slipping property and in transparency, in which dope "A" containing a resin, an additive and an organic solvent, and dope "B" containing a resin and an organic solvent, and containing no additive or only a smaller amount of additive than in dope "A" are prepared, the dope "A" and the dope "B" are then co-cast on a support so that the dope "A" forms a core and so that the dope "B" forms a surficial layer, the organic solvent is vaporized off to an extent allowing separation of a web, the web is separated from the support, and the web is stretched at least unidirectionally by a factor of 1.1 to 1.3, while keeping a content of residual solvent in the resin film, during the stretching, of 3 to 50% by weight. More preferable embodiments described therein include stretching of the web, after being separated from the support, at least unidirectionally by a factor of 1.1 to 3.0 within a temperature range of stretching from 140° C. to 200° C.; preparation of dope "A" containing a resin and an organic solvent and dope "B" containing a resin, a fine particle and an organic solvent, co-casting of dope "A" and dope "B" on the support so that dope "A" forms the core and dope "B" forms the surficial layer, drying of the web to an extent allowing separation of the web, separation of the web from the support, and stretching of the web at least unidirectionally by a factor of 1.1 to 3.0 while keeping a content of residual solvent in the resin film, during the stretching, of 3% by weight to 50% by weight; stretching of the web at least unidirectionally by a factor of 1.1 to 3.0 further within a temperature range of stretching from 140° C. to 200° C.; preparation of dope "A" containing a resin, an organic solvent and an additive, dope "B" containing a resin and an organic solvent, and containing or only a smaller amount of an additive than in dope "A", and dope "C" containing a resin, a fine particle and an organic solvent, co-casting of dopes "A", "B" and "C" so that, on the support, dope "A" forms the core, dope "B" forms the surficial layer, and dope "C" forms a surficial layer opposite to dope "B", drying of the web to an extent allowing separation of the web, separation of the web from the support, and stretching of the web at least unidirectionally by a factor of 1.1 to 3.0 while keeping a content of residual solvent in the resin film, during the stretching, of 3% by weight to 50% by weight; stretching of the web at least unidirectionally by a factor of 1.1 to 3.0 further within a temperature range of stretching from 140° C. to 200° C.; selection of the amount of addition of the additive in dope "A" within a range from 1 to 30% by weight of the resin, the additive in dope "B" within a range from 0 to 5% by weight of the resin, and selection of a plasticizer, UV absorber or retardation control agent as the additive; and selection of the organic solvent in dopes "A" and "B" as containing methylene chloride or methyl acetate with a content of 50% by weight or more to the total organic solvent.

Japanese Laid-Open Patent Publication No. 2003-014933 discloses use of a transverse stretching machine called "tenter", with which a web, held at both ends thereof using clips or pins, is stretched in the transverse direction by widening distance between the clips or pins. It is also disclosed that stretching or shrinkage in the longitudinal direction can be effected by widening or narrowing the distance between the clips or pins using a simultaneous biaxial stretching machine, in the direction of feeding (longitudinal direction). It is also disclosed that driving of the portions of clipping based on the linear drive system is desirable in view of effecting a smooth stretching and of reducing risk of rupture and so forth, and that the longitudinal stretching can be effected by a method of stretching the web in the longitudinal direction through a plurality of rolls differed in the peripheral speed, making use of difference in the peripheral speed for the stretching. It is also described that these methods of stretching may be used in combination, and the stretching may separately be carried out in two or more steps such as (longitudinal stretching/transverse stretching/longitudinal stretching) or (longitudinal stretching/transverse stretching).

Japanese Laid-Open Patent Publication "Tokkai" No. 2003-004374 describes an invention aimed at preventing foaming of a web during drying in a tenter, improving the releasing property and preventing dust generation, in which a dryer is designed to have a width shorter than the web width so as to prevent the both edges of the web from being blown by a hot air.

Japanese Laid-Open Patent Publication "Tokkai" No. 2003-019757 describes an invention aimed at preventing foaming of a web during drying in a tenter, improving the releasing property and preventing dust generation, in which an air interception plate is provided inside both edges of the web so as to prevent holding portions by a tenter from being blown by a dry air.

Japanese Laid-Open Patent Publication "Tokkai" No. 2003-053749 describes an invention aimed at further stabilizing the conveyance and drying, in which X and T, wherein X (μm) is post-drying thickness of both edges of a film held by a pin tenter, and T (μm) is post-drying average thickness of a commercialized portion of the film, satisfy any one of relations (1) $40 \leq X \leq 200$ for $T \leq 60$; (2) $40+(T-60) \times 0.2 \leq X \leq 300$ for $60 < T \leq 120$; and (3) $52+(T-120) \times_{0.2} \leq X \leq 400$ for $20 < T$.

Japanese Laid-Open Patent Publication "Tokkaihei" No. 2-182654 describes an invention aimed at preventing wrinkling in a multi-stage tenter, in which a drying chamber of a multi-stage tenter is provided with a heating chamber and a cooling chamber so as to separately cool clips and chains on the left hand side and right hand side.

Japanese Laid-Open Patent Publication "Tokkaihei" No. 9-077315 describes an invention aimed at preventing rupture, wrinkling or failure in conveyance of the web, in which pins of a pin tenter are arranged with a larger density on the inner side, and with a smaller density on the outer side.

Japanese Laid-Open Patent Publication "Tokkaihei" No. 9-085846 describes an invention aimed at preventing foaming of a web per se in a tenter, and at preventing the web from adhering a holding means, in which, in a tenter dryer, pins holding both edges of the web are cooled using a blow-off cooler to a temperature lower than the foaming point of the web, and the pins immediately before being engaged with the web are cooled to a temperature not higher than (dope gellation temperature+15° C.) using a duct-type cooler.

Japanese Laid-Open Patent Publication "Tokkai" No. 2003-103542 describes an invention of a method of solution film formation aimed at avoiding detachment of a pin tenter and at improving foreign matters, in which an insertion structure of the pin tenter is cooled, so that surface temperature of a web in contact with the insertion structure will not exceed the gellation point of the web.

Japanese Laid-Open Patent Publication "Tokkaihei" No. 11-077718 describes an invention aimed at avoiding degradation in quality including planarity, when speed is increased in the solution casting process or when width of a web is widened using a tenter, in which the web is dried in the tenter under conditions of an air flow rate of 0.5 to 20 (40) m/s, temperature distribution in the transverse direction of 10% or less, ratio of air flow rate from the upper and lower sides of the web of 0.2 to 1, and a ratio of dry gas of 30 to 250 J/Kmol. Also disclosed are desirable drying conditions for the drying in the tenter, depending on the amount of residual solvent. More specifically, the disclosure relates to drying of the web after being separated from the support before the amount of residual solvent contained therein reduces to as low as 4% by weight, by setting an angle of blowing from a blow-off port to 30° to 1500 away from the film surface, and by adjusting an air flow rate distribution over the film surface located ahead in the direction of blow-off of a dry gas, so that the lower limit value of the flow rate falls within 20% of the upper limit value; adjustment of the flow rate of the dry gas blown out from a blow-off type dryer to 0.5 m/sec to 20 m/sec, both ends inclusive, for a content of residual solvent in the web of 130% by weight to 70% by weight, both ends inclusive; drying using a dry gas flow blown out at a flow rate of 0.5 m/sec to 40 m/sec, both ends inclusive, under a temperature distribution of the dry gas over the width-wise direction of the web, while adjusting the lower limit value thereof set within 10% of the upper limit value, for the case with an amount of residual solvent of less than 70% by weight and not lower than 4% by weight; and adjustment of a ratio "q" of flow rates of the dry gas blown out from blow-off ports of a blow-off-type dryer, located on the upper and lower sides of the web during conveyance, to $0.2 \leqq q \leqq 1$ for the case with an amount of residual solvent in the web of 4% by weight or more and not larger than 200% by weight. A still more preferable embodiment relates to use of at least a single species of dry gas, having an average specific heat of 31.0 J/K·mol to 250 J/K·mol, both ends inclusive, and drying procedure using the dry gas at the saturated vapor pressure thereof, in which concentration of an organic compound, which exist in a liquid form at normal temperature, contained in the dry gas during the drying is adjusted to 50% or less.

Japanese Laid-Open Patent Publication No. 11-077719 describes an invention aimed at preventing degradation of the planarity and coating due to generation of pollutants, in which, in a TAC film production apparatus, clips of a tenter incorporate a heating unit. A more preferable embodiment relates to provision of a device removing any foreign matters generated at the contact portions of clips and the web, elsewhere on the way from the position where the clips of the tenter release the web, and the position where the clips rehold the web; and removal of the foreign matters making use of a jet of gas or liquid and a brush, wherein residual amount of foreign matters during contact between the clips or pins with the web is kept within a range from 12% by weight to 50% by weight, both ends inclusive, and surface temperature of the contact portion between the clips or pins with the web is adjusted to 60° C. to 200° C. (more preferably 80° C. to 120° C.), both ends inclusive.

Japanese Laid-Open Patent Publication "Tokkaihei" No. 11-090943 describes an invention aimed at improving the planarity, avoiding quality degradation due to the rupture in a tenter, and at improving the productivity, in which a ratio $Lr=Ltt/Lt$ is adjusted so as to satisfy $1.0 \leqq Lr \leqq 1.99$, where Lt (m) being an arbitrary length of conveyance of the tenter, and Ltt (m) being a summation of length of portions, holding a web, of clips of the tenter having the same length with Lt. A more preferable embodiment disclosed therein relates to an arrangement of the portions holding the web, without leaving any gaps therebetween as viewed in the width-wise direction of the web.

Japanese Laid-Open Patent Publication "Tokkaihei" No. 11-090944 describes an invention aimed at improving degraded planarity of a web due to sagging thereof and instability in introducing the web into the tenter, in which a device for suppressing sagging in the width-wise direction of the web is provided in front of the preceding stage of the entrance of a manufacturing machine of plastic films. More preferable embodiments described therein relate to that the sagging suppressive device is a roller capable of revolving within a directional range expressed by an angle of spreading in the width-wise direction of 2 to 600, that a suction system is provided over the web, and that an air blower capable of blowing air from the lower side of the web is provided.

Japanese Laid-Open Patent Publication "Tokkaihei No. 11-090945 describes an invention aimed at preventing sagging which is causative of degradation in the quality and productivity in production of a TAC film, in which a web separated from a substrate is introduced into a tenter while being inclined at an angle away from the horizontal plane.

Japanese Laid-Open Patent Publication "Tokkaihei" No. 2000-289903 describes an invention aimed at fabricating a film with stable physical properties, in which a conveyance device conveying a web while applying tension in the width-wise direction thereof comprises a web width detection unit, a web holding unit, and two or more variable inflection points, and width of a web after being separated is measured using the web width detection unit during a period the web retains 50 to 12 wt % of solvent, and is calculated based on a detected signal, and thereby positions of the inflection points are varied.

Japanese Laid-Open Patent Publication "Tokkai" No. 2003-033933 describes that, for the purpose of further improving the clipping property, preventing rupture of a web over a long duration of time, and obtaining a film with excellent quality, a guide plate preventing web curling at the side edge portions thereof is disposed at least on the lower side, out of the upper side and the lower side, at both of the left and right side edges of the web, on the left hand and right hand sides of a tenter close to a tenter entrance, and a web-opposed surface of the guide plate is configured by a web contact resin component disposed in the direction of conveyance of the web, and a web contact metal component. More preferable embodiments relate to that the web contact resin component composing the web-opposed surface of the guide plate is disposed on the upstream side in the direction of web conveyance, and the web contact metal component is arranged on the downstream side of the same; that the web contact resin component and the web contact metal component composing the guide plate have step difference (including slope) therebetween of 500 μm or less; that the web contact resin component and the web contact metal component of the guide plate respectively have length of contact with the web in the width-wise direction of 2 to 150 mm; that the web contact resin component and the web contact metal component of the guide plate respectively have length of contact with the web in the direction of web conveyance of 5 to 120 mm; that the web contact resin component of the guide plate is provided by surface resin treatment of resin coating on a metal guide substrate; that the web contact resin component of the guide plate is composed solely of resin; that the web-opposed surfaces of the guide plates disposed on the upper and lower sides on the left and right side edge portions of the web are 3 to 30 mm distant from each other; that the distance between the web-opposed surfaces of the upper and lower guide plates on the left and right side edge portions of the web is widened in the direction of web width and towards the inner side, by a rate of 2 mm or more per 100 mm of width; that the upper and lower guide plates on the left and right side edge portions of the web are 10 to 300 mm long, the upper and lower guide plates being arranged as being shifted ahead and behind in the direction of web conveyance, while keeping a length of shift of −200 to +200 mm; that the web-opposed surface of the upper guide plate is composed solely of resin or metal; and that the web contact resin component of the guide plate is made of Teflon (registered trademark) and the web contact metal component is made of stainless steel. It is also described that the web-opposed surface of the guide plate, or the web contact resin component and/or the web contact metal component provided thereto has a surface roughness of 3 μm or less. It is also described that a location of the upper and lower guide plates for preventing curling of the edge portions of the web is preferably selected between the end portion on the separation side of the support and the introduction section of the tenter, and in particular preferably selected close to the entrance of the tenter.

Japanese Laid-Open Patent Publication "Tokkaihei" No. 11-048271 describes an invention aimed at preventing breakage or non-uniformity of the web possibly occurs during drying in a tenter, in which the web is stretched using a width-wise stretching apparatus while the web contains 50 to 12% of solvent, dried, and then applied with pressure of 0.2 to 10 kPa from both sides thereof while it contains 10% or less of solvent. More preferable embodiments disclosed therein relate to that the application of tension is ended while the solvent content is kept at 4% by weight or more, and that the application of the pressure from both sides of the web (film) using nip rolls is preferably carried out using 1 to 8 pairs of nip rolls, and preferably at a temperature during the pressurization of 100 to 200° C.

Japanese Laid-Open Patent Publication "Tokkai" No. 2002-036266 related to an invention of obtaining a high-quality thin tack of 20 to 85 μm thick discloses preferable embodiments such that difference in tension, applied to the web in the direction of conveyance thereof, between portions upstream and downstream of a tenter is adjusted to 8 N/mm² or below; such that the web, after being separated, is further processed in a step of preheating the web, then in a step, successive to the preheating step, of stretching the web using a tenter, and then in a step, successive to the stretching step, of relaxing the web to an extent smaller than the amount of stretching in the stretching step, wherein temperature T1 in the preheating step and in the stretching step is set to (Tg-60)° C., Tg being glass transition point of the film, and temperature T2 in the relaxation step is set to (T1−10)° C.; and such that rate of stretching of the web in the stretching step is adjusted to 0 to 30% on the basis of the width of the web immediately before being put into the stretching step, and rate of stretching of the web in the relaxation step is adjusted to −10 to 10%.

Japanese Laid-Open Patent Publication "Tokkai" No. 2002-225054, aimed at reduction in thickness of the dry film to as small as 10 to 60 μm, reduction in weight, reduction in moisture permeability and improvement in durability, discloses that the web after being separated is held at both edges thereof by clips so as to keep the width unchanged, and allowed to dry before a residual solvent content of 10% by weight is reached, and/or stretched in the width-wise direction, to thereby obtain a film having a degree of surface orientation (S), expressed by an equation $S=\{(Nx+Ny)/2\}-Nz$ of 0.0008 to 0.0020 (where, Nx is the in-plane refractive index of the film observed in a direction showing maximum refractive index, Ny is the in-plane refractive index observed in the direction normal to Nx, and Nz is the refractive index of the film in the thickness-wise direction); that time from the casting to the separation is set to 30 to 90 seconds; and that the web after being separated is stretched in the width-wise direction and/or longitudinal direction.

Japanese Laid-Open Patent Publication "Tokkai" No. 2002-341144 describes an invention aimed at suppressing optical non-uniformity, in which a film is formed by a solution film formation method involving a stretching process, so that mass concentration of a retardation enhancing agent is increased towards the center in the width-wise direction of the film and thereby has a higher optical concentration.

Japanese Laid-Open Patent Publication "Tokkai" No. 2003-071863, disclosing an invention for obtaining a non-clouding film, describes that the factor of stretching in the width-wise direction is preferably 0 to 100%, more preferably 5 to 20% for the case where the film is used as a protective film for a polarizing plate, and most preferably 8 to 15%. On the other hand, it is also disclosed that the film intended for use as a retardation film is more preferably stretched by 10 to 40%, and most preferably by 20 to 30%, wherein Re can be controlled by the factor of stretching, a larger factor of stretching desirably results in a more excellent planarity of the obtained film. It is also described that the residual solvent content in the film subjected to tentering is preferably adjusted to 20 to 100% by weight at the beginning of tentering, wherein the web is preferably dried under tentering so that the residual solvent content of the film reaches 10% by weight or below, and more preferably 5% by weight or below. It is also disclosed that temperature of the drying under tentering is preferably adjusted to 30 to 150° C., more preferably 50 to 120° C., and most preferably 70 to 100° C., wherein lower temperature of drying is less causative of vaporization-off of UV absorber, plasticizer and so forth, and is therefore more contributive to reduction in process contamination, whereas higher temperature is advantageous in achieving better planarity of the film.

Japanese Laid-Open Patent Publication "Tokkai" No. 2002-248639, aimed at reducing longitudinal and transverse dimensional variation during storage under high-temperature, high-humidity conditions, describes a method of fabricating a film comprising casting a cellulose ester solution on a support, and continuously peeling off and drying the film, wherein the film is dried so that rate of dry shrinkage satisfies a relation of (0≦rate of dry shrinkage (%)≦0.1× residual solvent content during peeling-off (%)). More preferable embodiments disclosed therein relate to that any cellulose ester film after being peeled off, having a residual solvent content of 40 to 100% by weight, is reduced in the residual solvent content by 30% by weight or more, while being held at both edges thereof and being conveyed by a tenter; the cellulose ester film after being peeled off has a residual solvent content of 40 to 100% by weight at the entrance of the tenter, and 4 to 20% by weight at the exit of the tenter; that tension applied for conveying the cellulose ester film by the tenter is increased in the direction from the entrance to the exit of the tenter; and that the tension for conveying the cellulose ester film by the tenter is equal to the tension applied in the width-wise direction.

Japanese Laid-Open Patent Publication "Tokkai" No. 2000-239403, aimed at obtaining a film having a small thickness, excellent optical isotropy and excellent planarity, describes that the film is formed so as to satisfy a relation of $0.3X \leq Y \leq 0.9X$, where X is the residual solvent ratio immediately after the peeling-off, and Y is the residual solvent ratio immediately before introduction into a tenter.

Japanese Laid-Open Patent Publication "Tokkai" No. 2002-286933 discloses a method of stretching a cast film, which is exemplified by a method of stretching under heating conditions and a method of stretching under solvent-containing conditions, wherein the stretching under heating conditions is preferably carried out at a temperature not higher than the glass transition point of a resin, whereas the stretching of a cast film under solvent-containing conditions can be carried out by once drying the film, and by bringing the film into contact with the solvent to thereby make the film contain the solvent again before the stretching.

(Retardation Enhancing Agent)

In order to exhibit a desired retardation value, the cellulose acylate film of the present invention preferably uses a retardation enhancing agent.

The "retardation enhancing agent" in the context of this patent specification refers to an "additive" capable of giving a retardation value, measured at 550 nm, of a cellulose acylate film containing a certain additive larger by 20 nm than a retardation value (in a non-stretched state), measured at 550 nm, of a cellulose acylate film similarly produced except that the additive was not added. Amount of increase in the retardation value is preferably 30 nm or larger, more preferably 40 nm or larger, and still more preferably 60 nm or larger.

The retardation enhancing agent is preferably a compound having at least two aromatic rings. The retardation enhancing agent is preferably used in an amount ranging from 0.01 to 20 parts by weight per 100 parts of polymer, more preferably in an amount ranging from 0.1 to 10 parts by weight, still more preferably in an amount ranging from 0.2 to 5 parts by weight, and most preferably in an amount of 0.5 to 2 parts by weight. It is also allowable to use two or more species of retardation enhancing agents.

The retardation enhancing agent preferably shows a maximum absorption in a wavelength region from 250 to 400 nm, but shows substantially no absorption in the visible light region.

In this patent specification, the "aromatic ring" includes aromatic hetero ring, in addition to the aromatic hydrocarbon ring.

The aromatic hydrocarbon ring is preferably a six-membered ring (i.e., benzene ring).

The aromatic hetero ring is generally an unsaturated hetero ring. The aromatic hetero ring is preferably a five-membered ring, six-membered ring or seven-membered ring, and more preferably five-membered ring or six-membered ring. The aromatic hetero ring generally has a possible largest number of double bonds. Hetero atom is preferably a nitrogen atom, oxygen atom or sulfur atom, and more preferably a nitrogen atom. Examples of the aromatic hetero ring include furan ring, thiophene ring, pyrrole ring, oxazole ring, isoxazole ring, thiazole ring, isothiazole ring, imidazole ring, pyrazole ring, furazan ring, triazole ring, pyran ring, pyridine ring, pyridazine ring, pyrimidine ring, pyrazine ring, 1,3,5-triazine ring.

The aromatic ring is preferably any of benzene ring, furan ring, thiophene ring, pyrrole ring, oxazole ring, thiazole ring, imidazole ring, triazole ring, pyridine ring, pyrimidine ring, pyrazine ring and 1,3,5-triazine ring, and in particular 1,3,5-triazine ring is preferably used. More specifically, the compounds disclosed, for example, in Japanese Laid-Open Patent Publication No. 2001-166144 is preferably used.

The number of aromatic rings owned by the retardation enhancing agent is preferably 2 to 20, more preferably 2 to 12, still more preferably 2 to 8, and most preferably 2 to 6.

Relations of bonding of two aromatic rings can be classified into (a) formation of a condensed ring, (b) direct bonding via a single bond, and (c) bonding via a coupling group (aromatic rings cannot form a spiro bond). Any of the relations of bondings (a) to (c) is allowable.

Examples of (a) condensed ring (condensed ring composed of two or more aromatic rings) include indene ring, naphthalene ring, azulene ring, fluorene ring, phenanthrene ring, anthracene ring, acenaphthylene ring, biphenylene ring, naphthacene ring, pyrene ring, indole ring, isoindole ring, benzofuran ring, benzothiophene ring, indolizine ring, benzooxazole ring, benzothiazole ring, benzoimidazole ring, benzotriazole ring, purine ring, indazole ring, chromene ring, quinoline ring, isoquinoline ring, quinolizine ring, quinazoline ring, cinnoline ring, quinoxaline ring, phthalazine ring, pteridine ring, carbazole ring, acridine ring, phenanthridine ring, xanthene ring, phenazine ring, phenothiazine ring, phenoxathiin ring, phenoxazine ring and thianthrene ring. Preferable are naphthalene ring, azulene ring, indole ring, benzooxazole ring, benzothiazole ring, benzoimidazole ring, benzotriazole ring and quinoline ring.

The single bond for (b) is preferably a bond between carbon atoms of two aromatic rings. It is also allowable to bind two aromatic rings by two or more single bonds to thereby form an aliphatic ring or a non-aromatic heterocycle between two aromatic rings.

Also the coupling group for (c) preferably binds carbon atoms of two aromatic rings. The coupling group is preferably any of alkylene group, alkenylene group, alkynylene group, —CO—, —O—, —NH—, —S—, or any combinations of them. Examples of the coupling groups based on such combinations will be shown below. The left-hand side and the right-hand side of the coupling groups below may be inverted:

c1: —CO—O—;

c2: —CO—NH—;

c3: -alkylene-O—;

c4: —NH—CO—NH—;

c5: —NH—CO—O—;

c6: —O—CO—O—;

c7: —O-alkylene-O—;

c8: —CO-alkenylene-;

c9: —CO-alkenylene-NH—;

c10: —CO-alkenylene-O—;

c11: -alkylene-CO—O-alkylene-O—CO-alkylene-;

c12: —O-alkylene-CO—O-alkylene-O—CO-alkylene-O—;

c13: —O—CO-alkylene-CO—O—;

c14: —NH—CO-alkenylene-; and c15: —O—CO-alkenylene-.

The aromatic ring and the coupling group may have a substituent group.

Examples of the substituent group include halogen atom (F, Cl, Br, I), hydroxyl, carboxyl, cyano, amino, nitro, sulfo, carbamoyl, sulfamoyl, ureido, alkyl group, alkenyl group, alkylenyl group, aliphatic acyl group, aliphatic acyloxy group, alkoxy group, alkoxycarbonyl group, alkoxycarbonylamino group, alkylthio group, alkylsulfonyl group, aliphatic amido group, aliphatic sulfonamide group, aliphatic substituted amino group, aliphatic substituted carbamoyl group, aliphatic substituted sulfamoyl group, aliphatic substituted ureido group and non-aromatic heterocyclic group.

The number of carbon atoms of the alkyl group is preferably 1 to 8. Chain-formed alkyl group is more preferable than cyclic alkyl group, and straight-chain-formed alkyl group is particularly preferable. The alkyl group may further have a substituent group (e.g., hydroxy, carboxy, alkoxy group, alkyl substituted amino group). Examples of the alkyl group (substituted alkyl group also included) include methyl, ethyl, n-butyl, n-hexyl, 2-hydroxyethyl, 4-carboxybutyl, 2-methoxyethyl and 2-diethylaminoethyl groups.

The number of carbon atoms of the alkenyl group is preferably 2 to 8. Chain-formed alkenyl group is more preferable than cyclic alkenyl group, and straight-chain-formed alkenyl group is particularly preferable. The alkenyl group may further has a substituent group. Examples of the alkenyl group include vinyl, allyl, 1-hexenyl groups.

The number of carbon atoms of the alkylenyl group is preferably 2 to 8. Chain-formed alkynyl group is more preferable than cyclic alkynyl group, and straight-chain alkylenyl group is particularly preferable. The alkylenyl group may further have a substituent group. Examples of the alkylenyl group include ethynyl, 1-butynyl and 1-hexynyl groups.

The number of carbon atoms of the aliphatic acyl group is preferably 1 to 10. Examples of the aliphatic acyl group include acetyl, propanoyl and butanoyl groups.

The number of carbon atoms of the aliphatic acyloxy group is preferably 1 to 10. Examples of the aliphatic acyloxy group include acetoxy group.

The number of carbon atoms of the alkoxy group is preferably 1 to 8. The alkoxy group may further have a substituent group (e.g., alkoxy group). Examples of the alkoxy group (including substituted alkoxy group) include methoxy, ethoxy, butoxy and methoxyethoxy groups.

The number of carbon atoms of the alkoxycarbonyl group is preferably 2 to 10. Examples of the alkoxycarbonyl group include methoxycarbonyl and ethoxycarbonyl groups.

The number of carbon atoms of the alkoxycarbonylamino group is preferably 2 to 10. Examples of the alkoxycarbonylamino group include methoxycarbonylamino and ethoxycarbonylamino groups.

The number of carbon atoms of the alkylthio group is preferably 1 to 12. Examples of the alkylthio group include methylthio, ethylthio and octylthio groups.

The number of carbon atoms of the alkylsulfonyl group is preferably 1 to 8. Examples of the alkylsulfonyl group include methane sulfonyl and ethane sulfonyl groups.

The number of carbon atoms of the aliphatic amido group is preferably 1 to 10. Examples of the aliphatic amido group include acetamido group.

The number of carbon atoms of the aliphatic sulfonamide group is preferably 1 to 8. Examples of the aliphatic sulfonamide group include methane sulfonamide, butane sulfonamide and n-octane sulfonamide groups.

The number of carbon atoms of the aliphatic substituted amino group is preferably 1 to 10. Examples of the aliphatic substituted amino group include dimethylamino, diethylamino and 2-carboxyethylamino groups.

The number of carbon atoms of the aliphatic substituted carbamoyl group is preferably 2 to 10. Examples of the aliphatic substituted carbamoyl group include methylcarbamoyl and diethylcarbamoyl groups.

The number of carbon atoms of the aliphatic substituted sulfamoyl group is preferably 1 to 8. Examples of the aliphatic substituted sulfamoyl group include methylsulfamoyl and diethylsulfamoyl groups.

The number of carbon atoms of the aliphatic substituted ureido group is preferably 2 to 10. Examples of the aliphatic substituted ureido group include methylureido group.

Examples of the non-aromatic heterocyclic group include piperidino and morpholino groups.

Molecular weight of the retardation enhancing agent preferably falls in a range from 300 to 800.

Besides the compound using 1,3,5-triazine ring, any rod-formed compounds having linear molecular structures can be used in the present invention. Linear molecular structure herein means that a rod formed compound has a linear molecular structure in its most stable state in a thermodynamic sense. The thermodynamically most stable structure can be obtained by crystal structure analysis or the molecular orbital calculation. For example, it is possible to carry out molecular orbital calculation using a molecular orbital calculation software (e.g., WinMOPAC2000 from FUJITSU, Japan) to thereby determine a molecular structure producible with a minimum heat of generation. Linear molecular structure means that the principal chain composing the molecular structure forms an angle of 140° or larger in its most stable thermodynamic state obtained by calculation as described in the above.

The rod-formed compound having at least two aromatic rings is preferably any of those expressed by the formula (1) shown in the above, wherein desirable ranges, specific examples and desirable amount of addition are same with those described in the above.

[Optical Compensation Film]

The optical compensation film of the present invention comprises at least one optically anisotropic layer formed of a composition comprising a liquid crystal compound. The optically anisotropic layer may be formed on a surface of the transparent film or be formed on a surface of an alignment layer which is formed on a surface of the transparent film. And it is also allowable that the optically anisotropic layer is formed on a surface of a temporary substrate and the optically layer is transferred from on the temporary substrate to on the transparent film with an adhesive material or the like.

Examples of the liquid crystal compound, which can be employed in an optically anisotropic layer, include rod-like liquid crystal compounds and discotic liquid crystal compounds. The liquid crystal compound may be selected from high-molecular weight or low-molecular weight liquid crystals. The liquid crystal compound is not required to have a liquid-crystallinity after forming the optically anisotropic layer, in which the molecules of the low-molecular-weight liquid crystal compound are crosslinked.

(Rod-Like Liquid Crystal Compound)

Examples of the rod-like liquid crystal compound include azomethines, azoxys, cyanobiphenyls, cyanophenyl esters, benzoic acid esters, cyclohexanecarboxylic acid phenyl esters, cyanophenylcyclohexanes, cyano-substituted phenylpyrimidines, alkoxy-substituted phenylpyrimidines, phenyl dioxanes, tolans and alkenylcyclohexyl benzonitriles. Examples of the rod-like liquid crystal compounds further include metal complexes of liquid crystal compounds. Liquid crystal polymers having one or more repeating units including a rod-like liquid crystal structure can also be used in the present invention. Namely, the rod-like crystal compounds bonded to a polymer may be use in the present invention.

Rod-like liquid crystal compounds are described in fourth, seventh and eleventh chapters of "Published Quarterly Chemical Review vol. 22 Chemistry of Liquid Crystals (Ekisho no Kagaku)" published in 1994 and edited by Japan Chemical Society; and in third chapter of "Handbook of liquid Crystal Devices (Ekisyo Debaisu Handobukku)" edited by the 142 th committee of Japan Society for the Promotion of Science.

The rod-like crystal compounds desirably have a birefringence index of 0.001 to 0.7.

The rod-like crystal compounds desirably have one or more polymerizable groups for fixing themselves in an alignment state. Unsaturated polymerizable groups or epoxy polymerizable groups are preferred, and ethylene-type unsaturated polymerizable groups are more preferred.

(Discotic Liquid Crystal Compound)

Examples of discotic liquid-crystal compounds include benzene derivatives described in "Mol. Cryst.", vol. 71, page 111 (1981), C. Destrade et al; truxane derivatives described in "Mol. Cryst.", vol. 122, page 141 (1985), C. Destrade et al. and "Physics lett. A", vol. 78, page 82 (1990); cyclohexane derivatives described in "Angew. Chem.", vol. 96, page 70 (1984), B. Kohne et al.; and macrocycles based aza-crowns or phenyl acetylenes described in "J. Chem. Commun.", page 1794 (1985), M. Lehn et al. and "J. Am. Chem. Soc.", vol. 116, page 2,655 (1994), J. Zhang et al.

Examples of the discotic liquid crystal compounds also include compounds having a discotic core and substituents, radiating from the core, such as a linear alkyl or alkoxy group or substituted benzoyloxy groups. Such compounds exhibit liquid crystallinity. It is preferred that molecules have rotational symmetries respectively or as a whole of molecular assembly to be aligned in an alignment state.

The discotic liquid crystal compounds employed in preparing optically anisotropic layers are not required to maintain liquid crystallinity after contained in the optically anisotropic layers. For example, when a low-molecular-weight discotic liquid crystal compound, having a reacting group initiated by light and/or heat, is employed in preparation of an optically anisotropic layer, polymerization or cross-linking reaction of the compound is initiated by light and/or heat, and carried out, to thereby form the layer. The polymerized or cross-linked compounds may no longer exhibit liquid crystallinity. Preferred examples of the discotic liquid crystal compound are described in Japanese Laid-Open Patent Publication No. hei 8-50206. The polymerization of discotic liquid-crystal compounds is described in Japanese Laid-Open Patent Publication No. hei 8-27284.

It is necessary to bond a polymerizable group as a substituent to the disk-shaped core of a discotic liquid-crystal molecule to better fix the discotic liquid-crystal molecules by polymerization. However, when a polymerizable group is directly bonded to the disk-shaped core, it tends to be difficult to maintain alignment during polymerization reaction. Accordingly, the discotic liquid-crystal molecules desirably have a linking group between the disk-shaped core and the polymerizable group. That is, the discotic liquid-crystal compound is desirably selected from the group denoted by Formula (III) below.

$$D(-L-Q)_n \qquad \text{Formula (III)}$$

In the formula (III), "D" represents a discotic core, $L^1$ represents a divalent linking group, Q represents a polymerizable group and n is an integer from 4 to 12.

Examples of the core, "D", are shown below. In the examples, LQ or QL means a combination of a divalent linking group (L) and a polymerizable group (Q).

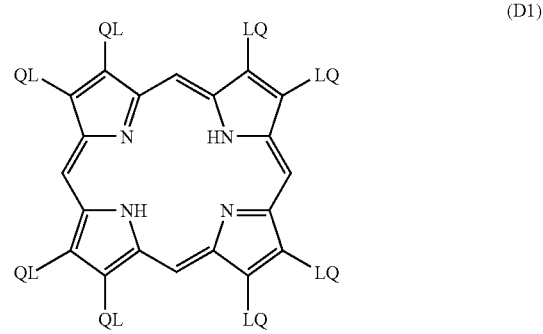

(D1)

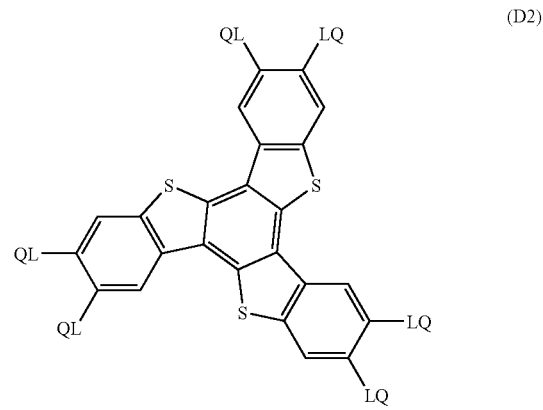

(D2)

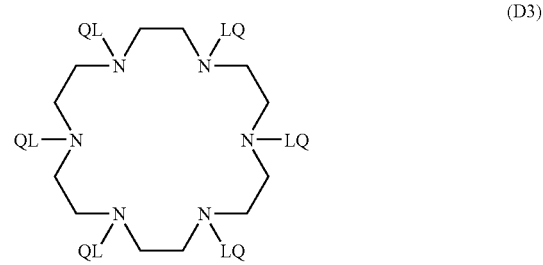

(D3)

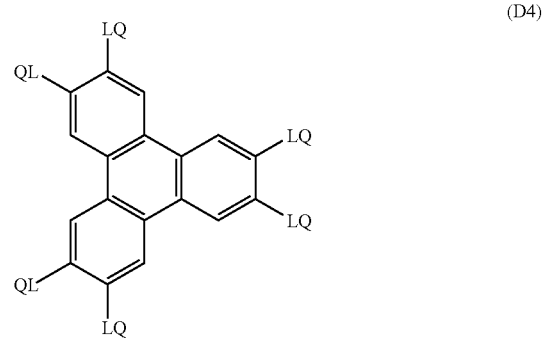

(D4)

-continued
(D5)
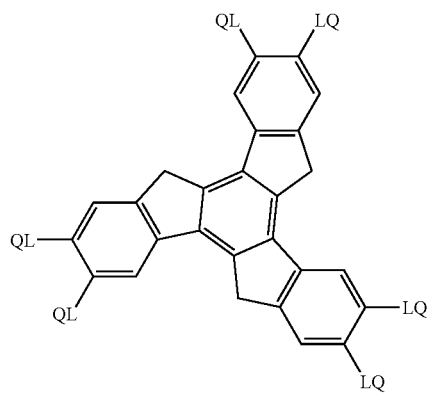
(D6)
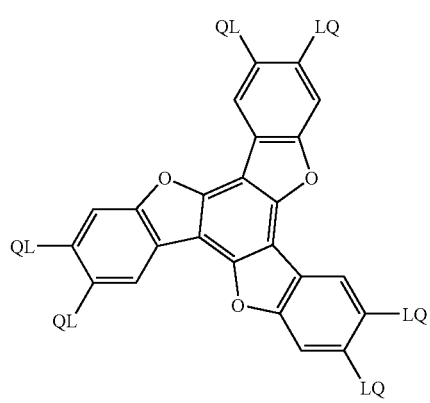
(D7)
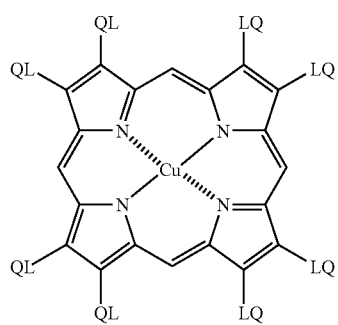
(D8)
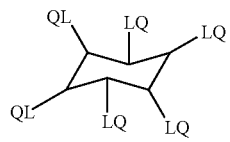
-continued
(D9)
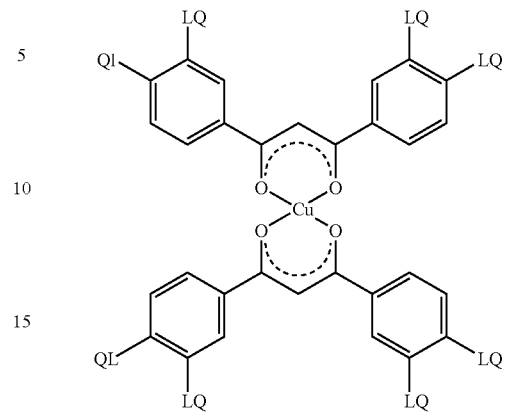
(D10)
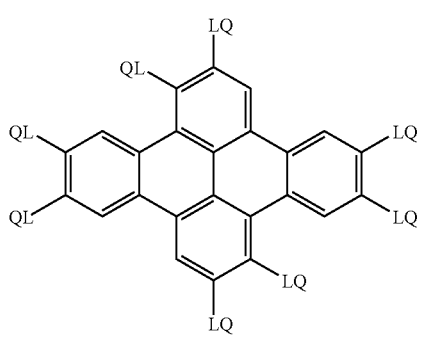
(D11)
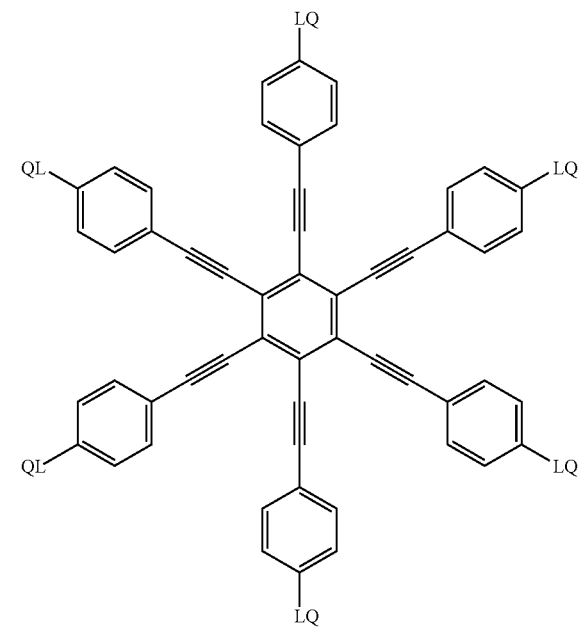

-continued (D12)

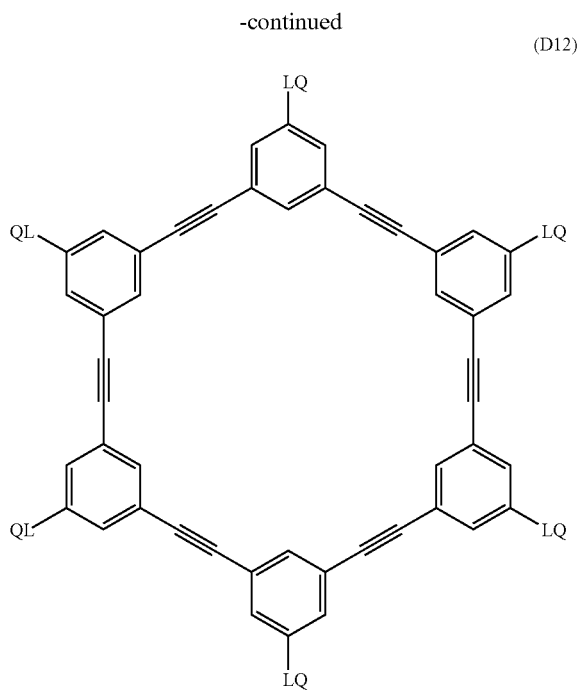

(D13)

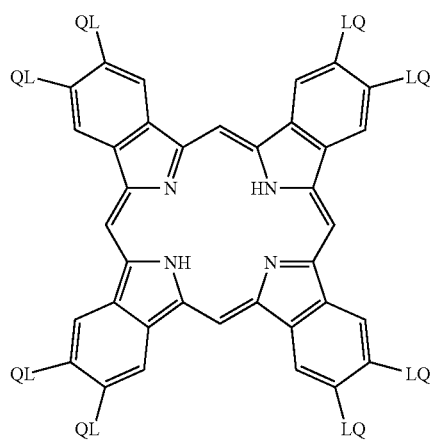

(D14)

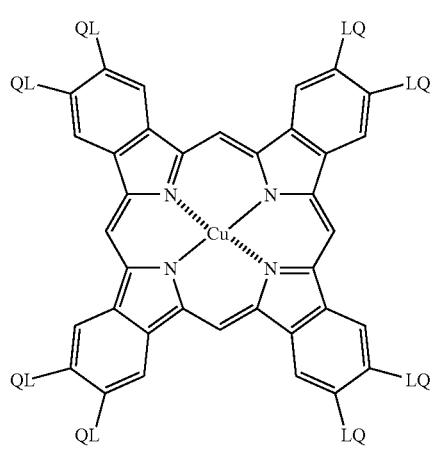

-continued (D15)

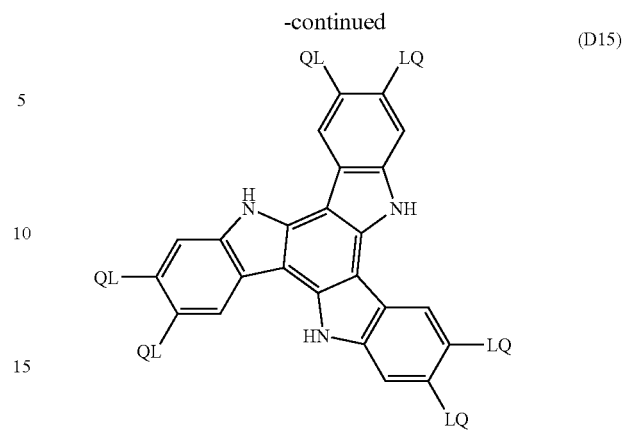

In the above Formula (III), divalent linking group (L) is desirably selected from the group consisting of an alkylene group, alkenylene group, arylene group, —CO—, —NH—, —O—, —S— and any combinations thereof. The divalent linking group (L) is preferably a group combining at least two divalent groups selected from the group consisting of an alkylene group, alkenylene group, arylene group, —CO—, —NH—, —O—, and —S—. Most preferably, the divalent linking group (L) is a group combining at least two divalent groups selected from the group consisting of an alkylene group, alkenylene group, arylene group, —CO-and-O—. The alkylene group desirably comprises from 1 to 12 carbon atoms. The alkenylene group desirably comprises form 2 to 12 carbon atoms. The arylene group desirably comprises from 6 to 10 carbon atoms. The alkylene group, alkenylene group and arylene group may have at least one substituent such as an alkyl group, halogen atom, cyano, alkoxy group or acyloxy group.

The examples of the divalent linking group (L) are shown below. Each of them is bonded on the left to disk-shaped core (D) and on the right to polymerizable group (P). "AL" denotes an alkylene group or alkenylene group, and "AR" denotes an arylene group. The alkylene group, alkenylene group or arylene group may have a substituent such as an alkyl group.

L1: -AL-CO—C-AL—

L2: -AL-CO—C-AL-C—

L3: -AL-CO—C-AL-C-AL—

L4: -AL-CO—C-AL-C—CO—

L5: —CO-AR-O-AL—

L6: —CO-AR-O-AL-O—

L7: —CO-AR-C-AL-C—CO—

L8: —CO—NH-AL—

L9: —NH-AL-C—

L10: —NH-AL-C—CO—

L11: —O-AL—

L12: —O-AL-C—

L13: —O-AL-C—CO—

L14: —O-AL-C—CO—NH-AL—

L15: —O-AL-S-AL—

L16: —O—CO-AR-O-AL-CO—

L17:—O—CO-AR-C-AL-C—CO—

L18:—O—CO-AR-O-AL-O-AL-O—CO—

L19:—O—CO-AR-O-AL-O-AL-O-AL-O—CO—

L20:—S-AL—

L21:—S-AL-C—

L22:—S-AL-C—CO—

L23:—S-AL-S-AL—

L24:—S-AR-AL—

In the Formula (III), the polymerizable group (Q) may be selected depending on the manner of polymerization. The polymerizable group is desirably an unsaturated polymerizable group or an epoxy group, more desirably an unsaturated polymerizable group, and much more preferably an ethylene-based unsaturated polymerizable group.

In the Formula (III), n is an integer from 4 to 12. n is determined depending on the species of the discotic core (D). The plural combinations of L and Q may be different or identical each other, however, are desirably identical to each other.

According to the present invention, in the optically anisotropic layer, molecules of the rod-like or discotic liquid crystal compound are fixed in an alignment state. The mean alignment direction of molecular symmetry axes of liquid crystal molecules at an interface of the transparent film side is preferably about 45° with respect to a slow axis in a plane of the transparent film. It is noted that, in the specification, "about 45°" means an angle falling within a range of 45°±5°, and preferably from 42 to 48° and more preferably from 43 to 47°. In the optically, anisotropic layer, the mean alignment direction of molecular symmetry axes of liquid crystal molecules is preferably 43° to 47° with respect to a login direction of the transparent film, or, in other words, with respect to a fast axis of the transparent film.

The mean alignment direction of molecular symmetry axes of liquid crystal molecules at an interface of the transparent side may be controlled by selecting types of liquid crystal compounds or types of materials of alignment layers, or by selecting conditions of rubbing treatments. According to the present invention, when an alignment layer is formed by rubbing, the optically anisotropic layer, in which the mean alignment direction of molecular symmetry axes of liquid crystal molecules at an interface in at least a transparent film side is about 45° with respect to the slow axis of the transparent film, can be produced by rubbing in a direction of about 45° with respect to the slow axis of the transparent film. For example, the optical compensation film can be produced in a continuous fashion by using a long transparent film having a slow axis parallel to the long direction. In particular, a long optical compensation film can be produced in a continuous fashion by a process comprising applying a coating liquid for an alignment layer to a surface of a long transparent film to form a layer on the transparent film, rubbing the surface of the layer in a direction of 45° with respect to the long direction continuously to form an alignment layer, applying a coating liquid comprising a liquid crystal compound to the rubbed surface of the alignment layer, aligning the molecules of the liquid crystal compound and fixing the molecules in the alignment state. The long optical compensation film may be cut into a desired shape before being employed in a liquid crystal display.

The mean alignment direction of molecular symmetry axes of liquid crystal molecules at an interface of the surface side, or, in other word, at an air-interface, is preferably about 45°, more preferably from 42 to 48°, and much more preferably from 43 to 47°, with respect to a slow axis in a plane of the transparent film. The mean alignment direction of molecular symmetry axes of liquid crystal molecules at an air-interface may be controlled by selecting types of additives used with liquid crystal compounds. Examples of the additives used with liquid crystal compounds include plasticizers, surfactants, polymerizable monomers and polymers. The variation degree of the mean alignment direction of molecular symmetry axes may be controlled by selecting types of addition agents used with liquid crystal compounds as well as the above. The surfactants is preferably selected from surfactants also having an ability of controlling a surface tension of a coating liquid.

The plasticizers, surfactants or polymerizable monomers used with liquid crystal compounds are preferably selected from compounds compatible with the liquid crystal compounds and capable of giving a variation of tilt angles of liquid crystal molecules or of giving no affection on alignments of liquid crystal molecules. The polymerizable monomers such as compounds having a vinyl group, a vinyloxy group, acryloyl group or methacryloyl group are preferably used. The amount of the additive is, in usual, preferably from 1 to 50 wt %, and more preferably from 5 to 30 wt %. When a composition comprising a polymerizable monomer having 4 or more numbers of reactive function groups and a liquid crystal compound is used for producing an optically anisotropic layer, the adhesion property between the alignment layer and the optically anisotropic layer can be improved.

When a discotic liquid crystal compound is used, polymer, which is compatible with the discotic liquid crystal compound and capable of giving variations of tilt angles of discotic molecules, is preferably used with the discotic liquid crystal compound.

Examples of the polymer include cellulose esters. Preferred examples of the cellulose ester include cellulose acetate, cellulose acetate propionate, hydroxypropyl cellulose and cellulose acetate butyrate. In order to avoid the inhibition of alignment of discotic liquid crystal molecules, the amount of the polymer is desirably from 0.1 to 10 wt %, more preferably from 0.1 to 8 wt % and much more preferably from 0.1 to 5 wt % with respect to the weight of the discotic liquid crystal compound.

The discotic liquid crystal compound is desirably selected from those having a phase transfer temperature from a discotic nematic liquid crystal phase to solid phase falling within a range from 70 to 300° C. (more preferably from 70 to 170° C.).

According to the present invention, the optically anisotropic layer has an optically anisotropic property in a plane. The in-plane retardation, Re, of the optically anisotropic layer is desirably from 3 to 300 nm, more desirably from 5 to 200 nm, and much more desirably from 10 to 100 nm. The in-depth direction retardation, Rth, of the optically anisotropic layer is desirably from 20 to 400 nm, and more desirably from 50 to 200 nm. The thickness of the optically anisotropic layer is desirably from 0.1 to 20 micro meters, more desirably from 0.5 to 15 micro meters and much more desirably from 1 to 10 micro meters.

[Alignment Layer]

The optical compensation sheet of the present invention may comprise an alignment layer. When a liquid crystal compound is once oriented and is fixed in that state, alignment layer is not necessary because the role of the alignment layer is preliminarily satisfied by the liquid crystal compound in the orientated state. In other words, it is also possible to prepare an optical compensation sheet or a polarizing plate of the invention by transferring only an optically anisotropic layer on an alignment layer in the fixed oriented state onto a substrate or a polarizer.

According to the present invention, the alignment layer is preferably formed of a cross-linked polymer layer. The polymers used for producing the alignment layers may be selected from polymers capable of cross-linking themselves or capable of being cross-linked by cross-linking agents. The alignment layer can be formed by carrying out reaction of polymer molecules originally having a function group or polymer molecules having a introduced function group with applying light, heat, pH variation or the like; or by carrying out reaction of polymer molecules and cross-linking compound molecules to form bonds derived from the crosslinking molecules between polymer molecules.

The alignment layer formed of a cross-linked polymer may be produced by a process comprising applying a coating liquid comprising polymer and, if necessary, a cross-linking agent to a surface of a substrate, and carrying out the reaction under heating or the like.

From the view of reducing an amount of dust during rubbing, it is preferable that the cross-linking degree of the alignment layer is increased. The cross-linking degree can be defined as (1−(Ma/Mb)), where "Mb" is an amount of a cross-linking agent added to a coating liquid, "Ma" is a residual amount of a cross-linking agent after cross-linking reaction, and the cross-linking degree is desirably from 50% to 100%, more preferably from 65% to 100% and much more preferably from 75% to 100%.

According to the present invention, the polymers used for producing the alignment layers may be selected from polymers capable of cross-linking themselves or capable of being cross-linked by cross-linking agents. The polymers having both functions can also be used. Examples of the polymer include polymers such as poly methyl methacrylate, acrylic acid/methacrylic acid copolymer, styrene/maleimide copolymer, polyvinyl alcohol, modified polyvinyl alcohol, poly(N-styrol acrylamide), styrene/vinyl toluene copolymer, chlorosulfonation polystyrene, nitro cellulose, poly vinyl chloride, polyolefin chloride, polyester, polyimide, vinyl acetate/vinyl chloride copolymer, ethylene/vinyl acetate copolymer, carboxy methyl cellulose, gelatin, polyethylene, polypropylene, and polycarbonate; and compounds such as silane coupling agent. Among these, poly(N-styrol acrylamide), carboxy methyl cellulose, gelatin, polyvinyl alcohol and modified polyvinyl alcohol are preferred; gelatin, polyvinyl alcohol and modified polyvinyl alcohol are more preferred; and polyvinyl alcohol and modified polyvinyl alcohol are much more preferred.

Polyvinyl alcohols having a saponification degree of 70 to 100% can be used, those having a saponification degree of 80 to 100% is preferably used, and those having a saponification degree of 82 to 98% is more preferably used. The polymerization degree of polyvinyl alcohol is preferably from 100 to 3000.

Examples of modified polyvinyl alcohol include polyvinyl alcohols modified by copolymerization such as polyvinyl alcohols having COONaSi(OX)$_3$, N(CH$_3$)$_3$.Cl, C$_9$H$_{19}$COO, SO$_3$Na, C$_{12}$H$_{25}$ or the like as a modified group; polyvinyl alcohols modified by chain transfer reaction such as polyvinyl alcohols having COONa, SH, SC$_{12}$H$_{25}$ or the like as a modified group; and polyvinyl alcohols modified by block polymerization such as polyvinyl alcohols having COOH, CONH$_2$, COOR, C$_6$H$_5$ or the like as a modified group. The polymerization degree of the modified polyvinyl alcohol is preferably from 100 to 3000.

Among these, modified or non-modified polyvinyl alcohols having a saponification degree of 80 to 100% are preferred, and non-modified or alkylthio-modified polyvinyl alcohols having a saponification degree of 85 to 95% are more preferred.

Preferred examples of the modified polyvinyl alcohol used for producing the alignment layer include reaction products of polyvinyl alcohol and the compounds represented by the formula (6) shown below.

Formula (6):

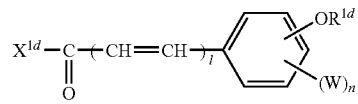

In the formula, $R^{1d}$ represents a non-substituted alkyl group or an alkyl group substituted with an acryloyl group, a methacryloyl group or an epoxy group; W represents a halogen atom or a substituted or non-substituted alkyl group or alkoxy group; $X^{1d}$ represents an atom groups needed for forming an activated ester, an acid anhydride or an acid halide; l is 0 or 1; and n is an integer from 0 to 4.

Preferred examples of the modified polyvinyl alcohol used for producing the alignment layer also include reaction products of polyvinyl alcohol and the compounds represented by the formula (7) shown below.

Formula (7):

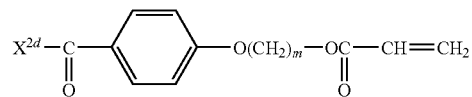

In the formula, $X^{2d}$ represents an atom groups needed for forming an activated ester, an acid anhydride or an acid halide; and m is an integer from 2 to 24.

The polyvinyl alcohol to be reacted with the compounds represented by the formula (6) or (7) may be selected from unmodified polyvinyl alcohols and modified polyvinyl alcohols by copolymerization, chain transfer reaction or block polymerization or the like. Preferred examples of the modified polyvinyl alcohol described above are described in Japanese Laid-Open Patent Publication "Tokkaihei" No. 8-338913.

When the hydrophilic polymers such as polyvinyl alcohols are used for producing the alignment layer, from the viewpoint of the hardness of the alignment layer, the moisture content is preferably reduced by a preferred range, more preferably from 0.4% to 2.5% and much more preferably from 0.6% to 1.6%. The moisture content can be easily measured by using a commercially available moisture content meter employing Karl Fischer method.

The thickness of the alignment layer is preferably not more than 10 micro meters.

[Polarizing Plate]

According to the present invention, a polarizing plate comprising a linear polarizing film and a pair of protective films sandwiching the polarizing film may be used. A polarizing plate, produced by a process comprising impregnating a polyvinyl alcohol film with iodine molecules, stretching the film and stacking two protective films on both surfaces of the film, can be used. The polarizing plate is disposed at the outside of a liquid crystal cell. It is preferred that two polarizing plates comprising a linear polarizing film and a pair of protective films sandwiching the polarizing film are disposed to sandwich a liquid crystal cell. As described above, the protective film disposed closer to the liquid crystal cell may be an optical compensation film (a transparent film) of the present invention.

(Protective Film)

According to the present invention, a polarizing plate comprising a linear polarizing film and a pair of protective films sandwiching the polarizing film may be used. Examples of the polymer, used for producing the protective film, include, but are not limited to, cellulose esters such as cellulose acetate, cellulose acetate butyrate, polycarbonates, polyolefins, polystyrenes, and polyesters. As described above, the cellulose acylate films having optical properties required for the transparent film of the present invention can be used as a protective film.

It is preferred that the protective film is fed in a roll manner, and is preferably bonded to a long polarizing film with an alignment of the long directions. The orientation axis (slow axis) of the protective film may be set to any direction, and, from the viewpoint of handling, the orientation axis of the protective film is preferably in a direction parallel to the long direction of the film.

When the protective film is selected from films capable of optical compensation, Re/Rth(450 nm), a ratio of Re to Rth measured at 450 nm, of the protective film is preferably from 0.4 to 0.95 times as large as Re/Rth(550 nm) at 550 nm; Re/Rth(650 nm) at 650 nm of the protective film is preferably from 1.05 to 1.93 times as large as Re/Rth(550 nm) at 550 nm; and a retardation in thickness-direction, Rth, is preferably from 70 to 400 nm at 550 nm.

When the protective film is selected from films not capable of optical compensation, small retardation is preferred. A polarizing plate comprising a polarizing film and a protective film having a retardation larger than a certain value, in which the transparent axis of the polarizing film and the orientation axis (slow axis) of the protective film are not parallel to each other, may give an elliptically-polarized light, and, thus, such a polarizing plate is not preferred. Examples of the polymer film having a small retardation include cellulose triacetate films and polyolefin films such as "ZEONEX" or "ZEONOR" (both manufactured by ZEON CORPORATION) or "ARTON" (manufactured by JSR Corporation), and such films are preferably used. Non-birefringent optical polymer materials, described in Japanese Laid-Open Patent Publication "Tokkaihei" Nos. 8-110402 and 11-293116, are also included in the examples. When the optical compensation film comprising an optically anisotropic layer formed of liquid-crystal molecules and a substrate supporting the layer is employed in the present invention, the substrate may function as a protective film of the polarizing film.

When a polarizing film is bonded to two protective films, they may be stacked such that the slow axis (orientation axis) of at least one protective film (a protective film disposed at a side closer to a liquid-crystal cell) is not parallel to the polarizing axis (stretching axis) of the polarizing film. More specifically, the angle between the absorption axis of the polarizing film and the slow axis of the protective film is desirably set within the range from 10° to 90°, more desirably from 20° to 70°, much more desirably from 40° to 50° and further much more desirably from 43° to 47°. The angle between the absorption axis of the polarizing film and the slow axis of another protective film may be set within a range depending on the application, and desirably set within, however, not to be limited to, the above range. It is preferred that the slow axes of the pair of the protective films are aligned with each other.

When the slow axis of the protective film and the absorption axis of the polarizing film are parallel to each other, it is possible to prevent the polarizing plate from changing in dimension or curling up, and, thus, to improve mechanical stabilities of the polarizing plate. Such effects may be obtained if at least two axes of three films, or in other words a polarizing film and a pair of protective films, are stacked such as a slow axis of one protective film and an absorption axis of the polarizing film or slow axes of the two protective films, are substantially parallel to each other.

<<Adhesive Agent>>

Adhesive agents may be used for bonding polarizing films and protective films. Examples of the adhesive agent include PVA resins such as modified PVA resins with acetoacetyl groups, sulfonic acid groups, carboxyl groups or oxyalkylene groups; and boric compound solutions. PVA resins are preferred. The thickness of the adhesion layer between the polarizing film and the protective film is desirably set within the range from 0.01 to 10 μm and more desirably from 0.05 to 5 μm.

<<Integrated Production Process for Polarizing film and Transparent Protective Film>>

The polarizing plate applicable to the present invention is produced by stretching a polarizing film-forming film and by succeedingly drying the product so as to allow it to shrink and to have a lowered volatile content, wherein it is preferable to bond a transparent protective film at least on one surface thereof after or during the drying, and to subject the stack to post-heating. For an embodiment in which the transparent protective film also serves as a support of the optically anisotropic layer which functions as the optical compensation film, it is preferable to bond the transparent support, having the transparent protective film on one surface thereof and having the optically anisotropic layer on the opposite surface thereof, to the polarizing film-forming film, and to subject the stack to the post-heating. Specific examples of the bonding method include a method in which the transparent protective film is bonded to the polarizing film using an adhesive, while the polarizing film is dried as being held at the both ends thereof, and then the both ends are slit off; and a method in which the polarizing film-forming film is dried, released from the holder for both ends, slit at both ends off, and bonded with the transparent protective film. Methods of slitting may be general techniques such as cutting using a cutter such as cutting edges, laser, and so forth. The bonding is preferably followed by heating in order to dry the adhesive and to improve the polarization performances. Conditions for the heating may vary depending on the adhesive, wherein a water-base adhesive is preferably dried at 30° C. or above, more preferably 40° C. to 100° C., and still more preferably 50° C. to 90° C. It is further preferable to carry out these processes in an integrated production line, in view of performances and production efficiency.

<<Performances of Polarizing Plate>>

Optical characteristics and durability (short-term and long-term storability) of the transparent protective film, polarizer, and polarizing plate composed of a transparent support relevant to the present invention are preferably equivalent or superior to those of a commercial super-high-contrast product (e.g., HLC2-5618, a product of Sanritz Corporation). More specifically, the polarizing plate preferably has a visible light transmittance of 42.5% or above, a degree of polarization of $\{(Tp-Tc)/(Tp+Tc)\}^{1/2} \geq 0.9995$ (where, Tp is parallel transmittance, and Tc is orthogonal transmittance), a rate of change in the light transmittance before and after being allowed to stand in an atmosphere of 60° C. and relative humidity of 90% for 500 hours, and then allowed to stand in a dry atmosphere of 80° C. for 500 hours of 3% or less on the absolute value basis, more preferably 1% or less, and a rate of change in the degree of polarization of 1% or less on the absolute value basis, more preferably 0.1% or less.

EXAMPLES

The following paragraphs will further specifically explain the present invention referring to Examples. These Examples only shows specific examples of the disclosure of the present invention, without limiting the present invention.

Example 1-1

Optical simulation was carried out for the liquid crystal display device having a configuration shown in FIG. 1, to thereby confirm the effects. Optical calculation was carried out using Master Ver6.08 from Shintec, Inc. Any liquid crystal cells, electrodes, substrates, polarizing plates and so forth may be those used for conventional liquid crystal displays, all of which can be used without modification. A liquid crystal material used herein was ZLI-4792 attached to LCD Master. The liquid crystal cell has parallel and horizontal orientation with pretilt angle of 80, has a cell gap of 6.5 μm, contains a liquid crystal material having a positive dielectric anisotropy, and has a retardation of the liquid crystal (i.e., a product $\Delta n \cdot d$ of thickness d (μm) and refractive index anisotropy $\Delta n$) of 630 nm. A polarizing film used herein was G1220DU attached to LCD Master. The transparent film was adjusted so as to have values of Re and Rth at the individual wavelengths shown in the column "Example 1-1" in Table 1-1. The front retardation value Re of the optically anisotropic layer was set to 30 nm. A light source used herein was a C-light source attached to LCD Master. Thus the liquid crystal display device of Example 1-1 was configured as shown in FIG. 1. Crossing angle of the transmission axis 2 of the polarizing film 1 and the in-plane slow axis 14a of the transparent film 13a, and crossing angle of the transmission axis 102 of the polarizing film 101 and the in-plane slow axis 114a of the transparent film 113a were respectively set to 0°.

<Leakage Light and Chromaticity of Liquid Crystal Display Device>

The liquid crystal display device of Example 1-1 was applied with a voltage causing a minimum front transmissivity, that is black-level voltage, and black level's transmissivity (%) at a viewing angle in the direction of azimuth=0°, polar angle=60°, and color shift $\Delta x$ between the direction of azimuth=0°, polar angle=60°, and the direction of azimuth=180°, polar angle=60° were determined. Results are shown in Table 1.

Examples 2-1 to 4-1

Optical characteristics of the liquid crystal display device were determined by calculation using LCD Master according to a method identical to as described in Example 1-1, except that Re and Rth values of the transparent film were set so as to attain optical characteristics listed in Table 1-1.

<Measurement of Leakage Light and Chromaticity of Liquid Crystal Display Device>

Each of these liquid crystal display device was applied with a voltage causing a minimum front transmissivity, that is black-level voltage, and black level's transmissivity (%) at a viewing angle in the direction of azimuth=0°, polar angle=60°, and color shift $\Delta x$ between the direction of azimuth=0°, polar angle=60° and the direction of azimuth=180°, polar angle=60° were determined. Results are shown in Table 1.

Comparative Example 1

Optical characteristics of the liquid crystal display device were determined by calculation using LCD Master according to a method identical to as described in Example 1-1, except that Re and Rth values of the transparent film were set so as to attain optical characteristics listed in Table 1-1. In order to make comparison with the effects of the present invention, Re/Rth which is a ratio of Re and Rth in Comparative Example 1-1 was set almost constant for all wavelengths of 450, 550 and 650 nm.

<Measurement of Leakage Light and Chromaticity of Liquid Crystal Display Device>

Each of these liquid crystal display device was applied with a voltage causing a minimum front transmissivity, that is black-level voltage, and black level's transmissivity (%) at a viewing angle in the direction of azimuth=0°, polar angle=60°, and color shift $\Delta x$ between the direction of azimuth=0°, polar angle=60° and the direction of azimuth=180°, polar angle=60° were determined. Results are shown in Table 1-1.

TABLE 1-1

Black level's transmissivity (%) at a viewing angle in the direction of azimuth = 0°, polar angle = 60°, and color shift $\Delta x$ between the direction of azimuth = 0°, polar angle = 60° and the direction of azimuth = 180°, polar angle = 60°

| LCD No. | Wavelength 450 nm | | | Wavelength 550 nm | | | Wavelength 650 nm | | | $Re_{450}/Rth_{450}$ $Re_{550}/Rth_{550}$ | $Re_{650}/Rth_{650}$ $Re_{550}/Rth_{550}$ | Transmittance (%)*1) | $\Delta x$*2) |
|---|---|---|---|---|---|---|---|---|---|---|---|---|---|
| | $Re_{450}$ (nm) | $Rth_{450}$ (nm) | $Re_{450}/Rth_{450}$ | $Re_{550}$ (nm) | $Rth_{550}$ (nm) | $Re_{550}/Rth_{550}$ | $Re_{650}$ (nm) | $Rth_{650}$ (nm) | $Re_{650}/Rth_{650}$ | | | | |
| Comparative Example 1-1 | 45 | 160 | 0.28 | 45 | 160 | 0.28 | 45 | 160 | 0.28 | 1 | 1 | 0.033 | 0.09 |
| Example 1-1 | 42 | 164 | 0.26 | 45 | 160 | 0.28 | 48 | 158 | 0.30 | 0.91 | 1.08 | 0.021 | 0.08 |
| Example 2-1 | 35 | 170 | 0.21 | 45 | 160 | 0.28 | 55 | 157 | 0.35 | 0.73 | 1.25 | 0.017 | 0.04 |
| Example 3-1 | 30 | 175 | 0.17 | 45 | 160 | 0.28 | 60 | 155 | 0.39 | 0.61 | 1.38 | 0.01 | 0.02 |
| Example 4-1 | 25 | 180 | 0.14 | 45 | 160 | 0.28 | 65 | 153 | 0.42 | 0.49 | 1.51 | 0.016 | 0.05 |

*1) Black level's transmissivity (%) at a viewing angle in the direction of azimuth = 0°, polar angle = 60°,
*2) $\Delta x$: color shift between the direction of azimuth = 0°, polar angle = 60° and the direction of azimuth = 180°, polar angle = 60°

It is found from the results shown in Table 1-1 that any of the liquid crystal display devices of Examples (Examples 1-1 to Example 4-1) of the present invention having Re/Rth(450 nm) of 0.49 to 0.91 times as large as Re/Rth(550 nm), and having Re/Rth(650 nm) of 1.08 to 1.51 times as large as Re/Rth(550 nm) showed a smaller black level's transmissivity at polar angle=60° and a smaller color shift from the front, as compared with Comparative Example 1-1. It is also understood from the results shown in Table 1-1 that both of transmissivity and color shift fall minimum when Re/Rth(450 nm) is 0.61 times as large as Re/Rth(550 nm), and Re/Rth(650 nm) is 1.38 times as large as Re/Rth(550 nm).

Example 5-1

Optical characteristics of the liquid crystal display device were determined according to a method identical to as described in Example 1-1, except that Δn·d of the liquid crystal layer was set to 1030 nm, and retardation in the front direction was adjusted to 44 nm.

<Measurement of Leakage Light and Chromaticity of Liquid Crystal Display Device>

The liquid crystal display device of Example 5-1 was applied with a voltage causing a minimum front transmissivity, that is black-level voltage, and black level's transmissivity (%) at a viewing angle in the direction of azimuth=0°, polar angle=60°, and color shift Δx between the direction of azimuth=0°, polar angle=60° and the direction of azimuth=180°, polar angle=60° were determined. Results are shown in Table 2-1.

Comparative Example 2-1

Optical characteristics of the liquid crystal display device were determined by calculation using LCD Master according to a method identical to as described in Example 5-1, except that Re and Rth values of the transparent film were set so as to attain optical characteristics listed in Table 2-1, according to a method similar to as described in Example 5-1. In order to make comparison with the effects of the present invention, Re/Rth which is a ratio of Re and Rth in Comparative Example 2-1 was set almost constant for all wavelengths of 450, 550 and 650 nm.

<Measurement of Leakage Light and Chromaticity of Liquid Crystal Display Device>

Each of these liquid crystal display device was applied with a voltage causing a minimum front transmissivity, that is black-level voltage, and black level's transmissivity (%) at a viewing angle in the direction of azimuth=0°, polar angle=60°, and color shift Δx between the direction of azimuth=0°, polar angle=60° and the direction of azimuth=180°, polar angle=60° were determined. Results are shown in Table 2-1.

TABLE 2-1

Black level's transmissivity (%) at a viewing angle in the direction of azimuth = 0°, polar angle = 60°, and color shift Δx between the direction of azimuth = 0°, polar angle = 60° and the direction of azimuth = 180°, polar angle = 60°

| LCD No. | Wavelength 450 nm | | | Wavelength 550 nm | | | Wavelength 650 nm | | | $Re_{450}/Rth_{450}$ / $Re_{550}/Rth_{550}$ | $Re_{650}/Rth_{650}$ / $Re_{550}/Rth_{550}$ | Trans-mittance (%)*1) | Δx*2) |
|---|---|---|---|---|---|---|---|---|---|---|---|---|---|
| | $Re_{450}$ (nm) | $Rth_{450}$ (nm) | $Re_{450}/Rth_{450}$ | $Re_{550}$ (nm) | $Rth_{550}$ (nm) | $Re_{550}/Rth_{550}$ | $Re_{650}$ (nm) | $Rth_{650}$ (nm) | $Re_{650}/Rth_{650}$ | | | | |
| Comparative Example 2-1 | 25 | 300 | 0.083 | 25 | 300 | 0.083 | 25 | 300 | 0.08 | 1 | 1 | 0.08 | 0.13 |
| Example 5-1 | 24 | 307 | 0.078 | 25 | 300 | 0.083 | 30 | 300 | 0.10 | 0.94 | 1.20 | 0.06 | 0.09 |
| Example 6-1 | 23 | 314 | 0.073 | 25 | 300 | 0.083 | 35 | 290 | 0.12 | 0.88 | 1.45 | 0.04 | 0.05 |
| Example 7-1 | 22 | 320 | 0.069 | 25 | 300 | 0.083 | 40 | 280 | 0.14 | 0.83 | 1.71 | 0.01 | 0.01 |
| Example 8-1 | 21 | 327 | 0.064 | 25 | 300 | 0.083 | 43 | 275 | 0.16 | 0.77 | 1.88 | 0.05 | 0.06 |
| Example 9-1 | 20 | 334 | 0.060 | 25 | 300 | 0.083 | 45 | 280 | 0.16 | 0.72 | 1.93 | 0.07 | 0.11 |

*1)Black level's transmissivity (%) at a viewing angle in the direction of azimuth = 0°, polar angle = 60°,
*2)Δx: color shift between the direction of azimuth = 0°, polar angle = 60° and the direction of azimuth = 180°, polar angle = 60°

Examples 6-1 to 9-1

Optical characteristics of the liquid crystal display device were determined by calculation using LCD Master according to a method identical to as described in Example 5-1, except that Re and Rth values of the transparent film were set so as to attain optical characteristics listed in Table 1-1, according to a method similar to as described in Example 5-1.

<Measurement of Leakage Light and Chromaticity of Liquid Crystal Display Device>

Each of these liquid crystal display devices was applied with a voltage causing a minimum front transmissivity, that is black-level voltage, and black level's transmissivity (%) at a It is found from the results shown in Table 2-1 that any of the liquid crystal display devices of Examples (Examples 5-1 to Example 9-1) of the present invention having Re/Rth(450 nm) 0.72 to 0.94 times as large as Re/Rth(550 nm), and having Re/Rth(650 nm) of 1.2 to 1.93 times as large as Re/Rth (550 nm) showed a smaller black level's transmissivity at polar angle=60° and a smaller color shift from the front, as compared with Comparative Example 2-1. It is also understood from the results shown in Table 2-1 that both of transmissivity and color shift fall minimum when Re/Rth(450 nm) is 0.83 times as large as Re/Rth(550 nm), and Re/Rth(650 nm) is 1.71 times as large as Re/Rth(550 nm).

Example 1-2

Preliminary Experiment 1

(Spectral Measurement of Retardation Enhancing Agent)

UV-visible region (UV-vis) spectra of retardation enhancing agents (10-trans), (41-trans) and (29-trans) were measured.

Each of the retardation enhancing agents was dissolved in tetrahydrofuran (containing no stabilizing agent (BHT)), and the concentration thereof was adjusted to $10^{-5}$ mol/dm$^3$. Thus-prepared solution was measured using a measuring apparatus (product of Hitachi, Ltd.). Results are shown in Table 1-2.

TABLE 1-2

$C_5H_{11}$—⟨⟩—O—CO····⟨H⟩····CO—O—⟨⟩—$C_5H_{11}$ (10-trans)

$C_7H_{15}$—⟨⟩—O—CO····⟨H⟩····CO—O—⟨⟩—$C_7H_{15}$ (41-trans)

$C_5H_{11}$—⟨⟩—CO—O····⟨H⟩····O—CO—⟨⟩—$C_5H_{11}$ (29-trans)

| Retardation enhancing agent | Maximum absorption wavelength (λmax) | Absorption coefficient (ε) at maximum absorption |
|---|---|---|
| 10-trans | 220 nm | 15000 |
| 41-trans | 230 nm | 16000 |
| 29-trans | 240 nm | 20000 |

(Production of Cellulose Acylate Film)

The composition below was placed in a mixing tank, stirred under heating so as to dissolve the individual components, to thereby prepare cellulose acetate solutions.

| Composition of material and solvent | Outer layer side | Inner layer side |
|---|---|---|
| Cellulose acetate | substitution degree 2.87, acylation degree 60.9%, 100 parts by weight | substitution degree 2.75, acylation degree 59.5%, 100 parts by weight |
| Triphenyl phosphate (plasticizer) | 7.8 parts by weight | 7.8 parts by weight |
| Biphenyl diphenyl phosphate (plasticizer) | 3.9 parts by weight | 3.9 parts by weight |
| Methylene chloride (first solvent) | 300 parts by weight | 300 parts by weight |
| Methanol (second solvent) | 45 parts by weight | 45 parts by weight |
| Dye (360FP from Sumika Fine Chemicals Co., Ltd.) | 0.0009 parts by weight | 0.0009 parts by weight |
| retardation enhancing agent (41-trans) | 1.32 parts by weight | 1.32 parts by weight |

The obtained dope was cast using a casting machine having a 2-m-wide, 65-m-long band. After the film temperature was cooled to as low as 40° C. on the band, the film was cooled for one minute, peeled off, and stretched in the width-wise direction by 28% using a tenter while being blown with a 140° C. dry air. The film was further dried using a 135° C. dry air for 20 minutes, and thereby a cellulose acetate support (PK-1) having a residual solvent content of 0.3% by weight was produced.

The obtained support (PK-1) was 1,340 mm wide and 88 µm thick. Measurement using an ellipsometer (M-150, from JASCO Corporation) of the support, humidity-conditioned under an environment of 25° C., 55% RH for 2 hours, was found to have a retardation value (Re) at 550 nm of 45.0 nm. Retardation value (Rth) at 550 nm was measured as 160.0 nm.

Retardation values (Re) similarly measured at 450 nm and 650 nm were found to be 31 nm and 59 nm, respectively. Retardation values (Rth) measured at 450 nm and 650 nm were 171 nm and 155 nm, respectively.

On the surface of thus-produced support (PK-1), on the side thereof formerly being faced with the band, 10 cc/m$^2$ of a 1.0 N potassium hydroxide solution (solvent: water/isopropyl alcohol/propylene glycol=69.2 parts by weight/15 parts by weight/15.8 parts by weight) was coated, the product was kept at approximately 40° C. for 30 minutes, the alkali solution was wiped off, the product was cleaned with pure water, and water drops were removed using an air knife. The product was then dried at 100° C. for 15 seconds. Angle of contact of PK-1 to pure water was measured as 420.

(Production of Alignment Layer)

On PK-1 (alkali-treated surface), 28 ml/m$^2$ of a coating liquid for forming alignment layer, having the composition shown below, was coated using a #16 wire bar coater. The coated liquid was dried with a 60° C. air for 60 seconds, and further with a 90° C. air for 150 seconds, to thereby fabricate an alignment layer.

| Composition of Coating Liquid for Forming Alignment layer | |
|---|---|
| Modified polyvinyl alcohol shown below | 10 parts by weight |
| Water | 371 parts by weight |
| Methanol | 119 parts by weight |
| Gultaraldehyde (crosslinking agent) | 0.5 parts by weight |

-continued

| Citric acid ester (AS3 from Sanyo Chemical Co., Ltd.) | 0.35 parts by weight |

Polyvinyl alcohol

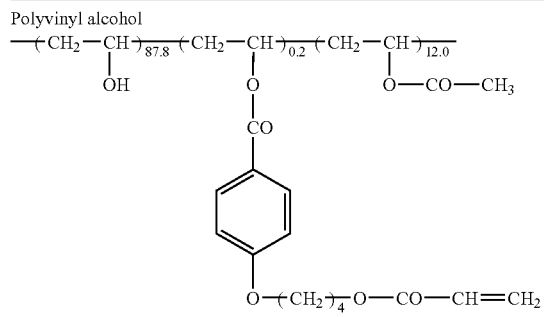

(Rubbing)

PK-1 was fed at a rate of 20 m/min, a rubbing roll (300 mm in diameter) was set so as to effect rubbing at an angle of 45° away from the longitudinal direction, and the surface of PK-1 having the alignment layer formed thereon was rubbed under the roll rotated at 650 rpm. The length of contact of the rubbing roll with PK-1 was set to 18 mm.

(Formation of Optically Anisotropic Layer)

A coating liquid obtained by dissolving 41.01 kg of discotic liquid-crystalline compound shown below, 4.06 kg of ethylene oxide-modified trimethylolpropane triacrylate (V#360 from Osaka Organic Chemical Industry, Ltd.), 0.45 kg of cellulose acetate butylate (CAB531-1 from Eastman Chemical Company), 1.35 kg of light polymerization initiator (Irgacure 907 from Ciba-Geigy, Ltd.) and 0.45 kg of sensitizer (Kayacure DETX from Nippon Kayaku Co., Ltd.) into 102 kg of methyl ethyl ketone was further added with 0.1 kg of fluoroaliphatic-group-containing copolymer (Megafac F780 from Dainippon Ink and Chemicals, Inc.), and the solution was continuously coated on the surface of PK-1 having the alignment layer formed thereon, while being fed at 20 m/min, using a #3.0 wire bar coater rotated at a speed of rotation of 391 rpm in the same direction with the direction of feeding of the film.

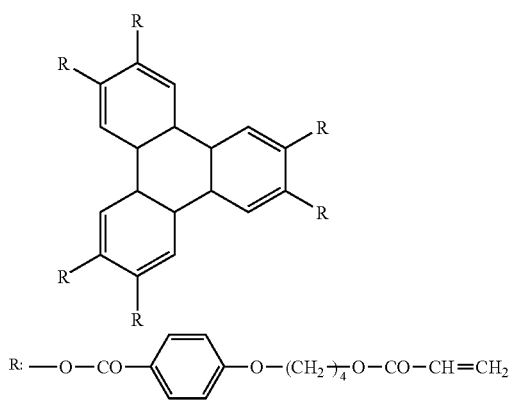

The solvent was dried in a process of continuous heating from room temperature to 100° C., and the discotic liquid crystal compound layer was then heated in a drying zone at 130° C. for approximately 90 seconds, under the air flow rate over the layer surface adjusted to 2.5 m/sec, to thereby orient the discotic liquid crystal compound. The product is then transferred to a drying zone at 80° C., and is then irradiated by UV radiation of 600 mW illuminance for 4 seconds using a UV irradiation device (UV lamp: output=160 W/cm, emission length=1.6 m), while keeping the temperature of the film surface at approximately 100° C., to thereby allow cross-linking reaction to proceed so as to fix the discotic liquid crystal compound to the orientation. The product was then allowed to cool to room temperature, and wound up in a form of cylindrical roll. A rolled optical compensation film (KH-1) was thus produced.

The surface temperature of the discotic liquid crystal compound layer was found to be 127° C., and the viscosity of the layer at this temperature was 695 cp. The viscosity was determined by measuring a liquid crystal layer having the same compositional ratio with the above layer (exclusive of the solvent) using an E-type viscometer with a heater.

A portion of thus-produced rolled optical compensation film (KH-1) was cut off for use as a sample, and was subjected to measurement of optical properties. The retardation value of the optically anisotropic layer measured in an environment of 25° C., 55% RH at 550 nm was found to be 30.0 nm. The angle (tilt angle) of the disk plane of the discotic liquid crystal compound in the optically anisotropic layer to the surface of the support was found to continuously vary in the depth-wise direction of the layer, averaged to 300. Next, only the optically anisotropic layer was peeled off, and average direction of the axis of molecular symmetry of the optically anisotropic layer was measured, which was found to be 45° to the longitudinal direction of the optical compensation film (KH-1).

The obtained optical compensation film was further observed under crossed-Nicol arrangement of polarizing plates to find non-uniformity, but no non-uniformity was detected in the front view, and even in the oblique view at angles up to 60° away from the normal line.

Example 2-2

Production of Cellulose Acylate Film PK-2

The composition below was placed in a mixing tank, stirred under heating so as to dissolve the individual components, to thereby prepare cellulose acetate solutions.

| Composition of material and solvent | Outer layer side | Inner layer side |
|---|---|---|
| Cellulose acetate | substitution degree 2.87, acylation degree 60.9%, 100 parts by weight | substitution degree 2.64, acylation degree 59.5%, 100 parts by weight |
| Triphenyl phosphate (plasticizer) | 7.8 parts by weight | 5.3 parts by weight |
| Biphenyl diphenyl phosphate (plasticizer) | 3.9 parts by weight | 2.7 parts by weight |
| Methylene chloride (first solvent) | 300 parts by weight | 300 parts by weight |
| Methanol (second solvent) | 45 parts by weight | 45 parts by weight |
| Dye (360FP from Sumika Fine Chemicals Co., Ltd.) | 0.0009 parts by weight | 0.0009 parts by weight |

-continued

| Composition of material and solvent | Outer layer side | Inner layer side |
|---|---|---|
| retardation enhancing agent (41-trans) | 1.32 parts by weight | — |
| retardation enhancing agent (shown below) | — | 4.45 parts by weight |

Retardation enhancing agent

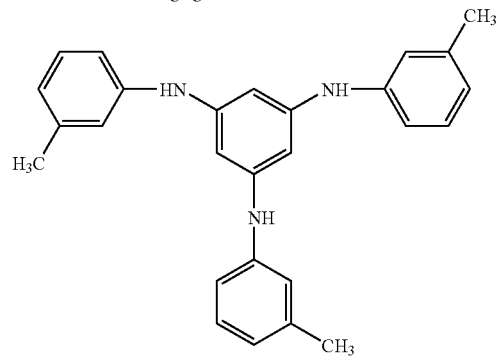

The obtained dope was cast using a casting machine having a 2-m-wide, 65-m-long band. After the film temperature was cooled to as low as 40° C. on the band, the film was cooled for one minute, peeled off, and stretched in the width-wise direction by 16% using a tenter while being blown with a 140° C. dry air. The film was further dried using a 135° C. dry air for 20 minutes, and thereby a cellulose acetate support (PK-2) having a residual solvent content of 0.3% by weight was produced.

The obtained support (PK-2) was 1,340 mm wide and 88 µm thick. Measurement using an ellipsometer (M-150, from JASCO Corporation) of the support, humidity-conditioned under an environment of 25° C., 55% RH for 2 hours, was found to have a retardation value (Re) at 550 nm of 40.0 nm. Retardation value (Rth) at 550 nm was measured as 200.0 nm.

Retardation values (Re) similarly measured at 450 nm and 650 nm were found to be 22 nm and 58 nm, respectively. Retardation values (Rth) measured at 450 nm and 650 nm were 225 nm and 191 nm, respectively.

Similarly to as described in Example 1-2 (PK-1), the support was subjected to the alkali treatment, provided thereon with the alignment layer, and the alignment layer was then subjected to the rubbing on the surface thereof.

(Formation of Optically Anisotropic Layer)

A coating liquid obtained by dissolving 41.01 kg of discotic liquid-crystalline compound shown below, 4.06 kg of ethylene oxide-modified trimethylolpropane triacrylate (V#360 from Osaka Organic Chemical Industry, Ltd.), 0.45 kg of cellulose acetate butylate (CAB531-1 from Eastman Chemical Company), 1.35 kg of light polymerization initiator (Irgacure 907 from Ciba-Geigy, Ltd.) and 0.45 kg of sensitizer (Kayacure DETX from Nippon Kayaku Co., Ltd.) into 102 kg of methyl ethyl ketone was further added with 0.1 kg of fluoroaliphatic-group-containing copolymer (Megafac F780 from Dainippon Ink and Chemicals, Inc.), and the solution was continuously coated on the surface of PK-1 having the alignment layer formed thereon, while being fed at 20 m/min, using a #3.4 wire bar coater rotated at a speed of rotation of 391 rpm in the same direction with the direction of feeding of the film.

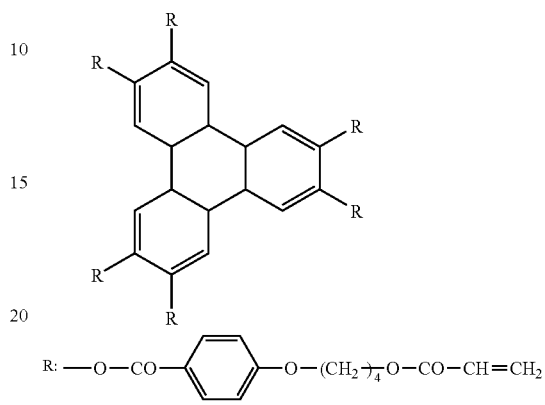

R: —O—CO—⟨benzene⟩—O—$(CH_2)_4$—O—CO—CH=$CH_2$

The solvent was dried in a process of continuous heating from room temperature to 100° C., and the discotic liquid crystal compound layer was then heated in a drying zone at 130° C. for approximately 90 seconds, under the air flow rate over the layer surface adjusted to 2.5 m/sec, to thereby orient the discotic liquid crystal compound. The product is then transferred to a drying zone at 80° C., and is then irradiated by UV radiation of 600 mW illuminance for 4 seconds using a UV irradiation device (UV lamp: output=160 W/cm, emission length=1.6 m), while keeping the temperature of the film surface at approximately 80° C., to thereby allow cross-linking reaction to proceed so as to fix the discotic liquid crystal compound to the orientation. The product was then allowed to cool to room temperature, and wound up in a form of cylindrical roll. A rolled optical compensation film (KH-2) was thus produced.

The surface temperature of the discotic liquid crystal compound layer was found to be 127° C., and the viscosity of the layer at this temperature was 695 cp. The viscosity was determined by measuring a liquid crystal layer having the same compositional ratio with the above layer (exclusive of the solvent) using an E-type viscometer with a heater.

A portion of thus-produced rolled optical compensation film (KH-2) was cut off for use as a sample, and was subjected to measurement of optical properties. The retardation value of the optically anisotropic layer measured in an environment of 25° C., 55% RH at 550 nm was found to be 36.0 nm. The angle (tilt angle) of the disk plane of the discotic liquid crystal compound in the optically anisotropic layer to the surface of the support was found to continuously vary in the depth-wise direction of the layer, averaged to 32°. Next, only the optically anisotropic layer was peeled off, and average direction of the axis of molecular symmetry of the optically anisotropic layer was measured, which was found to be 45° to the longitudinal direction of the optical compensation film (KH-1).

The obtained optical compensation film was further observed under crossed-Nicol arrangement of polarizing plates to find non-uniformity, but no non-uniformity was detected in the front view, and even in the oblique view at angles up to 60° away from the normal line.

Example 3-2

Production of Cellulose Acylate Film PK-3

The composition below was placed in a mixing tank, stirred under heating so as to dissolve the individual components, to thereby prepare cellulose acetate solutions.

| Composition of material and solvent | Outer layer side | Inner layer side |
|---|---|---|
| Cellulose acetate | substitution degree 2.87, acylation degree 60.9%, 100 parts by weight | substitution degree 2.75, acylation degree 58.0%, 100 parts by weight |
| Triphenyl phosphate (plasticizer) | 7.8 parts by weight | 5.3 parts by weight |
| Biphenyl diphenyl phosphate (plasticizer) | 3.9 parts by weight | 2.7 parts by weight |
| Methylene chloride (first solvent) | 300 parts by weight | 300 parts by weight |
| Methanol (second solvent) | 45 parts by weight | 45 parts by weight |
| Dye (360FP from Sumika Fine Chemicals Co., Ltd.) | 0.0009 parts by weight | 0.0009 parts by weight |
| retardation enhancing agent (10-trans) | 1.32 parts by weight | 3.34 parts by weight |

A cellulose acylate film (PK-3) was produced similarly to described in Example 1-2 (PK-1).

The obtained support (PK-3) was 1,340 mm wide and 80 μm thick. Measurement using an ellipsometer (M-150, from JASCO Corporation) of the support, humidity-conditioned under an environment of 25° C., 55% RH for 2 hours, was found to have a retardation value (Re) at 550 nm of 45.0 nm. Retardation value (Rth) at 550 nm was measured as 160.0 nm.

Retardation values (Re) similarly measured at 450 nm and 650 nm were found to be 42 nm and 48 nm, respectively. Retardation values (Rth) measured at 450 nm and 650 nm were 164 nm and 158 nm, respectively.

Similarly to as described in Example 1-2 (PK-1), the support was subjected to the alkali treatment, provided thereon with the alignment layer, the alignment layer was then subjected to the rubbing on the surface thereof, the optically anisotropic layer was formed thereon by coating, to thereby fabricate an optical compensation film (KH-3).

Example 4-2

Production of Cellulose Acylate Film PK-4

The composition below was placed in a mixing tank, stirred under heating so as to dissolve the individual components, to thereby prepare cellulose acetate solutions.

| Composition of material and solvent | Outer layer side | Inner layer side |
|---|---|---|
| Cellulose acetate | substitution degree 2.87, acylation degree 60.9%, 100 parts by weight | substitution degree 2.64, acylation degree 58.0%, 100 parts by weight |
| Triphenyl phosphate (plasticizer) | 7.8 parts by weight | 5.3 parts by weight |
| Biphenyl diphenyl phosphate (plasticizer) | 3.9 parts by weight | 2.7 parts by weight |
| Methylene chloride (first solvent) | 300 parts by weight | 300 parts by weight |
| Methanol (second solvent) | 45 parts by weight | 45 parts by weight |
| Dye (360FP from Sumika Fine Chemicals Co., Ltd.) | 0.0009 parts by weight | 0.0009 parts by weight |
| retardation enhancing agent (10-trans) | 3.32 parts by weight | 1.35 parts by weight |
| retardation enhancing agent (shown below) | — | 4.65 parts by weight |

Retardation enhancing agent

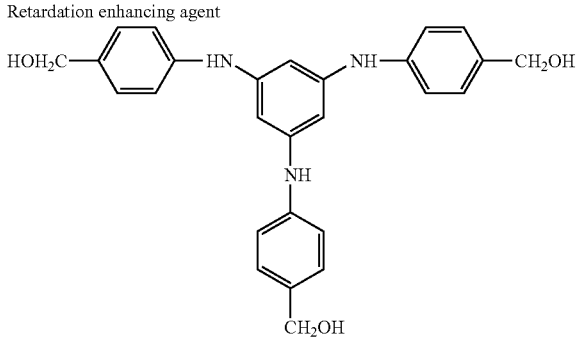

A cellulose acylate film (PK-4) was produced similarly to described in Example 1-2 (PK-1).

The obtained support (PK-4) was 1,340 mm wide and 80 μm thick. Measurement using an ellipsometer (M-150, from JASCO Corporation) of the support, humidity-conditioned under an environment of 25° C., 55% RH for 2 hours, was found to have a retardation value (Re) at 550 nm of 25.0 nm. Retardation value (Rth) at 550 nm was measured as 300.0 nm.

Retardation values (Re) similarly measured at 450 nm and 650 nm were found to be 22 nm and 40 nm, respectively. Retardation values (Rth) measured at 450 nm and 650 nm were 320 nm and 280 nm, respectively.

Similarly to as described in Example 2-2 (PK-2), the support was subjected to the alkali treatment, provided thereon with the alignment layer, the alignment layer was then subjected to the rubbing on the surface thereof, the optically anisotropic layer was formed thereon by coating, to thereby fabricate an optical compensation film (KH-4).

Example 5-2

Production of Polarizing Plate

Iodine was allowed to adsorb onto the stretched polyvinyl alcohol film to thereby fabricate a polarizing film, and on one surface thereof the optical compensation film (KH-01) produced in Example 1-2 was adhered using a polyvinyl alcohol-base adhesive. The polarizing film was arranged so that the transmission axis thereof was in parallel with the slow axis of the optical compensation film (KH-01).

A commercial cellulose triacetate film (Fujitac TD80UF from Fuji Photo Film Co., Ltd.) was saponified, and was attached on the opposite surface of the polarizing film using a polyvinyl alcohol-base adhesive. Thus polarizing plates were produced.

<On-the-Device Evaluation of Liquid Crystal Display Device>

(Production of Bend-Oriented Liquid Crystal Cell)

On a glass substrate having electrodes formed thereon, a polyimide film was provided as an alignment layer, and the surface of the alignment layer was rubbed. Two thus-obtained glasses were opposed so as to align directions of the rubbing in parallel, setting a cell gap to 4.6 μm. A liquid-crystalline compound (ZLI1132 from Merck) having Δn of 0.1396 was injected into the gap, to thereby fabricate a bend-oriented liquid crystal cell.

Two produced polarizing plates were attached to the bend-oriented cell so as to hold it in between. Each of the polarizing plates herein was arranged so that the optically anisotropic layer thereof faces to each of the cell substrates, and so that the direction of rubbing of the liquid crystal cell and the direction of rubbing of the optically anisotropic layer are in anti-parallel with each other.

The liquid crystal cell was applied with a 55-Hz rectangular waveform voltage, setting the white level at 2 V and the black level at 5 V so as to give a normally-white mode. The cell was applied with a voltage capable of minimizing the transmissivity in the front view, or black-level voltage, and black level transmissivity (%) at azimuth=0°, polar angle=60°, and color shift Δx observed between viewing angles of azimuth=0°, polar angle=60° and azimuth=180°, polar angle=60° were determined. Results are shown in Table 2-2. Assuming now ratio of transmissivity (white level display/black level display) as contrast, the viewing angle was also measured using a measurement instrument (EZ-Contrast160D from ELDIM), at 8 steps from black level display (L1) to white level display (L8). Results are shown in Table 2-2.

Example 6-2

Production of Polarizing Plate

Iodine was allowed to adsorb onto the stretched polyvinyl alcohol film to thereby fabricate a polarizing film, and on one surface thereof the optical compensation film (KH-02) produced in Example 2-2 was adhered using a polyvinyl alcohol-base adhesive. The polarizing film was arranged so that the transmission axis thereof was in parallel with the slow axis of the optical compensation film (KH-02).

A commercial cellulose triacetate film (Fujitac TD80UF from Fuji Photo Film Co., Ltd.) was saponified, and was attached on the opposite surface of the polarizing film using a polyvinyl alcohol-base adhesive. Thus polarizing plates were produced.

<On-the-Device Evaluation of Liquid Crystal Display Device>

(Production of Bend-Oriented Liquid Crystal Cell)

On a glass substrate having electrodes formed thereon, a polyimide film was provided as an alignment layer, and the surface of the alignment layer was rubbed. Two thus-obtained glasses were opposed so as to align directions of the rubbing in parallel, setting a cell gap to 6.3 μm. A liquid-crystalline compound (ZLI1132 from Merck) having Δn of 0.1396 was injected into the gap, to thereby fabricate a bend-oriented liquid crystal cell.

Two produced polarizing plates were attached to the bend-oriented cell so as to hold it in between. Each of the polarizing plates herein was arranged so that the optically anisotropic layer thereof faces to each of the cell substrates, and so that the direction of rubbing of the liquid crystal cell and the direction of rubbing of the optically anisotropic layer are in anti-parallel with each other.

The liquid crystal cell was applied with a 55-Hz rectangular waveform voltage, setting the white level at 2 V and the black level at 7 V so as to give a normally-white mode. The cell was applied with a voltage capable of minimizing the transmissivity in the front view, or black-level voltage, and black level transmissivity (%) at azimuth=0°, polar angle=60°, and color shift Δx observed between viewing angles of azimuth=0°, polar angle=60° and azimuth=180°, polar angle=60° were determined. Results are shown in Table 2-2. Assuming now ratio of transmissivity (white level display/black level display) as contrast, the viewing angle was also measured using a measurement instrument (EZ-Contrast160D from ELDIM), at 8 steps from black level display (L1) to white level display (L8). Results are shown in Table 2-2.

TABLE 2-2

|  | Re/Rth | | | | | | |
| --- | --- | --- | --- | --- | --- | --- | --- |
|  | A: 450 nm | B: 550 nm | C: 650 nm | A/B | C/B | Trans-missivity | Color shift |
| Example 5-2 | 0.18 | 0.28 | 0.38 | 0.64 | 1.36 | 0.04 | 0.05 |
| Example 6-2 | 0.10 | 0.20 | 0.30 | 0.50 | 1.50 | 0.016 | 0.05 |

(Note)
Transmissivity: black level transmissivity (%) at viewing angles of azimuth = 0°, polar angle = 60°
Color shift: color shift Δx observed between azimuth = 0°, polar angle = 60° and azimuth = 180°, polar angle = 60°

It is understood from the results shown in Table 1-2, that all of the liquid crystal display devices of the present invention having a ratio Re/Rth(450 nm) of 0.49 to 0.91 times as large as Re/Rth(550 nm) and having Re/Rth(650 nm) of 1.08 to 1.51 times as large as Re/Rth(550 nm) (Example 1-2 to Example 4-2) are lower in the black-level transmittance at polar angle=60°, and smaller in the color shift from the front view, as compared with Comparative Example 1-2. It is also understood from the results shown in Table 2-2, that both of transmissivity and color shift are minimized when Re/Rth (450 nm) is 0.61 times as large as Re/Rth(550 nm), and Re/Rth(650 nm) is 1.38 times as large as Re/Rth(550 nm).

TABLE 3-2

| Liquid crystal display | Viewing angle (range ensuring a contrast ratio of 10 or more and not causative of inversion of gradation on the black side) | | |
| --- | --- | --- | --- |
|  | Top | Bottom | Left/Right |
| Example 5-2 | 80° | 80° | 80° |
| Example 6-2 | 80° | 80° | 80° |

(Note)
Inversion of gradation on the black side: inversion between L1 and L2

INDUSTRIAL APPLICABILITY

The present invention was completed based on the findings of the present inventors after extensive investigations, and is aimed at enabling viewing angle compensation of liquid crystal cell, in particular of OCB-mode liquid crystal cell, almost over the entire wavelength, by using an optical compensation film having a transparent film having in-plane retardation and thickness-wise wavelength dispersion of retardation thereof independently controlled to optically optimized values through appropriate selection of materials and methods of production therefor. As a consequence, the liquid crystal display device of the present invention is moderated in light leakage in the oblique direction in a black state, and is distinctively improved in the viewing-angle-dependent contrast. The liquid crystal display device of the present invention is also capable of suppressing light leakage in the oblique direction in a black state almost over the entire visible light range, and is greatly improved in the viewing-angle-dependent color shift in a black state which has been a difficult problem in the prior art.

CROSS-REFERENCE TO RELATED APPLICATIONS

This application claims benefit of priorities to Japanese Patent Application No. 2004-235974 filed Aug. 13, 2004, and Japanese Patent Application No. 2004-272531 filed Sep. 17, 2004.

The invention claimed is:

1. An optical compensation film comprising:
   a transparent film having a ratio Re/Rth(450 nm) of Re and Rth at 450 nm of 0.4 to 0.95 times as large as Re/Rth(550 nm) at 550 nm, having Re/Rth(650 nm) at 650 nm of 1.05 to 1.93 times as large as Re/Rth(550 nm), and having Rth at 550 nm ranging from 70 nm to 400 nm, where "Re" is an in-plane retardation and "Rth" is a thickness-direction retardation; and
   an optically anisotropic layer having an in-plane optical anisotropy, formed of a composition comprising a liquid-crystalline compound, in which molecules of the liquid-crystalline compound are fixed in an alignment state,
   wherein the direction of orthogonal projection, onto a plane of the transparent film, of a mean orientation direction of molecular symmetry axes of the liquid-crystalline compound at the interface on the transparent film side is 45° with respect to an in-plane slow axis of the transparent film.

2. The optical compensation film of claim 1, wherein the liquid-crystalline compound is a discotic liquid-crystalline compound.

3. A polarizing plate comprising a polarizing film and an optical compensation film of claim 1.

4. A liquid crystal display device comprising a liquid crystal cell and at least one polarizing plate of claim 3.

5. A liquid crystal display device comprising:
   a liquid crystal cell comprising a pair of substrates having at least on either one of which electrodes formed thereon, and a liquid crystal layer held between the pair of substrates, comprising a nematic liquid crystal material, molecules of which being oriented almost in parallel with the surfaces of the pair of substrates in a non-driven state, and having a product Δn·d ranging from 0.1 to 1.5 μm of the thickness d (μm) and the refractive index anisotropy Δn;
   a first and second polarizing films arranged while placing the liquid crystal cell in between; and
   a transparent film disposed between the liquid crystal cell and at least one of the first and second polarizing film, the transparent film having a ratio Re/Rth(450 nm) of Re and Rth at 450 nm of 0.4 to 0.95 times as large as Re/Rth(550 nm) at 550 nm, having Re/Rth(650 nm) at 650 nm of 1.05 to 1.93 times as large as Re/Rth(550 nm), and having Rth at 550 nm ranging from 70 nm to 400 nm, where "Re" is an in-plane retardation and "Rth" is a thickness-direction retardation.

6. The liquid crystal display device of claim 5, further comprising at least one optically anisotropic layer between the transparent film and the liquid crystal cell, the optically anisotropic layer being formed of a composition comprising a liquid-crystalline compound, in which molecules of the liquid-crystalline compound are fixed in an alignment state,
   wherein the direction of orthogonal projection, onto a plane of the transparent film, of a mean orientation direction of molecular symmetry axes of the liquid-crystalline compound at the interface on the transparent film side is 45° with respect to an in-plane slow axis of the transparent film.

7. The liquid crystal display device of claim 6, wherein the liquid-crystalline compound is a discotic liquid-crystalline compound.

8. The liquid crystal display device of claim 5, wherein the liquid crystal cell comprises a liquid crystal layer employing a bend orientation mode.

9. The liquid crystal display device of claim 5, wherein the liquid crystal cell employs a VA mode or an OCB mode.

* * * * *